United States Patent [19]

Stokes

[11] Patent Number: 5,546,908
[45] Date of Patent: Aug. 20, 1996

[54] PLURAL FUEL SYSTEM FOR INTERNAL COMBUSTION ENGINE

[76] Inventor: Richard A. Stokes, 112 E. Fourth St., Apt. B-1, Aberdeen, Wash. 98520

[21] Appl. No.: 178,662

[22] Filed: Jan. 7, 1994

[51] Int. Cl.$^6$ ............................ F02D 41/26; F02M 43/00
[52] U.S. Cl. ................................ 123/480; 123/525
[58] Field of Search ........................... 123/480, 486, 123/533, 250, 251, 252, 525, 528, 560, 564, 565

[56] References Cited

U.S. PATENT DOCUMENTS

| | | | |
|---|---|---|---|
| 4,356,805 | 11/1982 | Kler | 123/525 |
| 4,489,699 | 12/1984 | Poehlman | 123/525 |
| 4,492,207 | 1/1985 | Hallberg | 123/527 |
| 4,513,727 | 4/1985 | Lagano et al. | 123/525 |
| 4,535,728 | 8/1985 | Batchelor | 123/27 GE |
| 4,546,732 | 10/1985 | Mae et al. | 123/1 A |
| 4,589,396 | 5/1986 | Tokushima et al. | 123/564 |
| 4,641,625 | 2/1987 | Smith | 123/575 |
| 4,800,862 | 1/1989 | McKay et al. | 123/531 |
| 4,876,988 | 10/1989 | Paul et al. | 123/1 A |
| 4,884,530 | 12/1989 | Boekhaus et al. | 123/525 |
| 4,936,280 | 6/1990 | Langlois | 123/578 |
| 4,993,386 | 2/1991 | Ozasa et al. | 123/480 |
| 4,995,367 | 2/1991 | Yamauchi et al. | 123/494 |
| 5,014,670 | 5/1991 | Mitsumoto | 123/425 |
| 5,101,800 | 4/1992 | Schumann et al. | 123/531 |
| 5,115,787 | 5/1992 | von Pickartz | 123/549 |
| 5,119,794 | 6/1992 | Kushida et al. | 123/549 |
| 5,139,002 | 8/1992 | Lynch et al. | 123/575 |
| 5,349,934 | 9/1994 | Miyano | 123/525 |

*Primary Examiner*—Andrew M. Dolinar
*Attorney, Agent, or Firm*—Eugene Stephens & Associates

[57] ABSTRACT

A plural fuel system for internal combustion engines in which the efficiency of the engine is raised by burning fuels singly or in combination with other liquid, gasified, or gaseous fuels, which best meet the load, speed, and environmental demands placed on the engine. A microprocessor-controlled air compressor adjusts the volume of air entering the engine cylinders, adjusting the effective compression ratio and charge density of the engine in accordance with the fuel or fuels being burned, while maintaining precise air/fuel ratios. Environmental conditions such as air temperature, altitude, coolant temperature, etc. are also sensed, processed, and adjusted by the microprocessor through various input and output devices in real time. The substitution of gasoline by natural gas or methane generated from organic wastes will reduce by a factor of 30%–70% the consumption of gasoline, reduce engine wear and auxiliary pollution control devices, make refueling a more flexible process by charging through home gas lines, and increase engine performance under all conditions.

16 Claims, 46 Drawing Sheets

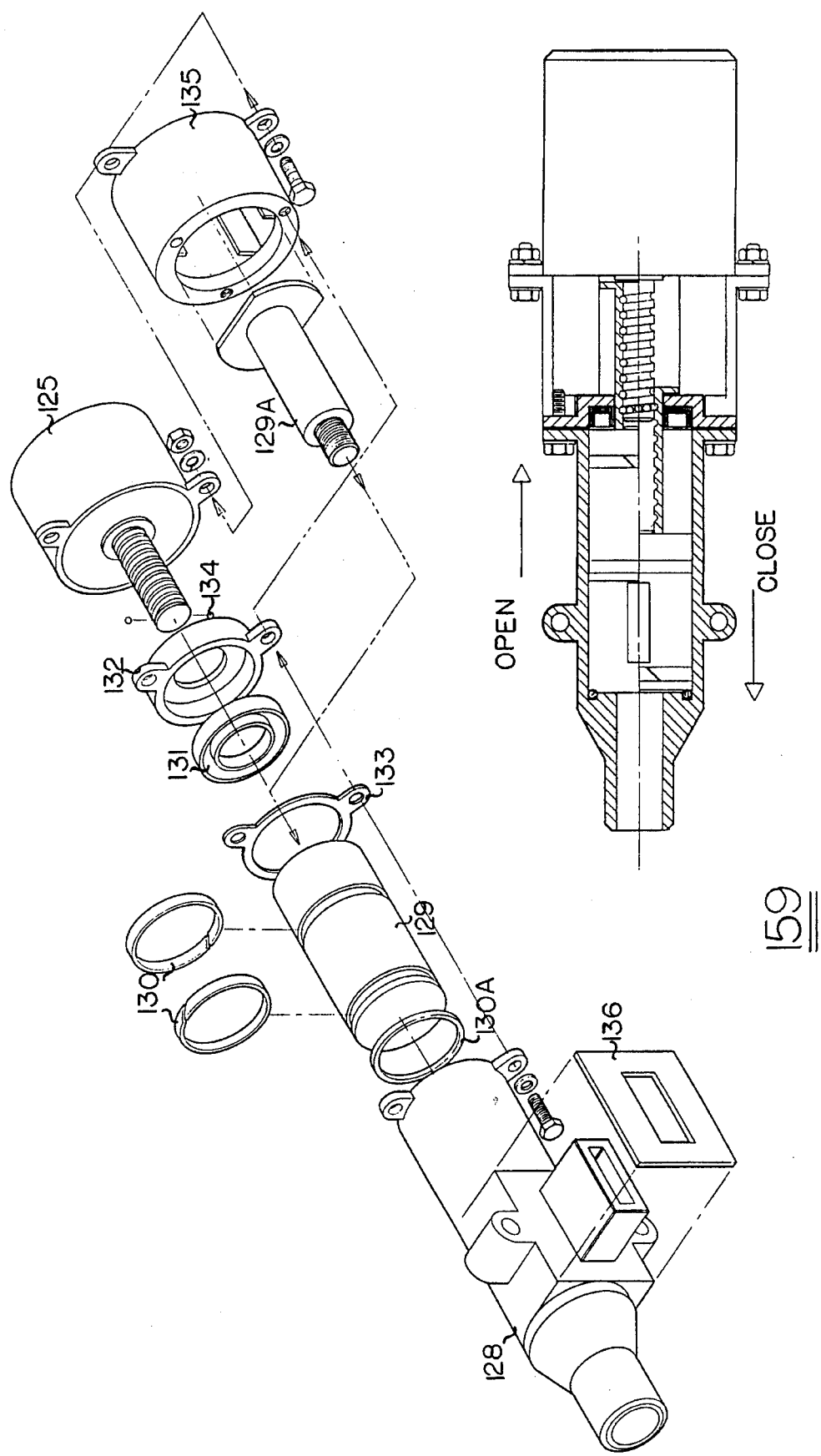

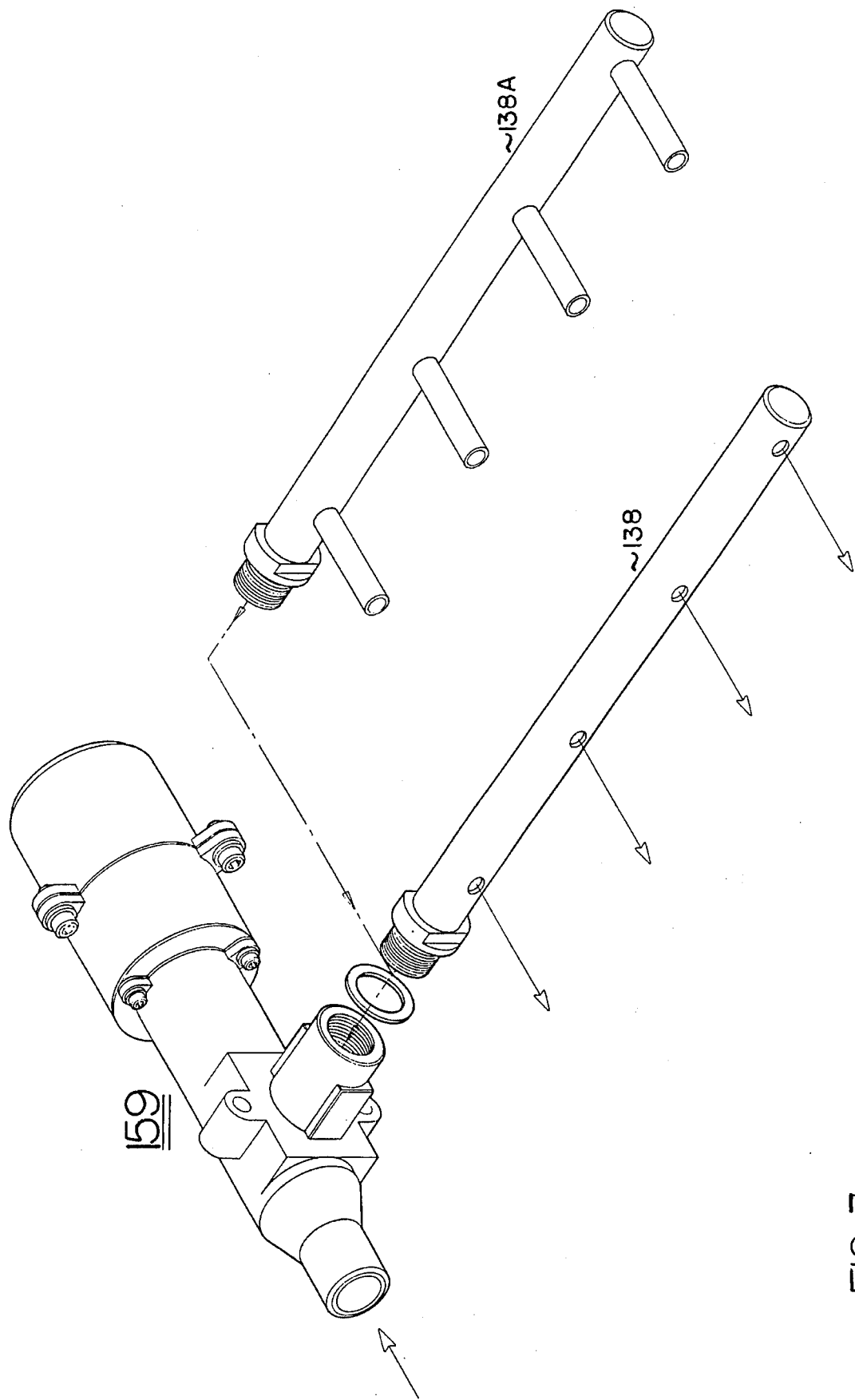

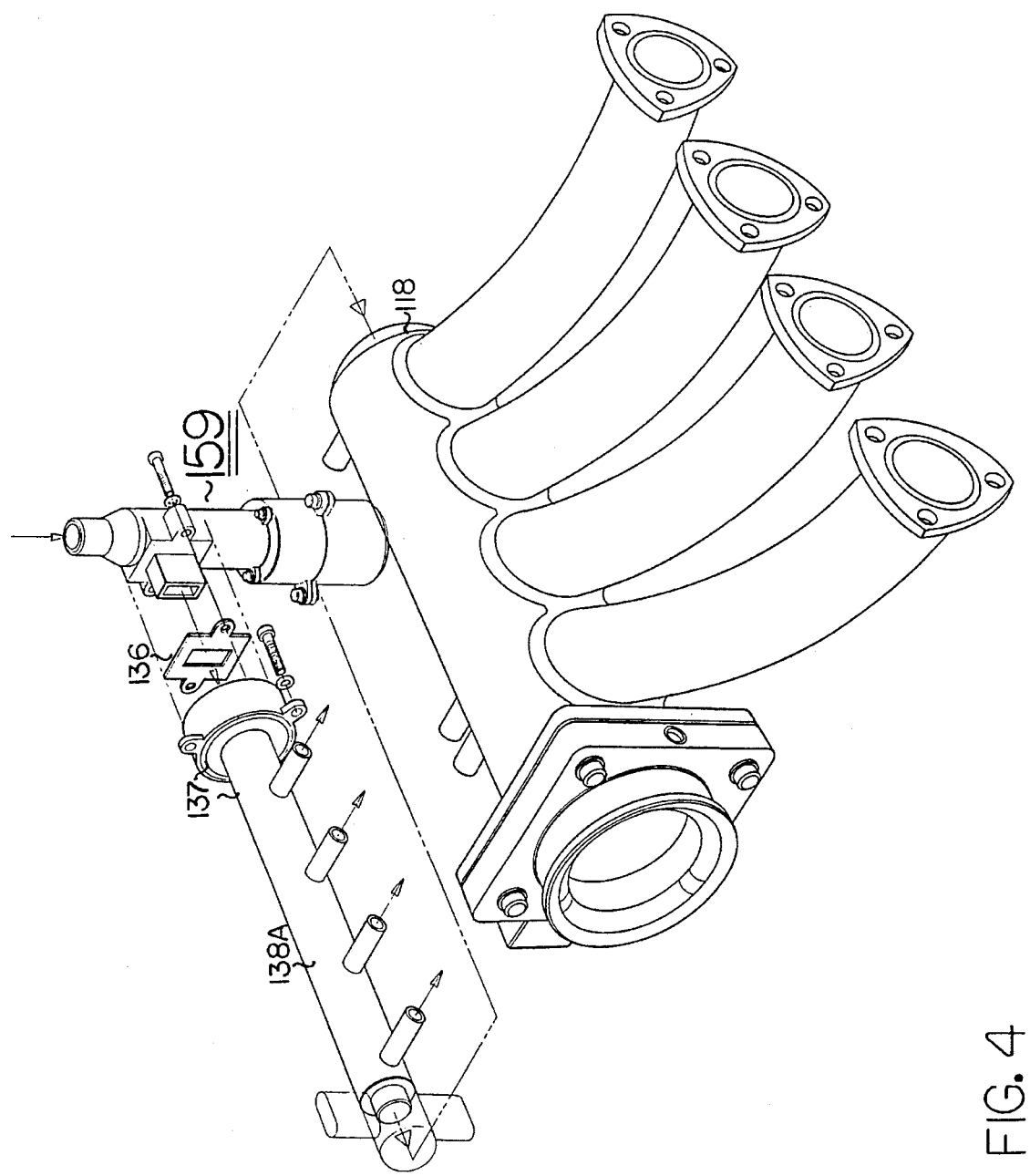

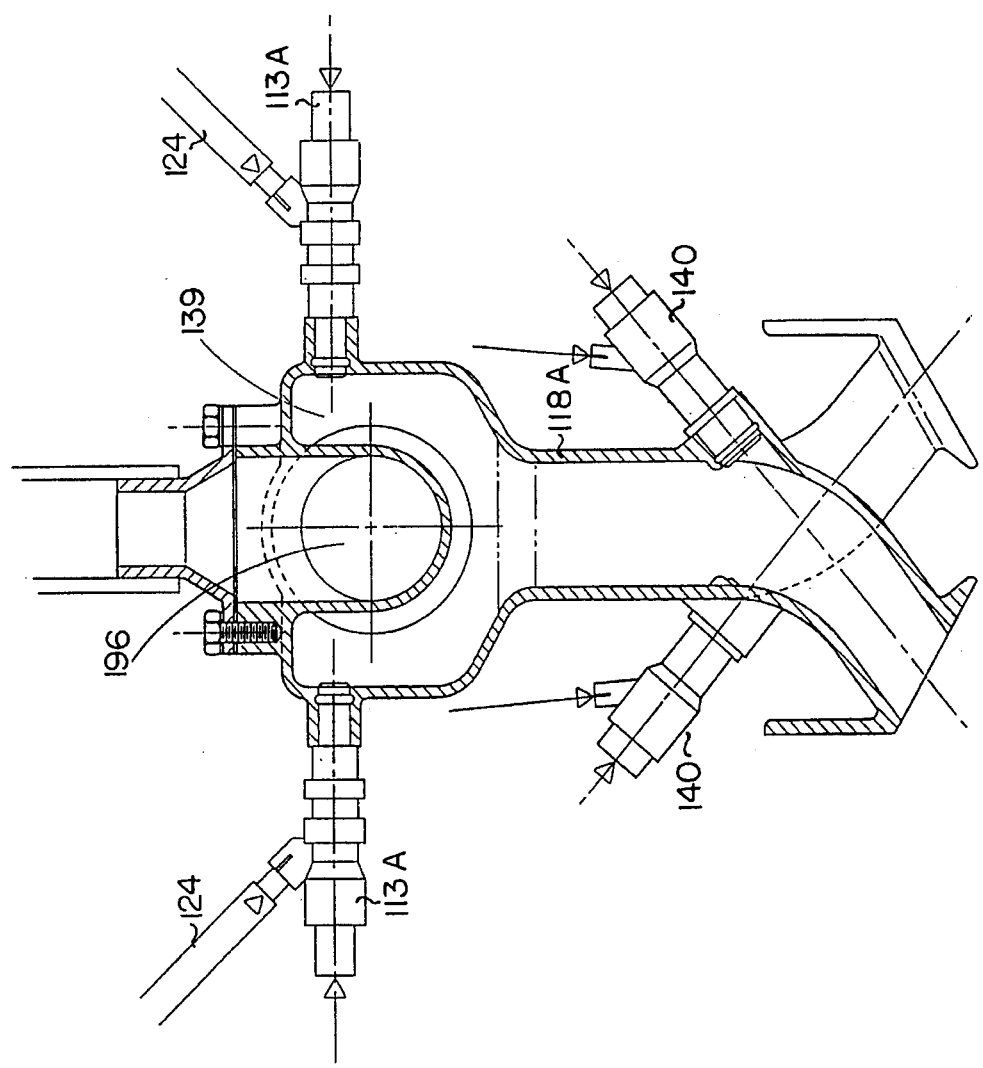

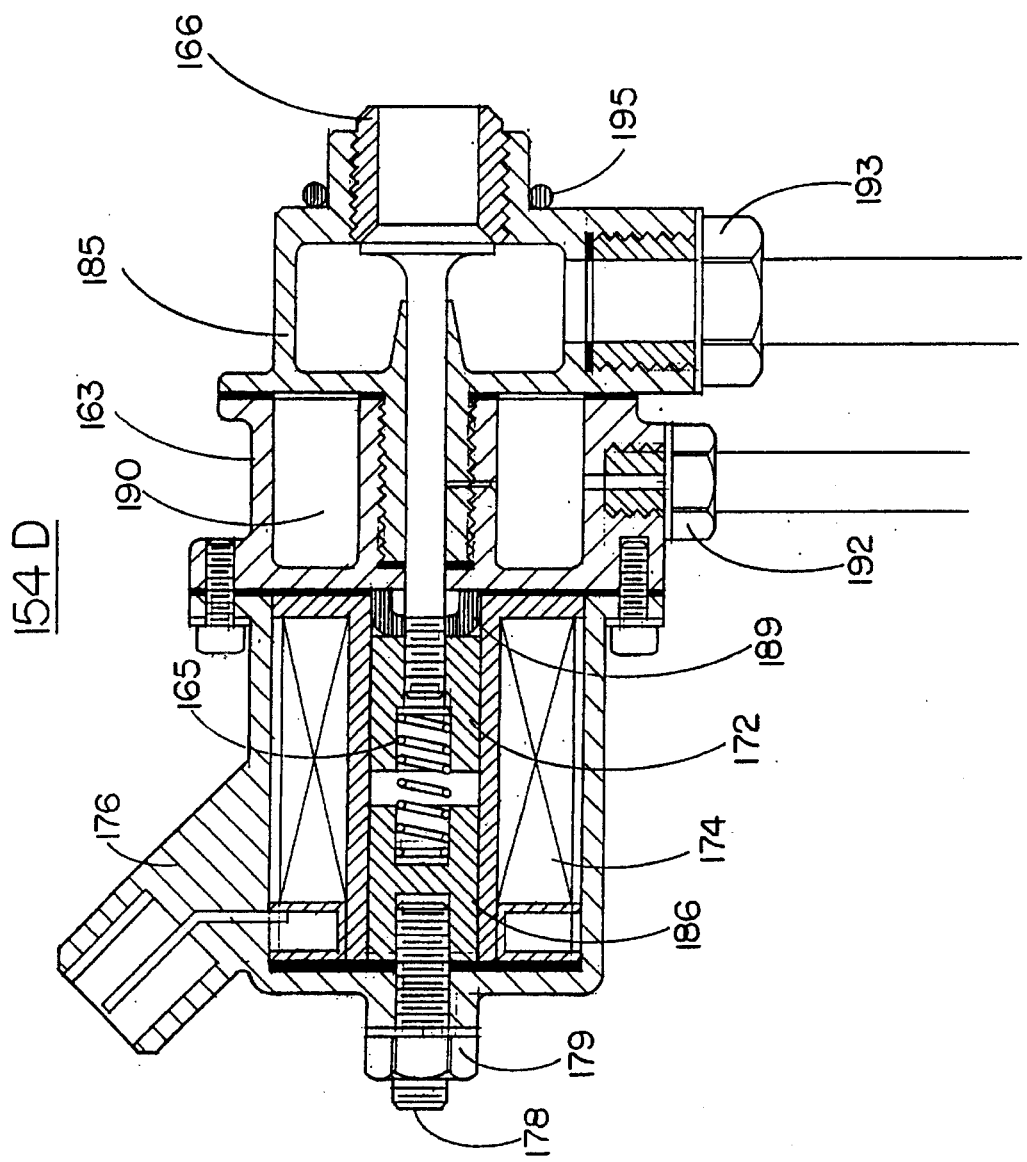

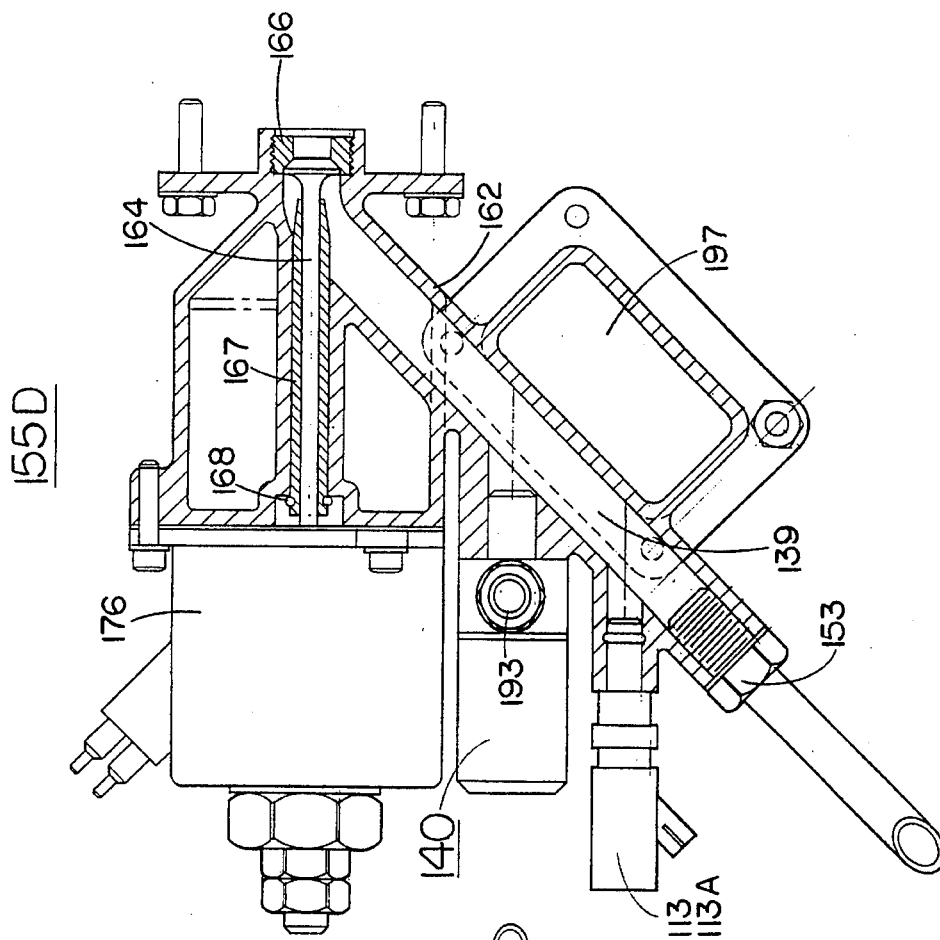
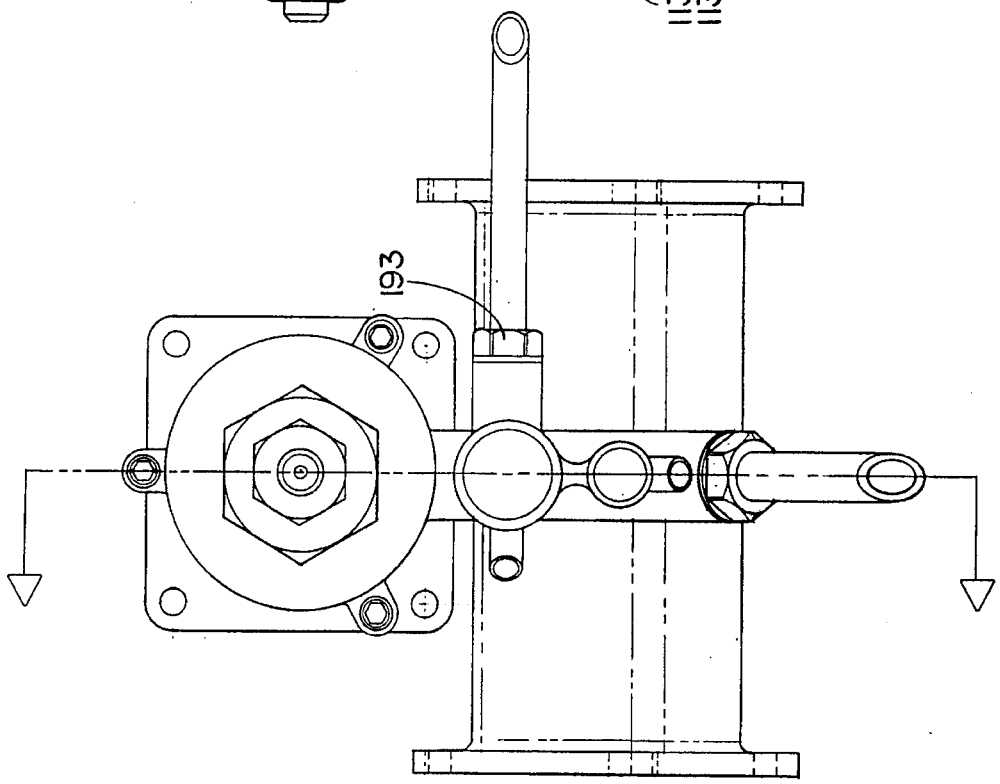
FIG. 27B
FIG. 27A

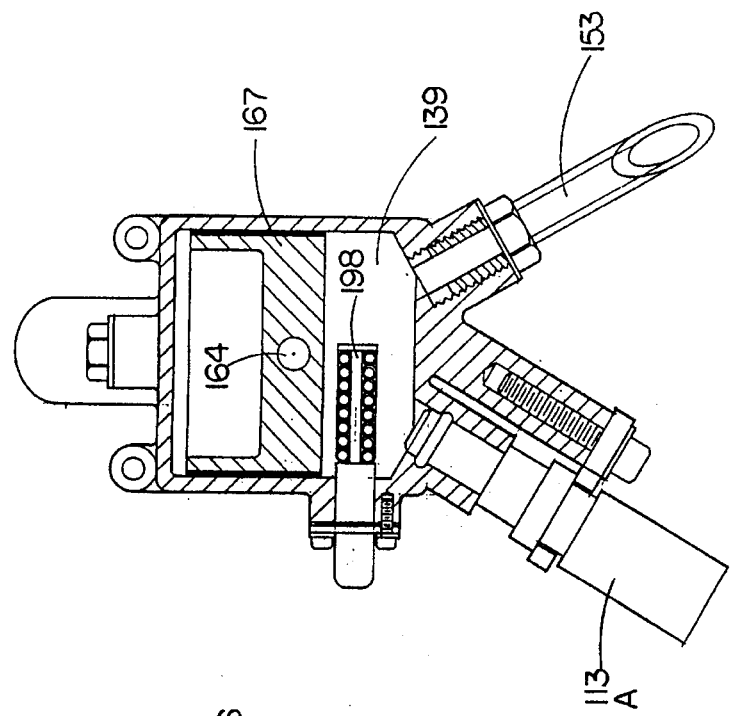
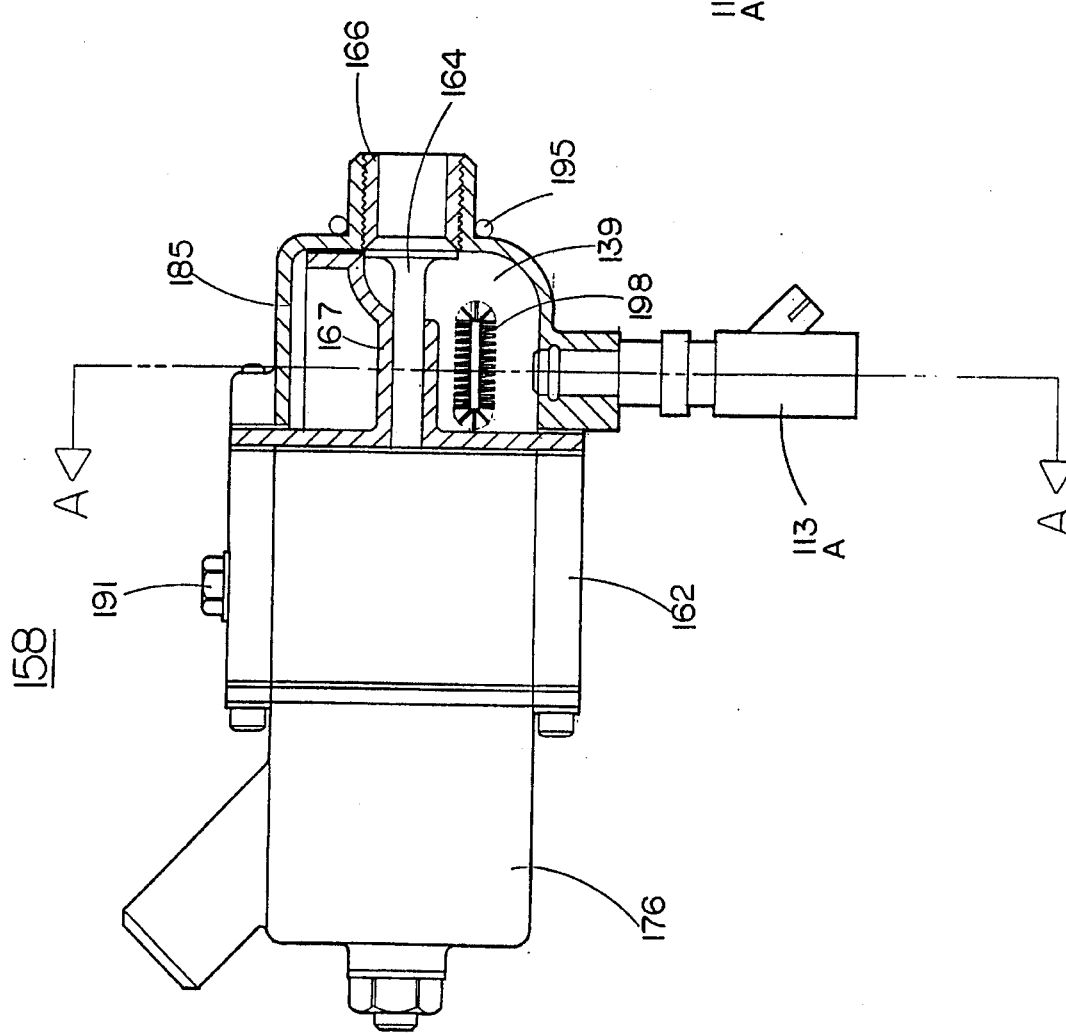
FIG. 29A
FIG. 29B

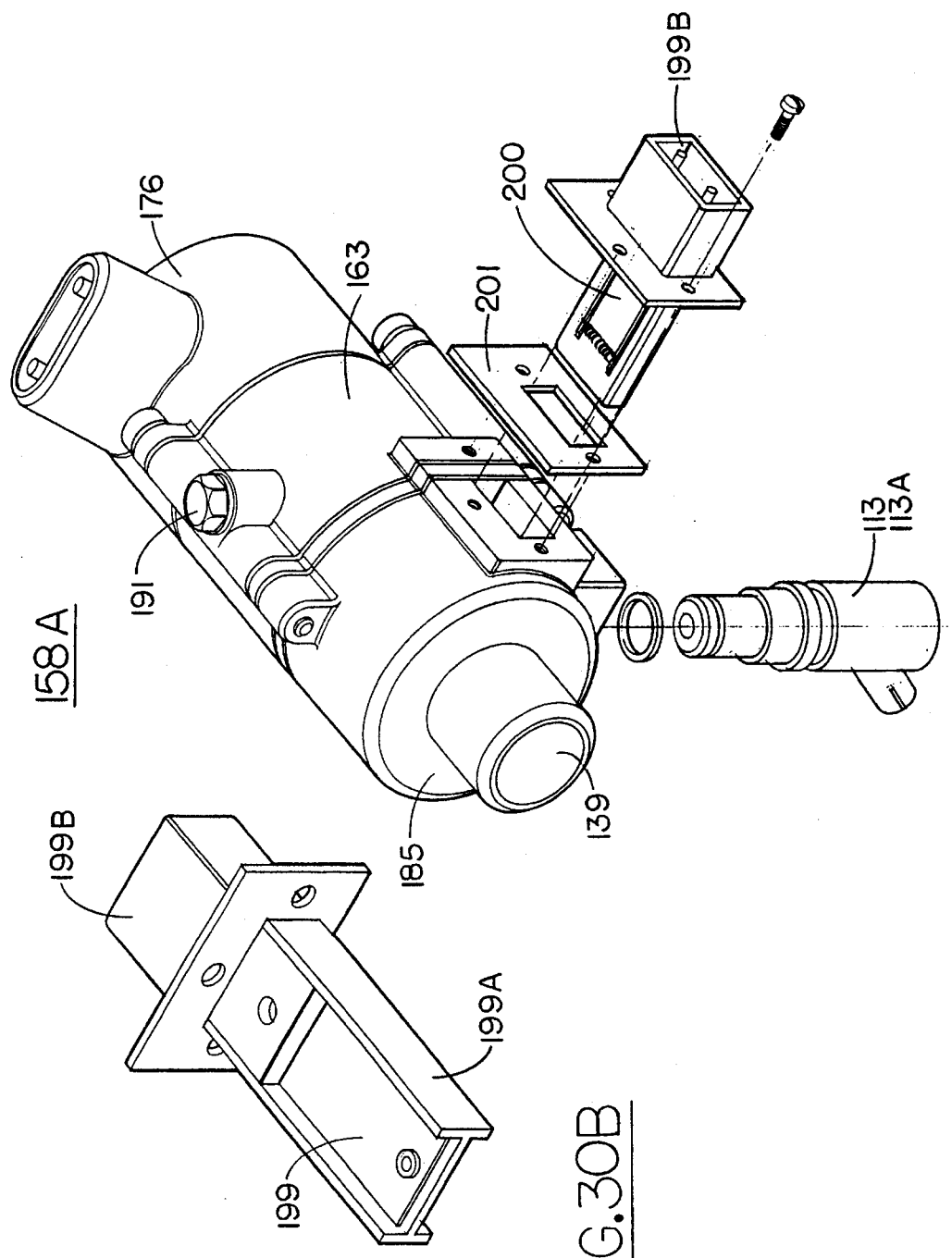

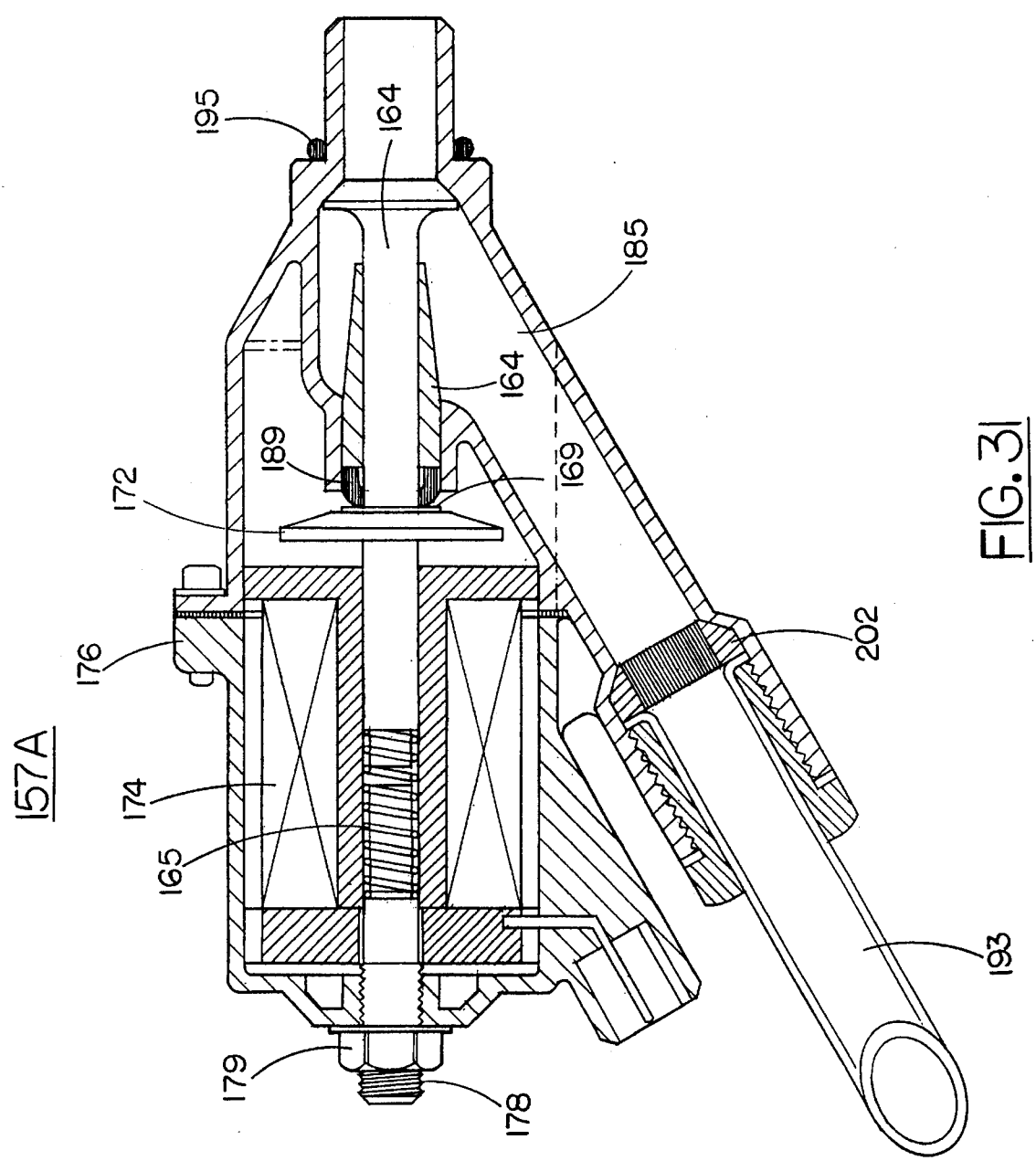

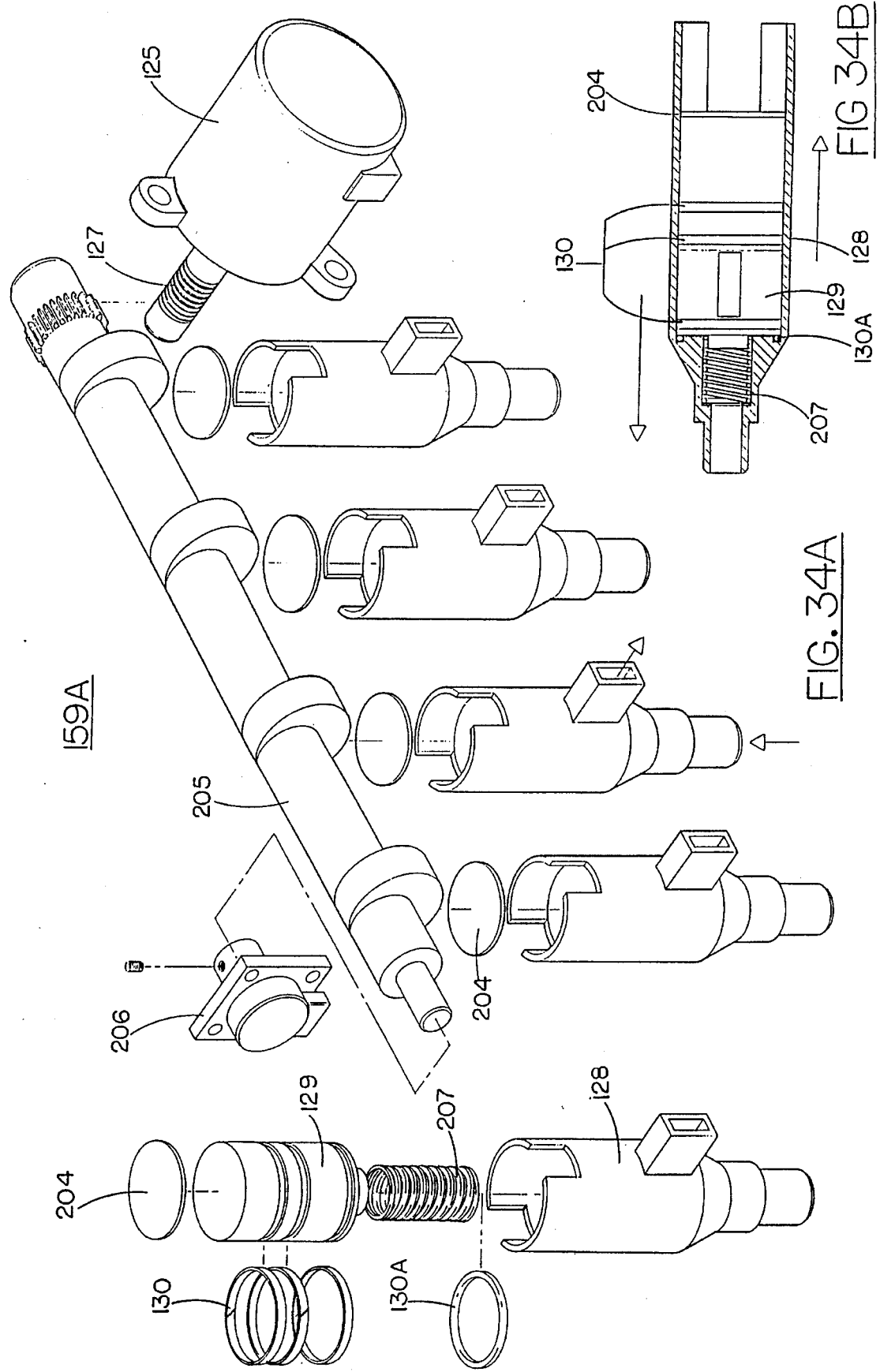

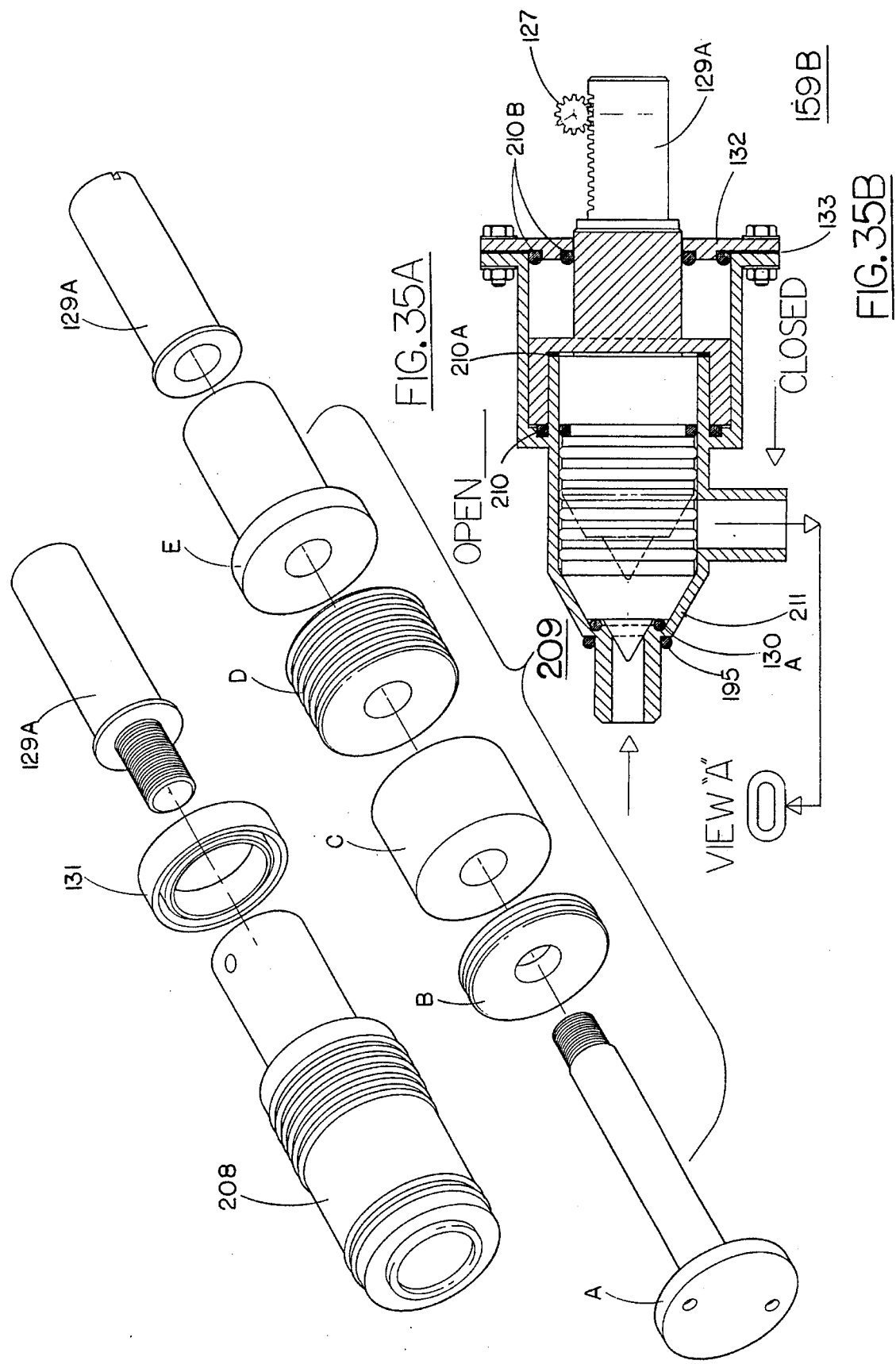

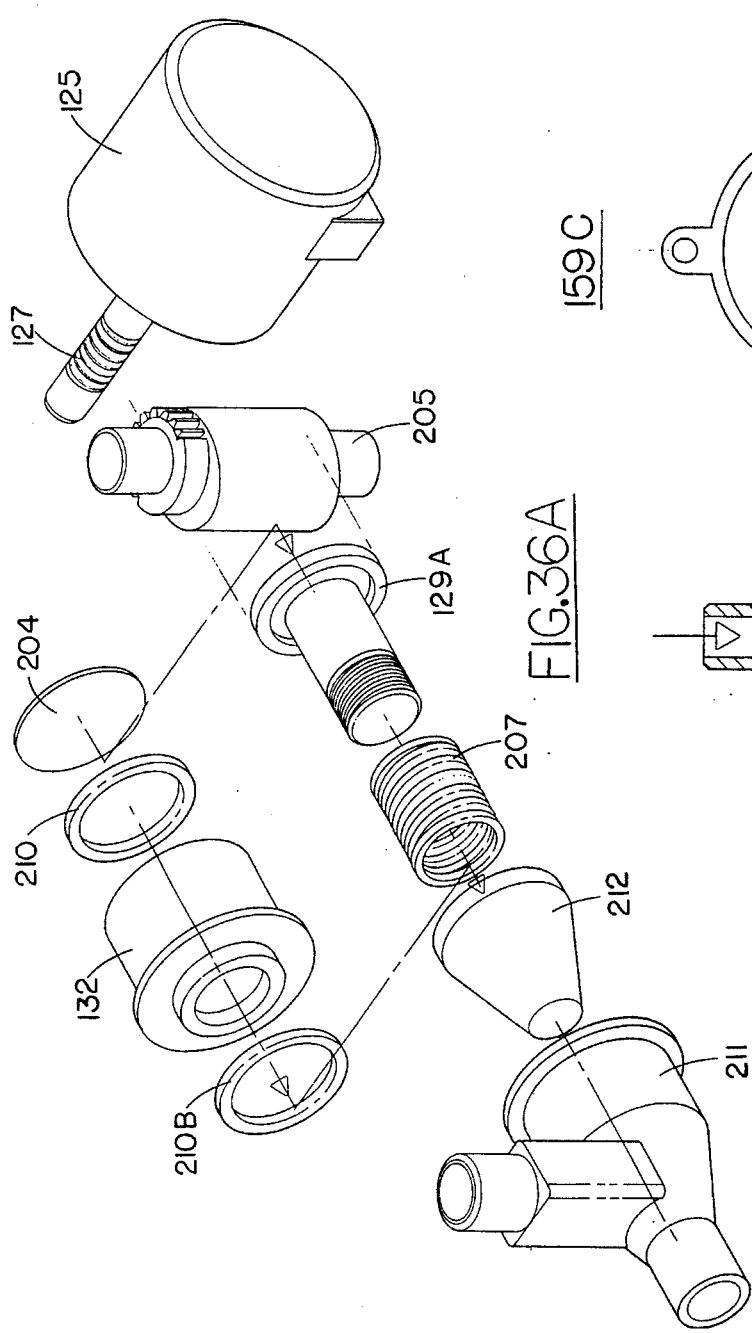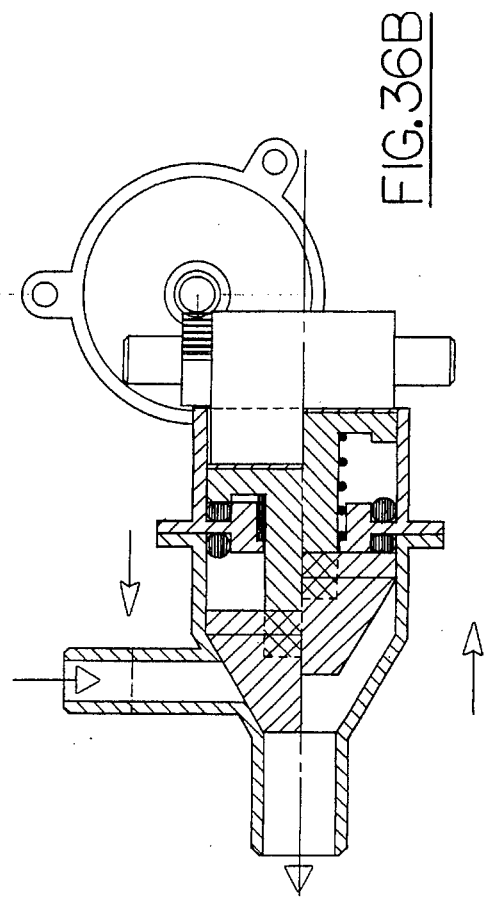

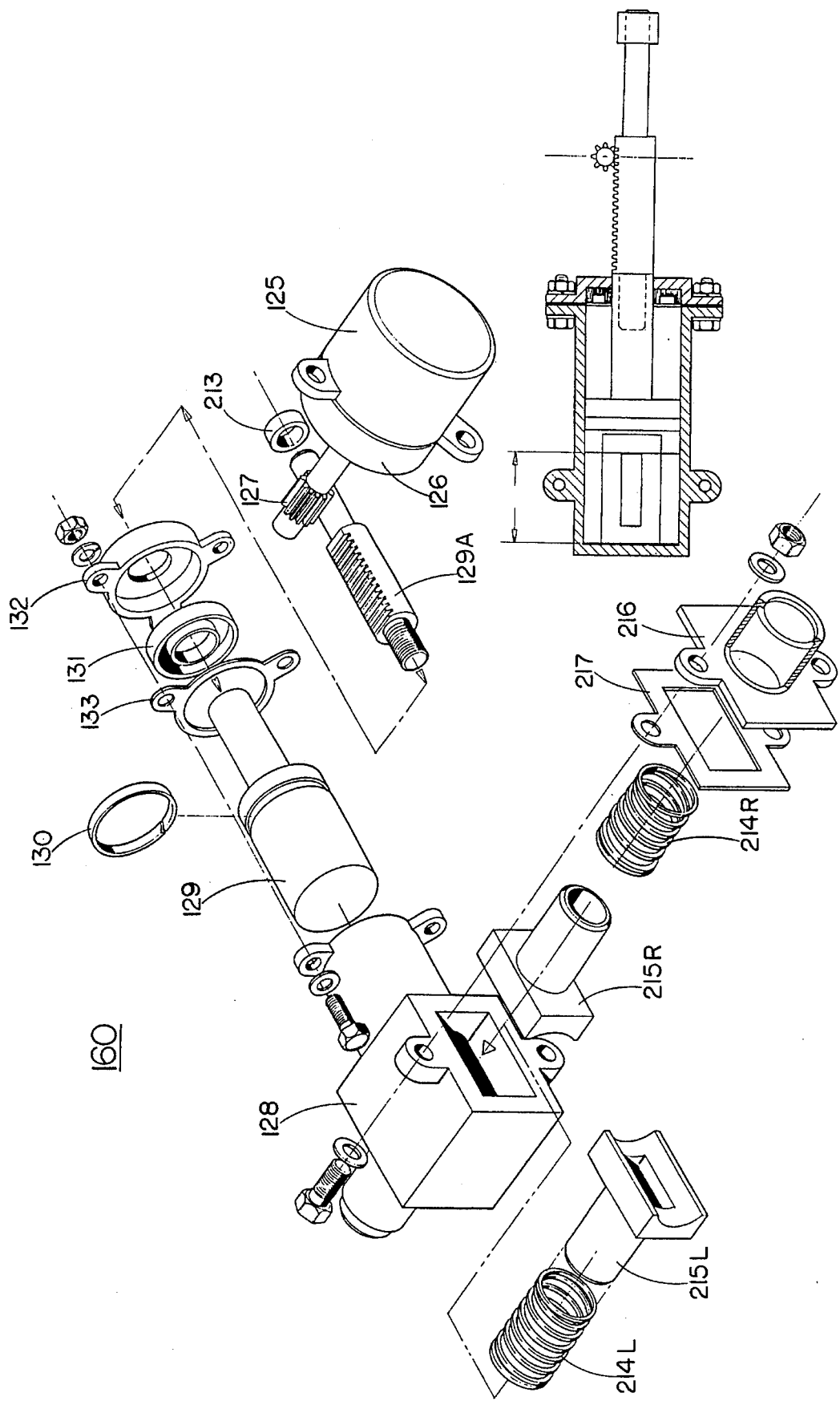

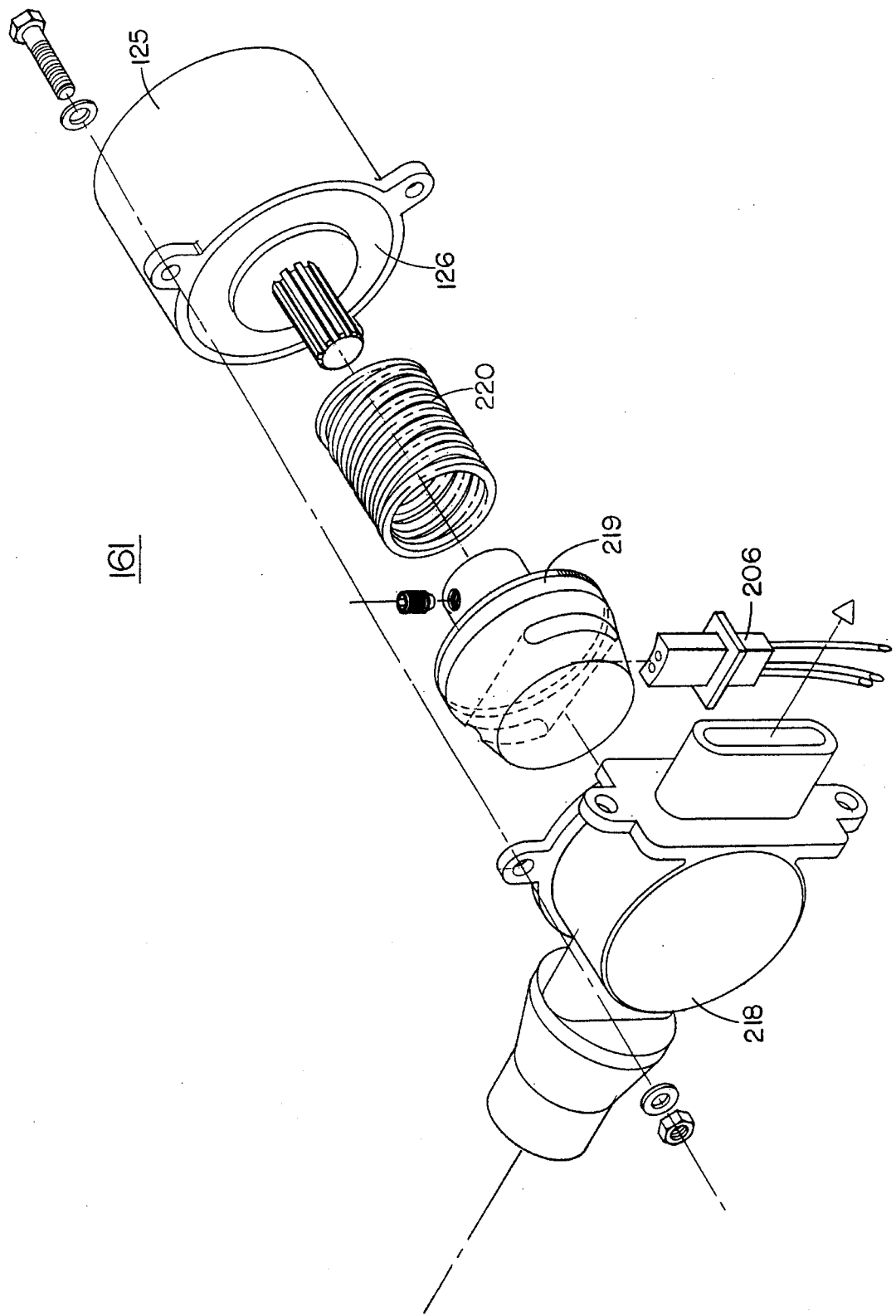

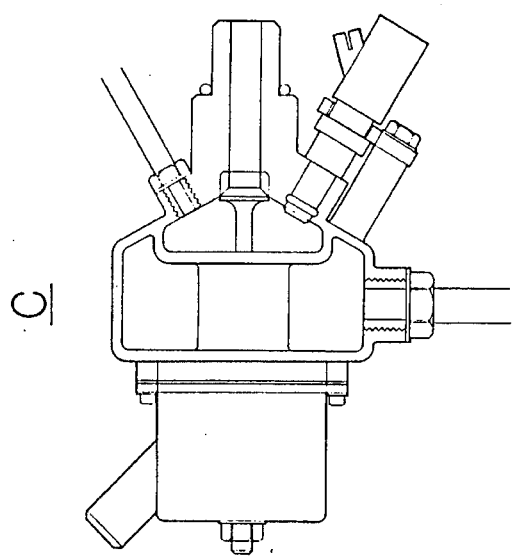
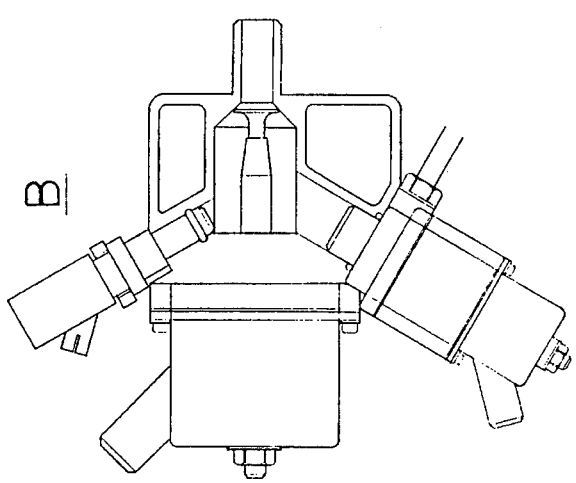
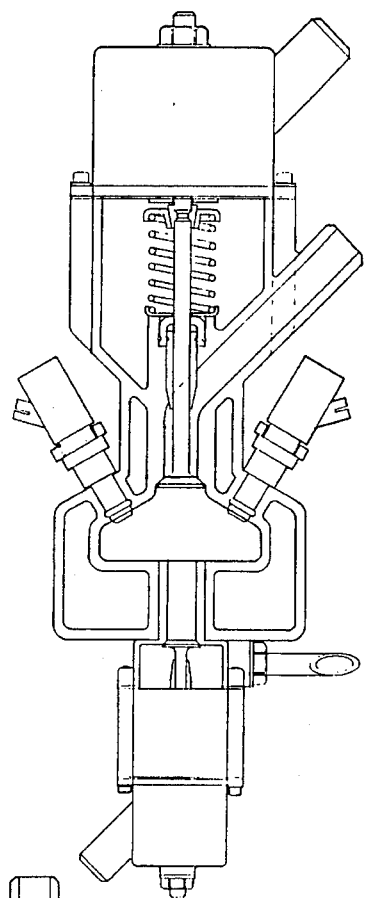
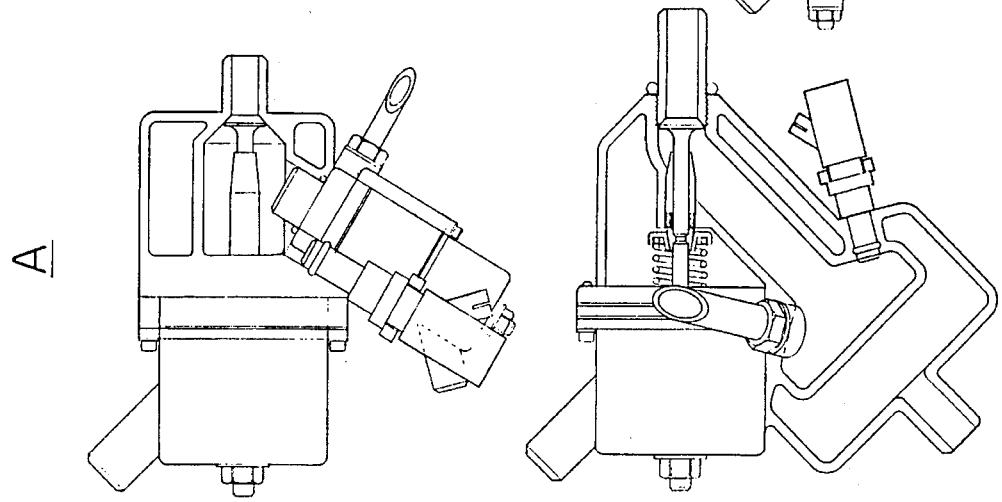
FIG. 41

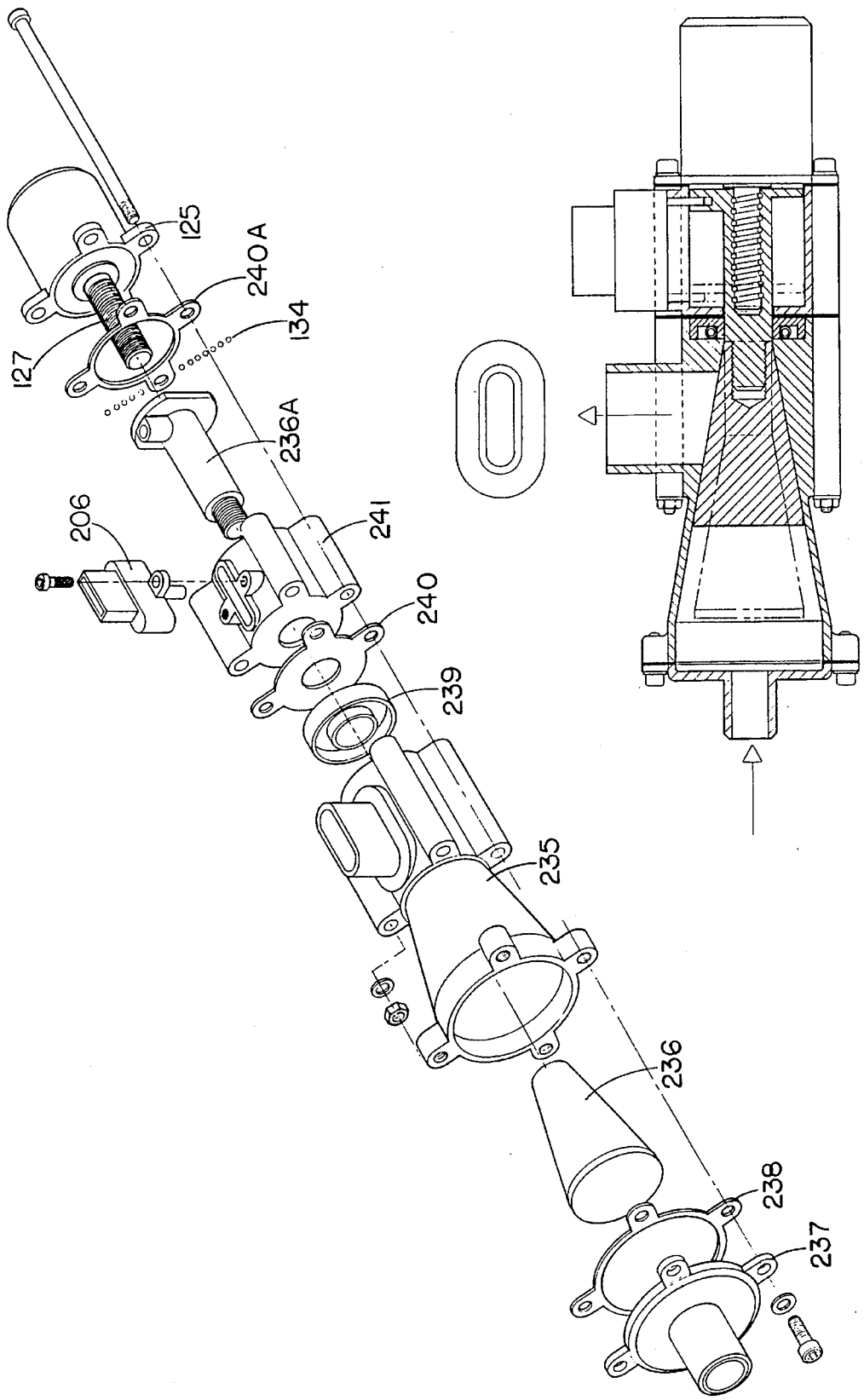

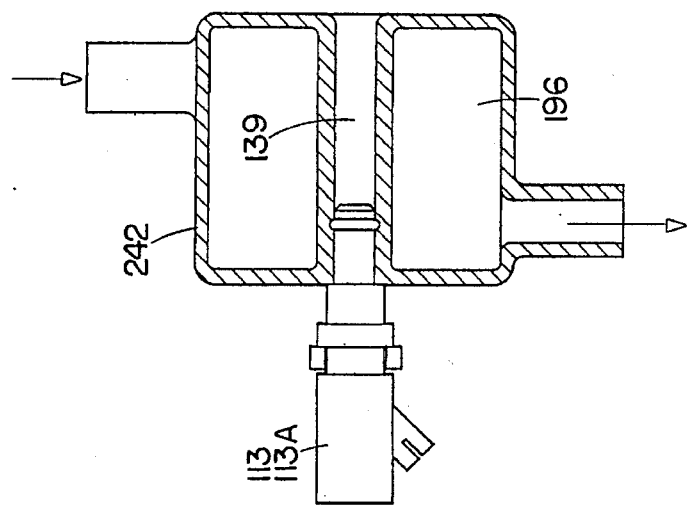
FIG.45B
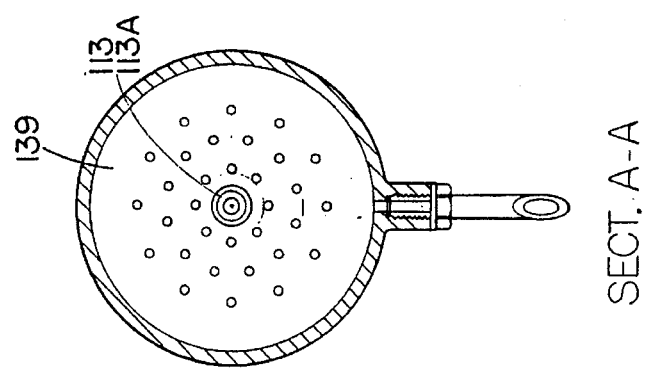
SECT.A-A
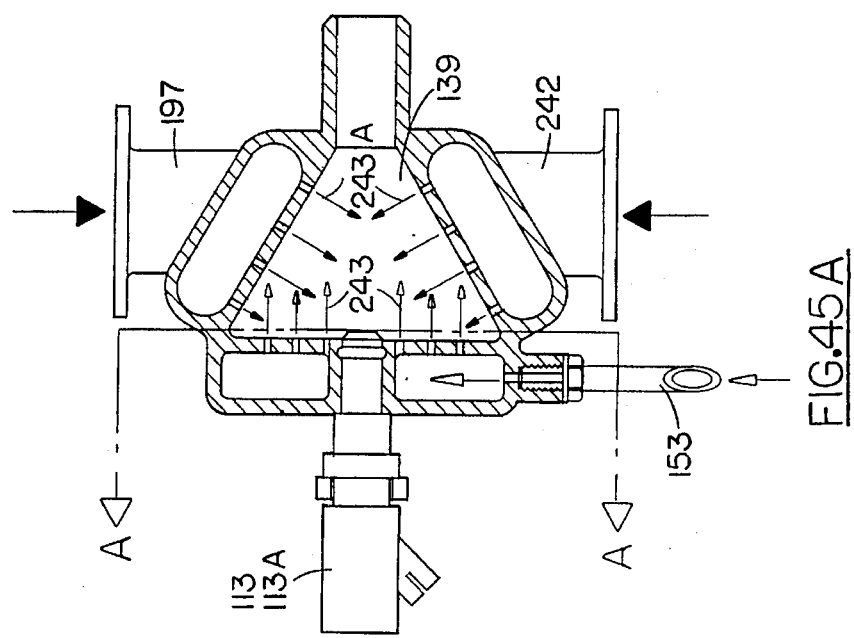
FIG.45A

PLURAL FUEL SYSTEM FOR INTERNAL COMBUSTION ENGINE

BACKGROUND OF THE INVENTION

This invention involves fuel systems for internal combustion engines. A multitude of fuels have been used in internal combustion engines, including Gasoline, Propane, C.N.G. and L.N.G. (compressed and liquefied natural gas) methanol, ethanol, and hydrogen. Each of these fuels has advantages and disadvantages in their specification and use. For example, variables such as octane rating, energy content (BTU/gallon yield), flame travel velocity, storage, and refueling ease and safety, toxicity, and combustion by-product production best serve certain engine load and vehicle use scenarios, but remain a compromise in actual application.

Until now, various attempts have been made to address this problem: by using switchable fuel supplies, which are used as alternatives, such as described in U.S. Pat. Nos. 4,489,699 to Poehlman, 4,492,207 to Hallberg, or 4,535,728 to Batchelor; or by a liquid and gaseous fuel system where the selection and amount of each fuel may vary (but due to having a mechanical injection pump with only two positions, not variably or quickly enough to satisfy engine demand in real time, or change liquid fuel to gaseous form), such as described in U.S. Pat. No. 4,641,625 to Smith; or by injecting two liquid fuels, either in sequence (one to start and run a cold engine, the other to run the engine at operating temperatures), such as described in U.S. Pat. Nos. 4,546,732 to Mae and Miyauchi or 4,936,280 to Langlois; or by the phased injection into a Diesel engine of two liquid fuels of supplemental chemical properties, such as hydrogen and carbon content (e.g., alcohol and gasoline), such as described in U.S. Pat. No. 4,876,988 to Paul. There have also been attempts to aid the atomization of liquid fuel injectors, or the vaporization of carburetor or fuel injection outputs, all of which have demonstrated limitations which the present invention avoids or minimizes. The incomplete atomization of fuel injector output is primarily responsible for fuel droplets that are not reduced to a single molecule, which can then bond to a single molecule of oxidizer. Because of this incomplete combustion, unburned fuel is wasted and becomes an airborne pollutant in the form of unburned hydrocarbons (HC). Present fuel systems are inefficient because they cannot respond in real time to engine load requirements by changing the state of liquid fuels to a gaseous state, as required, or burn a second (or third) liquid or gaseous fuel, or alter the effective compression ratio of the engine cylinders, or precisely meter additional air into the engine, as fuel supplies, engine demands, and operating conditions dictate. To compensate for their compromised combustion characteristics, present fuel systems employ such add-on devices as catalytic converters and E.G.R. (exhaust gas recirculation), to control such pollutants as carbon monoxide (CO), oxides of nitrogen (NOx), and unburned hydrocarbons (HC). The present invention also offers increased safety, because the fuel cylinder which contains natural gas or methane can be made smaller, stronger, and lighter. Since this fuel cylinder is smaller, it may also be re-charged more quickly, and, in fact, is designed to be charged overnight (in 3 to 5 hours), by a small gas compressor which is connected to residential or business gas mains. This feature enables the vehicle to be available the next morning for "typical" commuting distances of 30–50 miles (round trip). Because of this, it is entirely conceivable that drivers would never use gasoline supplies, except for long distances (even the 30–50 mile limitation could be avoided by the installation of parking facility refueling stations). Because methane can be easily substituted for natural gas, garbage, sewage, biomass wastes, and other non-strategic resources can be used to produce methane, reducing landfill and sewage treatment environmental pollutants. Finally, the present invention easily adapts to the present generation of automobiles, with their heavy investments in technology and tooling, as well as their demonstrated consumer appeal.

SUMMARY OF THE INVENTION

This invention aims at plural fuel systems made simple enough and practical enough to improve the efficiency of an internal combustion engine. It involves variable supplies of a plurality of liquid and gaseous fuels that differ from each other in fuel characteristics and are usable both independently and in variable mixtures for delivery to the engine. Sensors are arranged for sensing engine operation parameters, load conditions, and fuel availability; and a processor having access to optimum engine operating parameters communicates with the sensors and selects available fuels and fuel delivery rates to approximate the optimum engine operating parameters at actual engine speeds and loads in real time. Such plural fuel systems can include a compressor controlled by the processor for variably delivering compressed air to the engine for adjusting the effective compression ratio and charge density to meet the combustion needs of the fuel, or fuel mixture being delivered. Also, for liquid fuels, the invention involves a fuel vaporizing system for vaporizing a liquid fuel before intake into the engine. Such a vaporization system can include a vaporization chamber in communication with an intake valve of the engine and arranged for vaporizing liquid fuel before intake into the engine. Many different combinations of plural system elements such as processor control, compressor variation of compression ratio, and pre-intake vaporization of liquid fuels are possible according to the invention to approximate optimum engine performance with the different fuel and fuel mixtures available.

BRIEF DESCRIPTIONS OF THE DRAWINGS

FIG. 2A is an exploded view of the first embodiment of a full-capacity "L"-flow gas regulation valve, as would be used in FIG. 1.

FIG. 2B is a sectioned side view of valve 159 showing the size and shape of the parts discussed in FIG. 2A as assembled.

FIG. 3 is a perspective view of the first embodiment of a "L"-flow gas regulation valve, as it fastens to a gas distribution manifold with either orifice or tube gas outlets, as would be used in FIG. 1 (with six gas outlets).

FIG. 4 is a perspective view of the first embodiment of a "L"-flow gas distribution valve, as it is installed in the intake plenum of a four-cylinder engine.

FIG. 5 is a cross section view of another embodiment of the multi-fuel systematic, schematic illustration in FIG. 1, but shows only the intake manifold, two staggered liquid fuel injectors in a heated vapor chamber, and two staggered gas injectors in the intake runners.

FIG. 26 is a sectioned view of yet another embodiment of a multi-capacity universal gas injector, which utilizes the engine's oil supply for lubrication.

FIG. 27B is a sectioned view illustrating yet another embodiment of a multi-capacity dedicated gas injector with an exhaust-heated vapor chamber, and vapor ejection by a partial capacity gas injector and compressed air.

FIG. 27A is an end view of gas injector 155D, showing the size and location of parts discussed in FIG. 27B.

FIG. 29A is a sectioned view of the first embodiment of a full-capacity dedicated gas injector with a fuel injector, an electrically heated coil, and compressed air vapor ejection.

FIG. 29B is a sectioned front view of gas injector 158, showing the size and location of parts discussed in FIG. 29A.

FIG. 30A is a perspective view of another embodiment of a full-capacity dedicated gas injector with a fuel injector, and an electrically-heated strip or infra-red bulb.

FIG. 30B is a perspective view of an alternative vaporizing element, with an electrically-heated metal strip.

FIG. 31 is a sectioned view of another embodiment of a full-capacity universal gas injector with a replaceable filter.

FIG. 34A is an exploded view of another embodiment of a full-capacity "L"-flow gas regulation valve in a plural assembly.

FIG. 34B is a sectioned view of a "L"-flow valve showing the size and shape of the parts discussed in FIG. 34A as they are assembled.

FIG. 35A is an exploded view of the construction details of two gas valve piston designs.

FIG. 35B is a sectioned view of a further embodiment of a full-capacity "L"-flow gas regulation valve designed for metering and sealing hydrogen fuel.

FIG. 36A is an exploded view of still another embodiment of a full-capacity "L"-flow gas regulation valve.

FIG. 36B is a sectioned view of valve 159C showing the size and shape of parts discussed in FIG. 36A as they are assembled.

FIG. 37A is an exploded view of the first embodiment of a full-capacity, cross-flow gas regulation valve.

FIG. 37B is a sectioned view of valve 160 showing the size and shape of parts discussed in FIG. 37A as they are assembled.

FIG. 38 is an exploded view of the first embodiment of a full-capacity, cross-flow, rotary gas metering valve.

FIG. 41 is an illustration of five designs for dedicated gas injectors which further demonstrate in-valve vaporization chambers and combinations of vapor ejection techniques.

FIG. 43A is an exploded view of the first embodiment of a full-capacity, tapered-piston, in-line flow, gas regulation valve.

FIG. 43B is a sectioned view of taper valve showing the size and shape of parts discussed in FIG. 43A as they are assembled.

FIG. 45A is a sectioned view of a further embodiment of an open-nozzle vapor chamber.

FIG. 45B is a sectioned view of still another embodiment of open nozzle vapor chamber.

Following the description of the embodiments is a parts list of all of the components of the system.

DETAILED DESCRIPTION OF THE EMBODIMENTS

Figure 1:
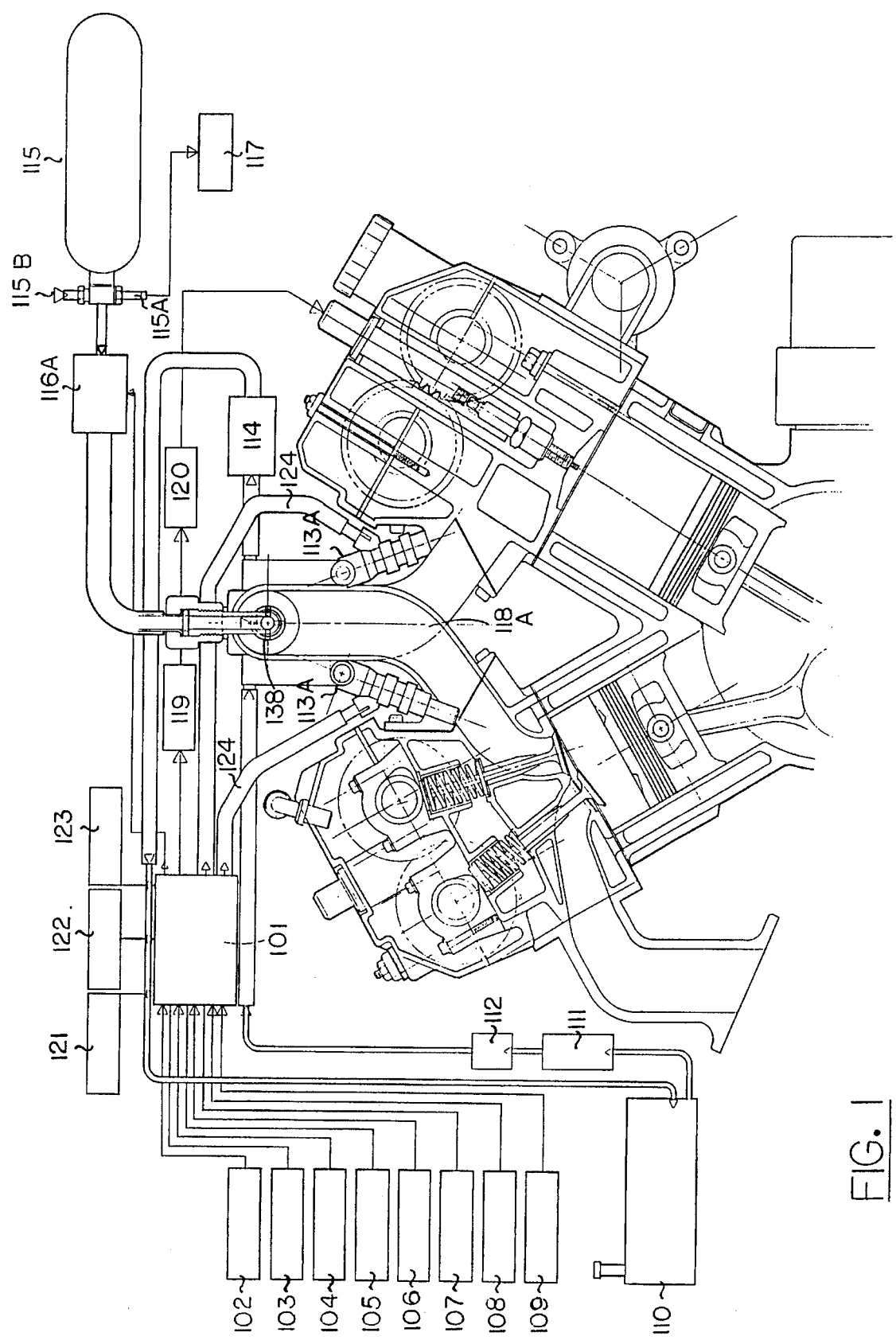
FIG. 1 is a systematic, schematic illustration of the first embodiment of a multi-fuel storage, control, and distribution system for a V-6 engine, with multi-point gas and liquid fuel injection.

With reference to the drawings:

FIG. 1 is a systematic, schematic illustration of the first embodiment of a multi-fuel system for an internal combustion engine. The components of the system are under the control of an electronic management unit 101, which receives inputs from a series of condition sensors 102–109. A knock sensor 102 detects detonation (pre-ignition), a throttle position sensor 103 detects the throttle plate angle, a R.P.M. sensor 104 detects engine revolutions/minute, a sync pulse detector 105 detects a timing mark, a M.A.P. (manifold absolute pressure) sensor 106 detects engine load, a oxygen sensor 107 detects the presence of oxygen in the exhaust gases, an air temperature sensor 108 detects ambient air temperature, and a coolant temperature sensor 109 detects engine coolant temperature. These inputs are compared to operational parameters supplied from R.O.M. maps 121, 122, 123, which store data for different fuel-air mixture scenarios.

Liquid fuels are stored in a fuel tank 110 and fed by a fuel pump 111 to a fuel filter 112 and thence to a multi-point fuel injector 113A. Fuel system pressure is regulated by a fuel pressure regulator 114, which returns excess fuel to fuel tank 110. Compressed gaseous fuel is stored in a gas cylinder 115, whose level (pressure) is measured by a gas cylinder pressure sensor 115A, and displayed on a gas cylinder level display 117. Gas cylinder 115 is re-filled by a gas cylinder charging valve 115B. A gas pressure and flow regulator 116, controlled by C.P.U. 101, regulates the flow of gaseous fuel into a gas distribution manifold 138 or 138A, which is mounted in an intake manifold 118A. Electronic management unit 101 adjusts the output of an electronic spark advance unit 119, to produce optimal spark advance curves for each of the fuel-air mixture scenarios. The outputs of the spark advance unit 119 are low voltage electrical signals to the ignition coil 120, which supplies high voltage to the spark plugs. Each multi-point fuel injector 113A receives signals from electronic management unit 101 through a fuel injector signal cable 124.

FIG. 2A is an exploded view of the first embodiment of a full-capacity "L"-flow gas regulation valve (see FIG.S. 1–4). The parts which comprise valve 159 are a valve housing 128, which admits gaseous fuel through an end entry port and expels it through an elongated side exit port. A sliding piston 129 progressively covers or uncovers the exit port and thereby regulates the flow of gaseous fuel through housing 128. Piston 129 is equipped with two sealing rings 130, which prevent gas from escaping past piston 129. A piston O-Ring 130A provides additional gas sealing between piston 129 and housing 128, when the piston is in the closed (forward) position. A rear seal 131, retained by a rear housing 132, seals a piston drive shaft 129A against further gas leaks. A rear housing gasket 133 seals rear housing 132 to valve housing 128. A motor output shaft gear 127 drives piston 129 through corresponding tracks on the inside of piston drive shaft 129A, which is equipped with a collar to prevent piston 129 from rotating. Recirculating ball bearings 134 transmit the drive loads between gear 127 and piston shaft 129A in a low-friction action. A stepper motor 125 drives piston 129 back and forth in housing 128. A piston position sensor 206 provides linear position data to electronic management unit 101 (not shown), which also controls stepper motor 125. FIG. 2B is a side section view of valve 159.

FIG. 3 is a perspective view of "L"-flow gas regulation valve 159, as it fastens to a gas distribution manifold 138 or 138A. These manifolds are equipped with either jets (138) or tubes (138A), which distribute gaseous fuel from valve 159 to the opening to each intake manifold runner.

FIG. 4 is a perspective view of "L"-flow gas regulation valve 159 mounted to a gas distribution manifold 138A, which employs a different manifold mount and an O-ring seal (137) from those seen in FIG. 3.

FIG. 5 is a cross section of another embodiment of the multi-fuel systematic schematic illustration in FIG. 1, but illustrates only an intake manifold 118A, two multi-point fuel injectors 113A, a coolant-heated 196 vapor chamber 139 (vapor extraction by vacuum), and two partial-capacity gas injectors 140.

Figure 6B:
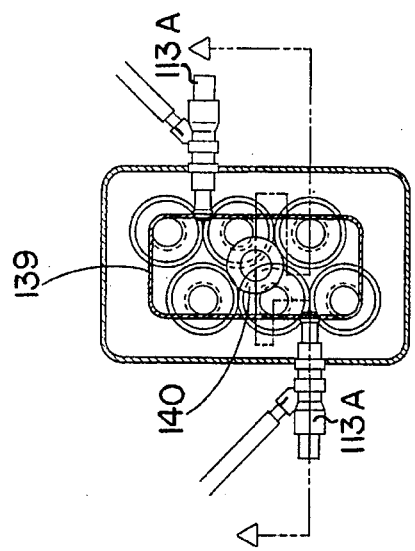
FIG. 6B is the top view of FIG. 6A showing the vapor chamber, the vapor tubes, and the intake manifold runners.
Figure 6A:
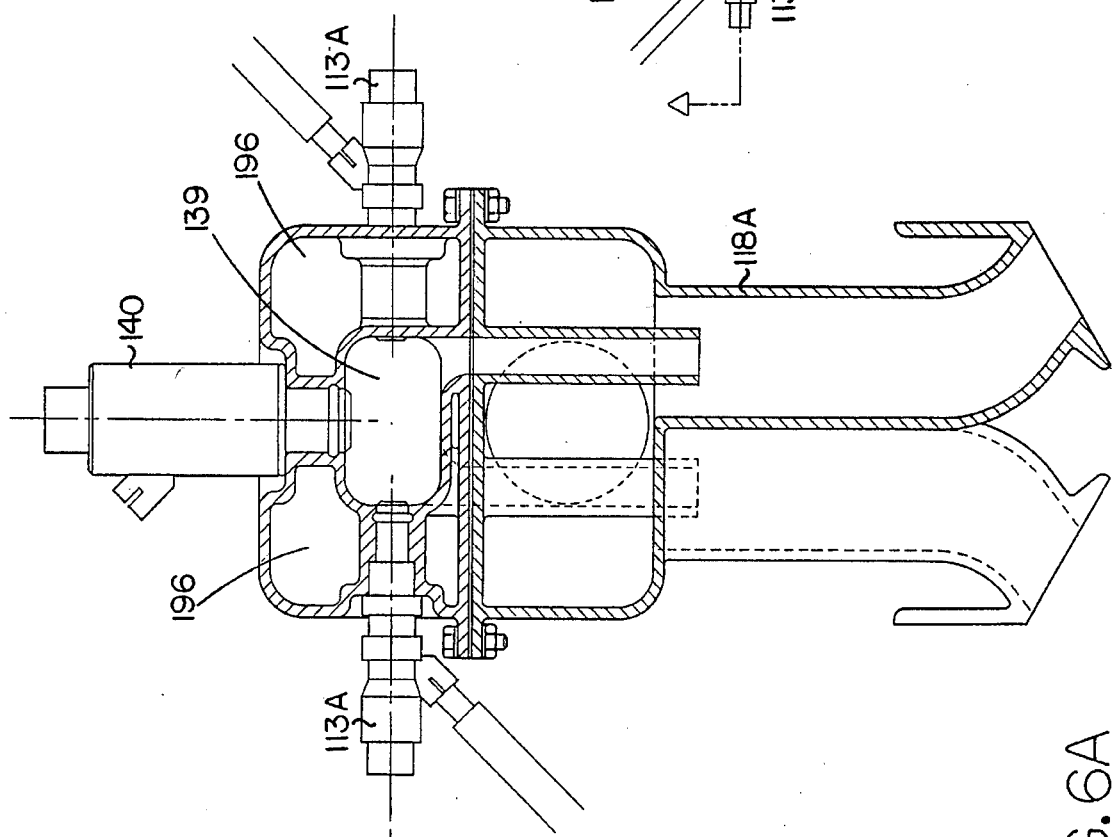
FIG. 6A is a cross section of a further embodiment of the multi-fuel systematic illustration in FIG. 1, but shows only the intake manifold, two staggered liquid fuel injectors, and a central vapor chamber equipped with vapor tubes which supply each intake runner and a central gas injector.

FIG. 6A is a cross section of a further embodiment of the multi-fuel systematic illustration in FIG. 1, but illustrates only a intake manifold 118A, two multi-point fuel injectors 113A, a coolant-heated 196, vapor chamber 139, with individual vapor tubes (vapor extraction by vacuum), and a central partial-capacity gas injector 140. FIG. 6B is a top view of vapor chamber 139, the runners of intake manifold 118A, and the position of the vapor chamber tubes inside the runners.

Figure 7:
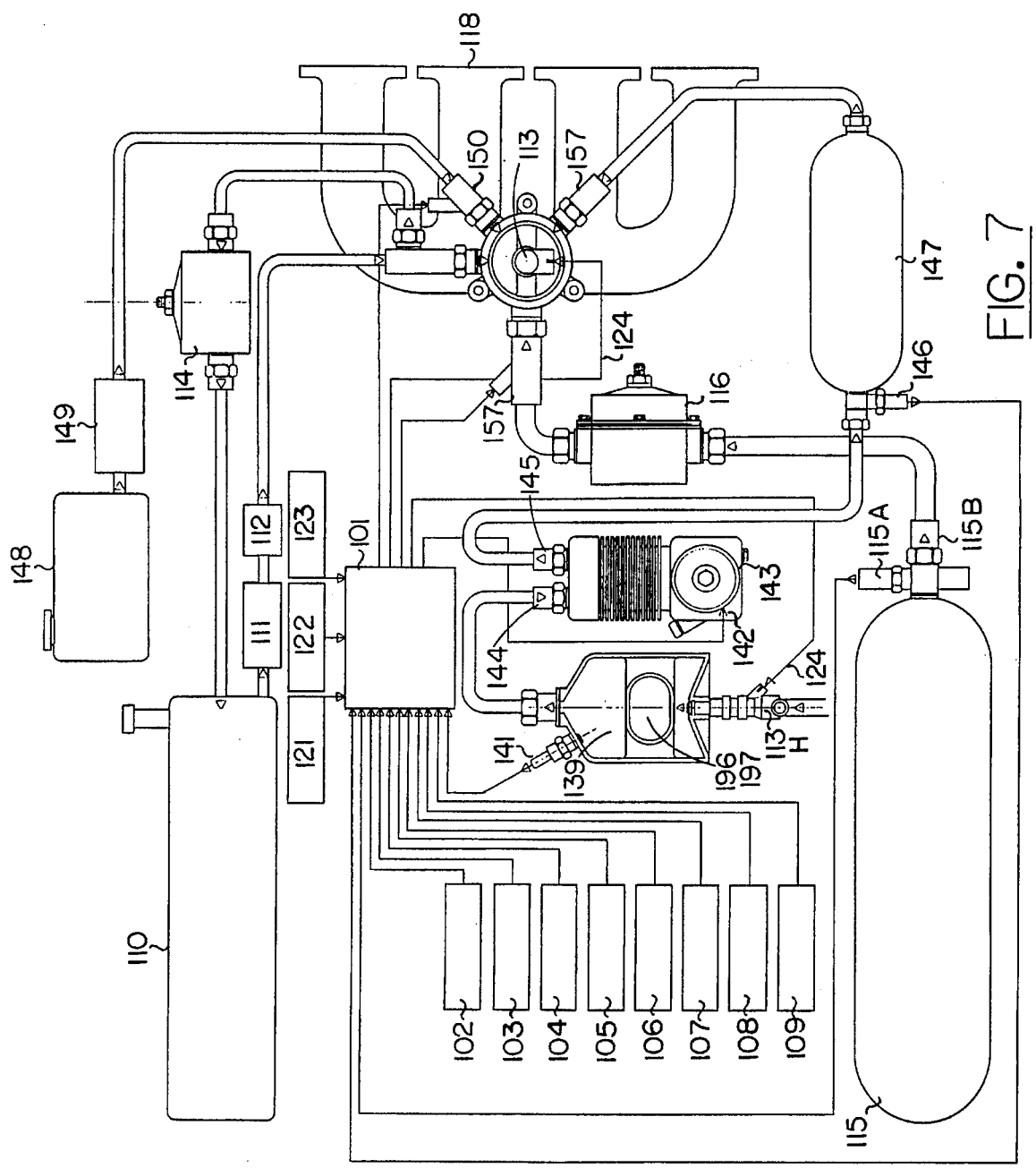
FIG. 7 is a systematic, schematic diagram of still another embodiment of this invention and illustrates the liquid fuel vapor chamber placed before the compressor and a vacuum-flask vapor storage reservoir and CNG cylinder as fuel supplies.

FIG. 7 is a systematic schematic diagram of still another embodiment of this invention. The components of the system are under the control of an electronic management unit 101, which receives inputs from a series of condition sensors, 102–109. A knock sensor 102, a throttle position sensor 103, a R.P.M. sensor 104, a synchronous (sync.) pulse sensor 105, a M.A.P. sensor 106, an oxygen sensor 107, an air temperature sensor 108, and a coolant temperature sensor 109. These inputs are compared to operational parameters supplied from R.O.M. maps 121, 122, 123 which store data for different fuel-air mixture scenarios.

Liquid fuels are stored in a fuel tank 110 and fed by a fuel pump 111 to a fuel filter 112, and thence to a single-point fuel injector 113 (cold engine) or 113H (hot engine). Fuel injectors are controlled for duration (output) and timing by electronic management unit 101, which signals fuel injectors 113 and 113H through fuel injector signal cables 124. Fuel system pressure is regulated by a fuel pressure regulator 114, which returns excess fuel to fuel tank 110. A coolant-heated 196, or exhaust-heated 197 vapor chamber 139, is pressurized with fuel vapor maintained by the output of single-point fuel injector 113. Input from a pressure sensor 141 to the electronic management unit 101 provides partial data to calculate the output of fuel injector 113H. Input from a fuel vapor storage tank pressure sensor 146 to the electronic management unit 101 regulates output of a fuel vapor compressor 143 through an electric compressor clutch 142. A compressor inlet check valve 144 and a compressor output check valve 145 insure that pressurized fuel vapor travels in one direction only. Fuel vapor compressor 143 may also be driven by a stepper motor 125 regulated by engine management unit 101 (not shown) which may replace electric compressor clutch 142, and its attendant belt drive from the engine, and compressor R.P.M. sensor 152. Since compressor 143 is driven by a stepper motor, rather than by the engine, its rotary count position, and therefore the compressor's volumetric output, may be digitally controlled by E.M.U. 101, which also starts and stops vapor compressor 143. Another solution to driving and regulating the volumetric output of vapor compressor 143 replaces stepper motor drive 125, with a standard D.C. motor drive 125A, or an A.C. motor drive 125B, a motor drive relay, a compressor R.P.M. sensor 152, and a compressor output relief valve 145A, controlled by E.M.U. 101. A compressor R.P.M. sensor 152 counts the number of compressor revolutions as an input for E.M.U. 101, which opens compressor relief valve 145A, and a motor drive relay (not shown), when the volume and pressure of compressed fuel vapor have been delivered. The system may also include a digital to analog motor speed control circuit, in order to approximate the functions of the stepper motor drive system (motor/compressor drive speed and volumetric delivery which is greater than, or less than, engine speed). This system maintains precise fuel vapor to air ratios and vapor injection pressures for the fuel or fuels being burned. It has the additional advantage of being able to run at greater or lesser revolutions than engine speed, as load demand requires, to keep the system pressure at the required level. Pressurized fuel vapor is stored in a fuel vapor storage tank 147, which is insulated to minimize condensation losses of the heated vapor. A full-capacity gas injector 157, 157A, or 157B, controlled for duration and timing by electronic management unit 101, injects the fuel vapor into an intake manifold 118. A gas cylinder pressure sensor 115A provides input to the electronic management unit 101, which monitors the gas pressure in a compressed gas cylinder 115 and displays the read-out to the driver. A gas cylinder charging valve 115B re-charges compressed gas cylinder 115, which supplies a gas pressure and flow regulator 116, and full-capacity gas injector 157, 157A, or 157B, controlled by electronic management 101 for duration and timing. A water-alcohol storage tank 148 supplies a water pump 149, which provides pressurized output to a water injector 150, both units being controlled by electronic management unit 101 for duration and timing (to suppress detonation and promote charge cooling).

Figure 8:
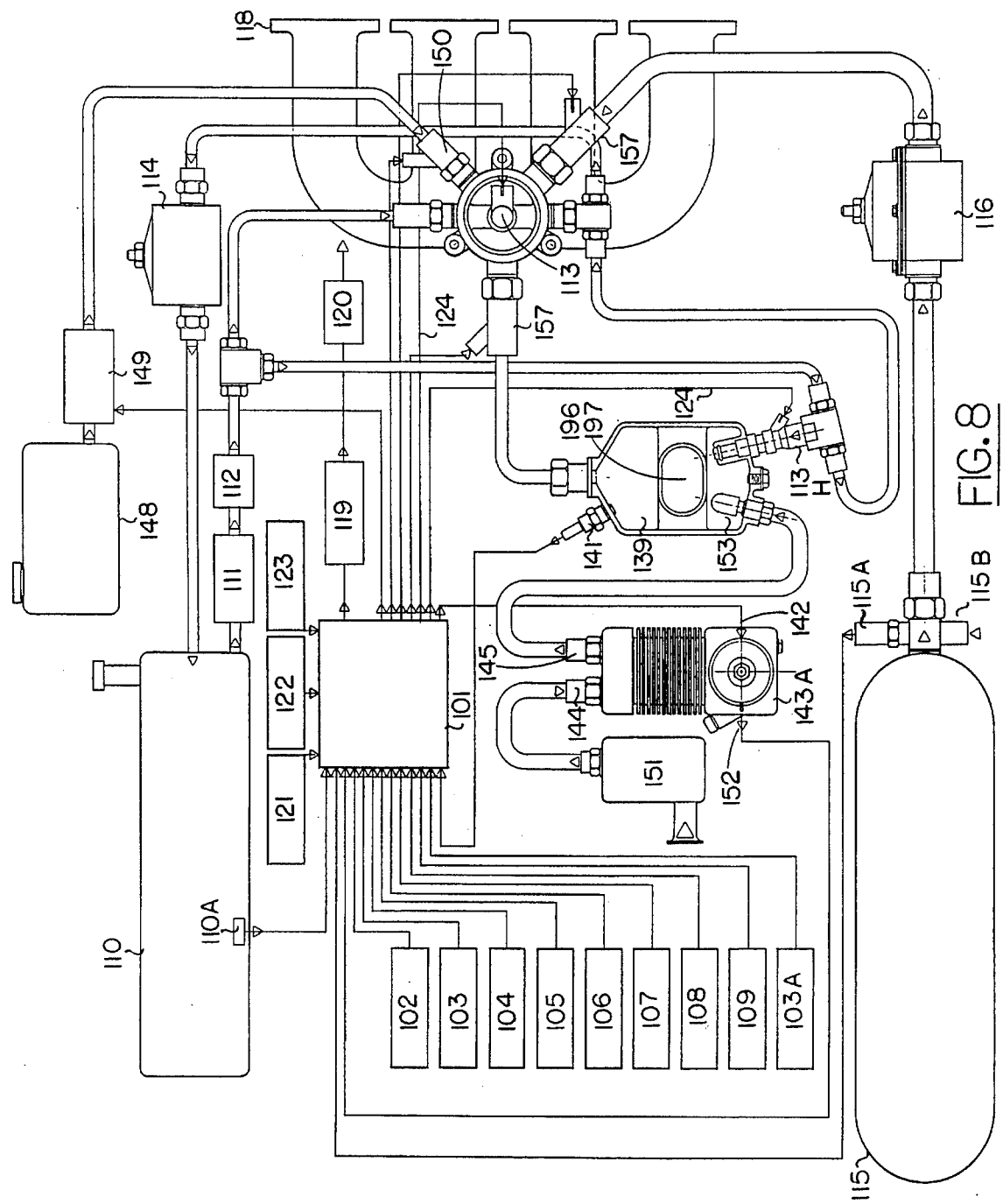
FIG. 8 is a systematic, schematic diagram of yet another embodiment of this invention, and illustrates the compressor placed before the liquid fuel vapor chamber and a CNG cylinder as fuel supplies.

FIG. 8 is a systematic schematic diagram of yet another embodiment of this invention. The components of the system are under the control of an electronic management unit 101, which receives inputs from a series of condition sensors 102–109. A knock sensor 102, a throttle position sensor 103, an air-flow sensor 103A, a R.P.M. sensor 104, a sync. pulse sensor 105, a M.A.P. sensor 106, an oxygen sensor 107, a air temperature sensor 108, and a coolant temperature sensor 209. These inputs are compared to operational parameters supplied from R.O.M. maps 121, 122, 123, which store data for different load and fuel-air mixture scenarios.

Liquid fuels are stored in a fuel tank 110. Input from a fuel level sending unit 110A to electronic management unit 201 provides fuel tank level data to the driver and the reference register of the C.P.U. A fuel pump 111 feeds a fuel filter 112 and thence a single-point fuel injector 113 (cold engine) or 113H (hot engine). Fuel injectors are controlled for duration (output) and timing by electronic management unit 101, which signals single-point fuel injectors 113 and 113H through fuel injector signal cables 124. Fuel system pressure is regulated by a fuel pressure regulator 114, which returns excess fuel to fuel tank 110. A coolant-heated 196, or exhaust-heated 197 vapor chamber 139, is pressurized with fuel vapor maintained by the output of single-point fuel injector 113H and an air compressor 143A. Input from a compressor R.P.M. sensor 152, to the electronic management unit 101, regulates the output of air compressor 143A through an electric compressor clutch 142. This is done to insure that the proper fuel-air ratio is maintained for prevailing engine load, fuel selection, and environmental conditions and is accomplished by counting the number of compressor revolutions, which determines air volumetric output. Compressor air output data to the E.M.U. 101, in conjunction with other input sensor data, determines the output of fuel injector 113 or 113H, gas injectors 157, and water-alcohol pump 149, and injector 150. An air cleaner 151 provides filtered air to air compressor 143A. A compressor inlet check valve 144 and a compressor output check valve 145 insure that compressed air travels in one direction only. An air compressor 143A, driven by a stepper motor 125, regulated by engine management unit 101 (not shown), may replace electric, compressor clutch 142, and its attendant belt drive from the engine, and compressor R.P.M.

sensor 152. Since compressor 143A is driven by a stepper motor, rather than by the engine, its rotary count position, and therefore the compressor's volumetric output may be digitally controlled by the E.M.U. 101, which also starts and stops the compressor. Another solution to driving and regulating the volumetric output of air compressor 143A replaces stepper motor drive 125 with a standard D.C. motor drive 125A or an A.C. motor drive 125B, a motor drive relay, a compressor R.P.M. sensor 152, and a compressor output relief valve 145A, controlled by E.M.U. 101. A compressor R.P.M. sensor 152 counts the number of compressor revolutions as an input for EMU 101, which opens compressor relief valve 145A, and a motor drive relay (not shown), when the required volume of compressed air has been delivered. The system may also incorporate a digital to analog motor speed control circuit, in order to approximate the functions of the stepper motor drive system (motor/compressor drive speed and volumetric delivery which is greater than, or less than, engine speed). This system maintains precise air-to-fuel ratios and charge densities for the fuel or fuels being burned. It has the additional advantage of being able to run at greater or lesser revolutions than engine speed, as load demand requires. Vapor chamber 139 also contains an air diffuser head 153 and a vapor chamber pressure sensor 141 (optional), which compares volumetric data to pressure data as a system check. A full-capacity universal gas injector 157 or 157A or 157B, controlled for duration and timing by electronic management unit 101, injects the compressed air/fuel vapor mixture into an intake manifold 118. A gas cylinder pressure sensor 115A provides input to the electronic management unit 101, which monitors the gas pressure in gas cylinder 115 and displays the read-out to the driver. A gas cylinder charging valve 115B re-charges compressed gas cylinder 115, which supplies a gas pressure regulator 116 and a full-capacity universal gas injector 157 or 157A or 157B, controlled by electronic management unit 101 for duration and timing. A water-alcohol storage tank 148 supplies a water-alcohol pump 149, which provides pressurized output to a water injector 150. Both water pump 149 and water injector 150 are controlled for duration and timing by electronic management unit 101.

Figure 9:
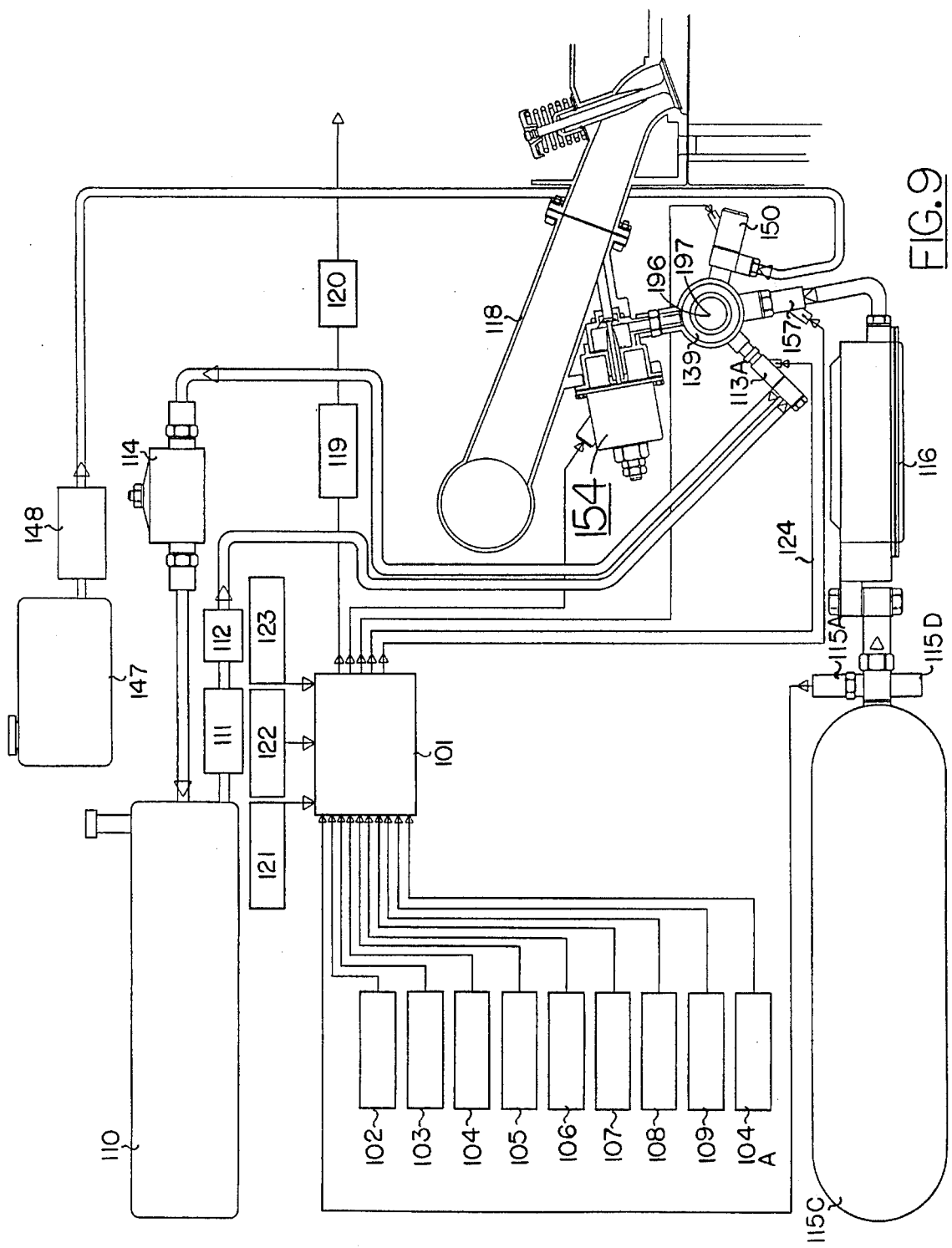
FIG. 9 is a systematic, schematic diagram of a still further embodiment of this invention where the vaporized gasoline and water are ejected by the pressure supplied from the LNG system (no air ejection system or compressor), the first embodiment of a multi-capacity universal gas injector is also illustrated.

FIG. 9 is a systematic, schematic diagram of a still further embodiment of this invention, which employs liquefied, rather than compressed, natural gas and provides for location of the alcohol-water injection system nozzle in the vaporization chamber, along with the L.N.G. fuel injector. The components of the system are under the control of an electronic management unit 101, which receives inputs from a series of condition sensors 102–109. A knock sensor 102, a throttle position sensor 103, a R.P.M. sensor 104, a vehicle speed sensor 101A, a sync. pulse sensor 105, a M.A.P. sensor 106, an oxygen sensor 107, a air temperature sensor 108, and a coolant temperature sensor 109. These inputs are compared to operational parameters supplied from R.O.M. maps 121, 122, 123, which store data for different fuel-air mixture scenarios.

Liquid fuels are stored in a fuel tank 110. A fuel pump 111 feeds a fuel filter 112 and thence a multi-point fuel injector 113A. Fuel injectors are controlled for duration (output) and timing by electronic management unit 101, which signals multi-point fuel injectors 113A through fuel injector signal cables 121. Fuel system pressure is regulated by a fuel pressure regulator 114, which returns excess fuel to fuel tank 110. A coolant-heated 196, or exhaust-heated 197, vapor chamber 139 is pressurized with fuel vapor maintained by the output of a multi-point fuel injector 113A, a full-capacity universal gas injector 157 or 157A or 157B, and a multi-point water-alcohol injector 150, which are controlled for duration and timing by the electronic management unit 101. A gas cylinder pressure sensor 115A provides input to the electronic management unit 101, which monitors the gas pressure in a L.N.G. gas tank 115A, and displays the read-out to the driver. A L.N.G. charging valve 115D, re-charges a L.N.G. tank 115C, which supplies the gas pressure regulator 116, and a multi-point partial-capacity gas injector 140, controlled by electronic management unit 101, for duration and timing. A water-alcohol storage tank 148 supplies a water-alcohol pump 149, which provides pressurized output to a water injector 150, controlled by electronic management unit 101, for duration and timing, to suppress detonation and promote charge cooling. The vaporized outputs of fuel injector 113A, gas injector 140, and water injector 150 (by themselves or in combination) are injected into an intake manifold 118 by a multi-point, multi-capacity universal gas injector 154.

Figure 10:
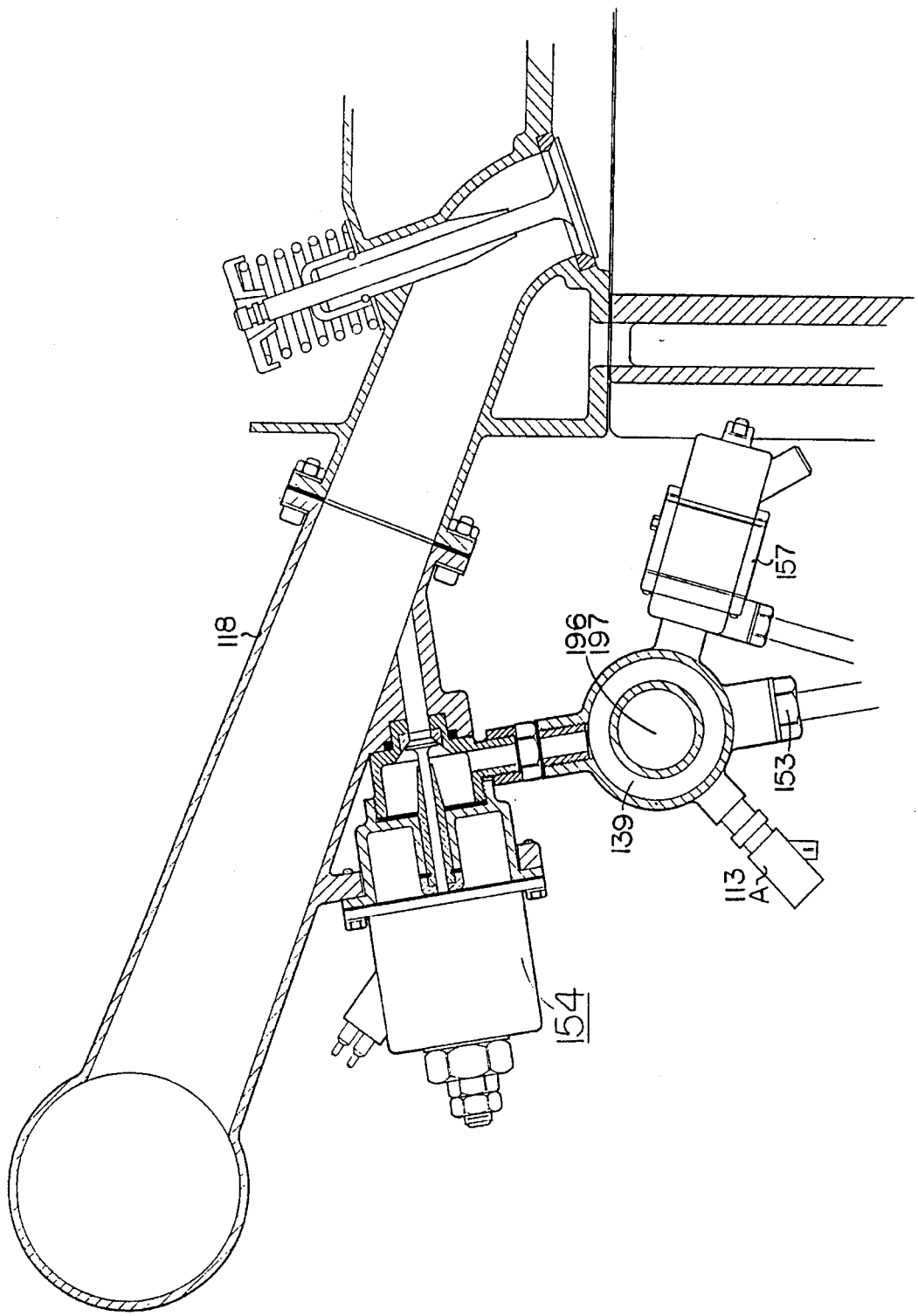
FIG. 10 is a sectioned view of another embodiment of the intake manifold and single water or exhaust-heated vapor chamber, as in FIG. 9, but with compressed air ejection of the vaporized gasoline and gaseous fuel, the first embodiment of a multi-capacity universal gas injector is also illustrated.

FIG. 10 is a sectioned view of an intake manifold system illustrating the first embodiment of a multi-capacity universal gas injector 154, a plurality of which are supplied by a single, rather than individual, vapor chambers, with vapor ejection by gaseous fuel and compressed air, and variable effective compression ratio and charge density alteration. This last feature enables various fuels of differing octane ratings to be burned singly or in combination with other fuels in an adaptive manner. For example, natural gas or methanol require a higher compression ratio to take advantage of their higher octane rating. In the past, there have been mechanical solutions to address this problem, all of which have demonstrated questionable operation and durability. By injecting additional air into the engine cylinders during the intake cycle, the density of air molecules in the combustion chamber at T.D.C. may be increased, raising the effective charge density and compression ratio without mechanical apparatus to decrease the size of the combustion chamber, as fuel and load conditions would dictate. A coolant-heated 196, or exhaust-heated 197, vapor chamber 139 is pressurized with fuel vapor maintained by the output of a single-point fuel injector 113, a single-point, full-capacity universal gas injector 157 or 157A or 157B, and compressed air from a diffuser head 153. The vaporized outputs of fuel injector 113B and gas injector 157 (singly, or in combination) are injected into an intake manifold 118 by a multi-point, multi-capacity universal gas injector 154, with compressed air assistance supplied from the diffuser head 153.

Figure 11:
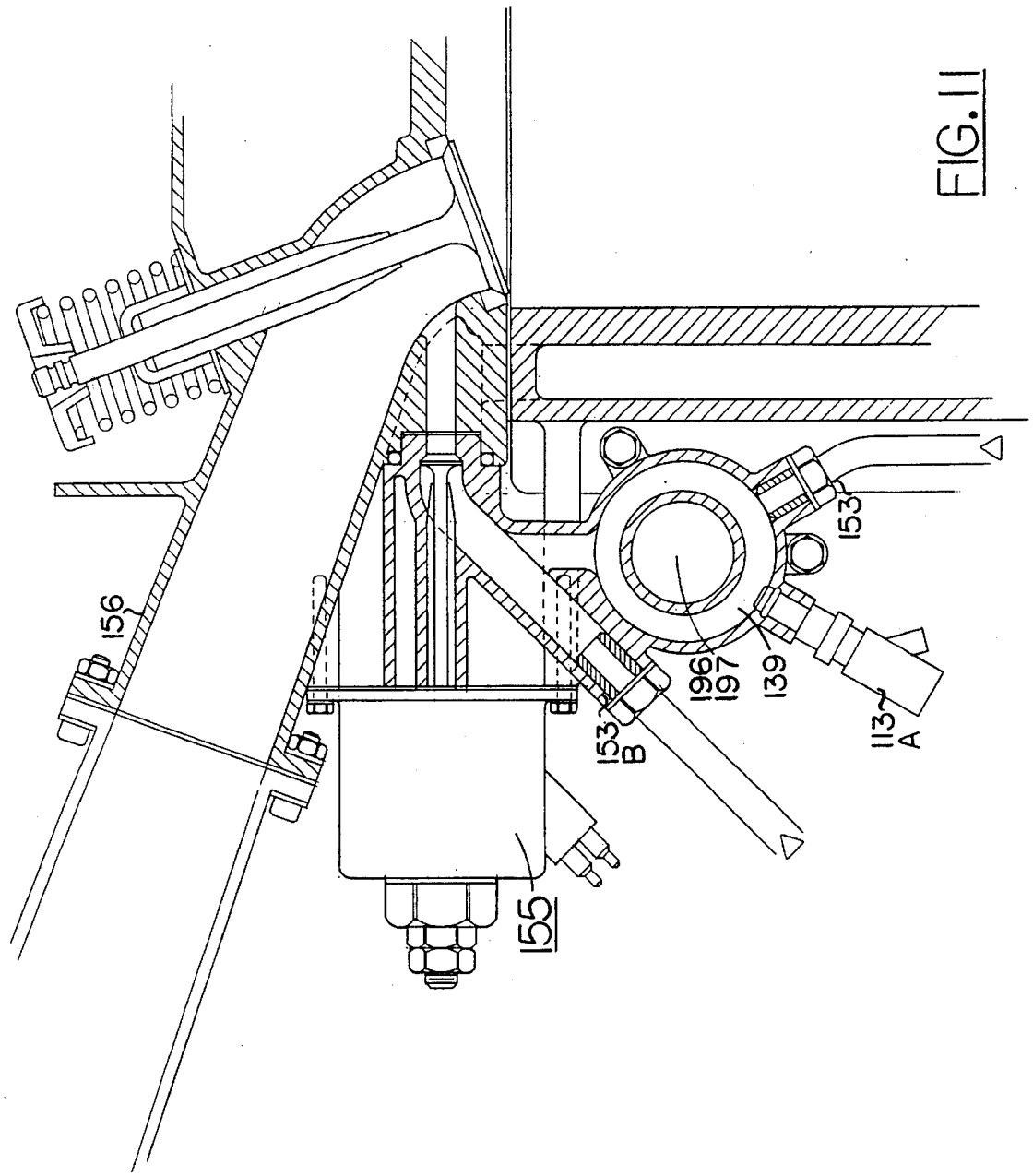
FIG. 11 is sectioned view of the intake system illustrating the first embodiment of a multi-point, cylinder-head mounted dedicated gas injector and a liquid fuel injector with compressed air vapor ejection.

FIG. 11 is a sectioned view of an intake system illustrating the first embodiment of a multi-point, multi-capacity, cylinder head mounted dedicated gas injector 155, with a single-point, coolant or exhaust-heated vapor chamber, and a single-point fuel injector with compressed air vapor ejection. The air compressor also provides variable effective compression ratio alteration. A coolant-heated 196, or exhaust-heated 197, vapor chamber 139 is pressurized with fuel vapor maintained by the output of a single-point fuel injector 113A and compressed air from a diffuser head 153. A second diffuser head 153B provides variable quantities of compressed air to alter the effective compression ratio in accordance with the fuel or fuels being burned. Multi-point, multi-capacity dedicated gas injector 155 is varied for duration and timing by an electronic management unit 101 (not shown), as are the operation and output of the air compressor 143A, which is illustrated and described in FIG. 46.

Figure 12:
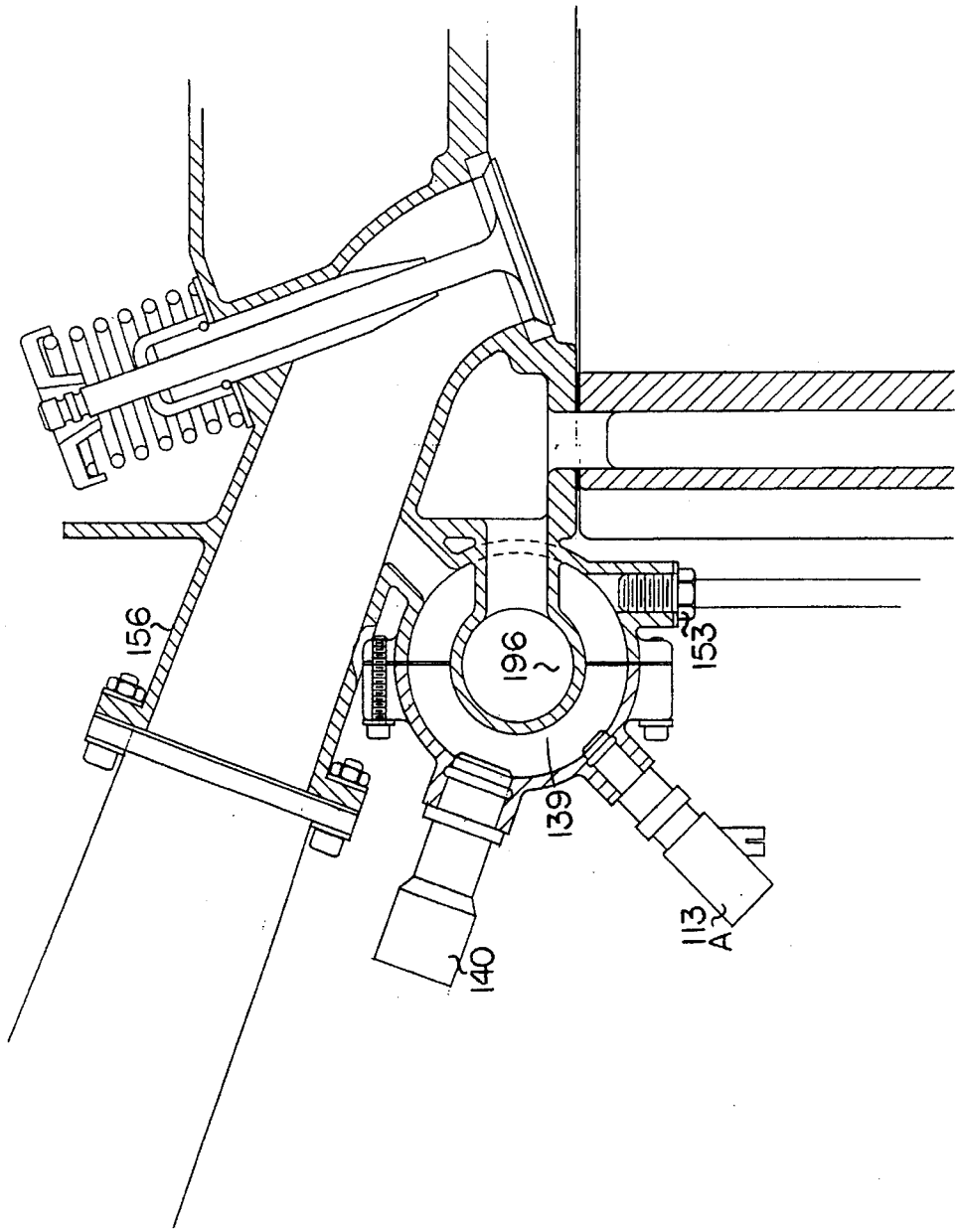
FIG. 12 is a sectioned view of the first embodiment of an intake system illustrating multi-point, cylinder-head mounted vapor chambers containing a gas and liquid fuel injector and air-assisted ejection.

FIG. 12 is a sectioned view of an intake system illustrating a multi-point, cylinder head mounted, coolant-heated vapor chamber, with air-assisted vapor ejection. A coolant-heated 196, vapor chamber 139 is pressurized with fuel vapor maintained by the output of a multi-point fuel injector 113A and a multi-point, partial capacity gas injector 140. A compressed air diffuser head 153 supplies compressed air which ejects the fuel vapor and gaseous fuel into the intake port 156 through a short passage. Engine vacuum helps the extraction of vaporized fuel and gaseous fuel from the vapor chamber 139.

Figure 13:
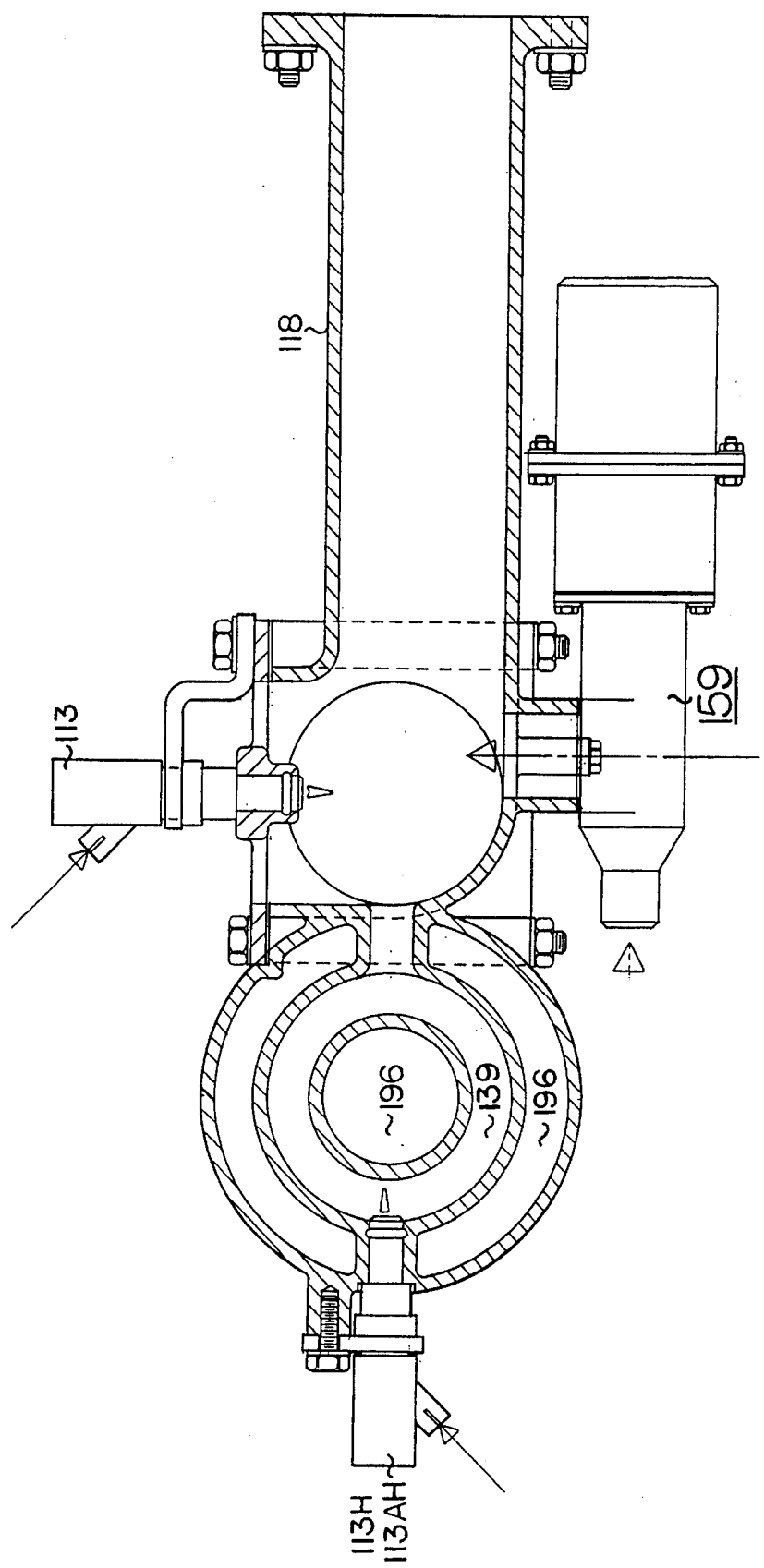
FIG. 13 is a sectioned view of the first embodiment of an intake manifold system illustrating a vapor chamber with inner and outer liquid-heated jackets, a single-point liquid fuel injector, fuel injectors for both the vapor chamber and cold starting, and a single-point "L"-flow gas metering valve.

FIG. 13 is a sectioned view of an intake manifold system illustrating another application of a full-capacity "L"-flow gas regulation valve 159 (detailed in FIG. 2). A vapor chamber 139, with inner and outer coolant-heated jackets 196, is supplied with fuel vapor maintained by the output of a single-point 113H, or multi-point 113AH, fuel injector. Vapor is extracted from the vapor chamber 139 by the intake vacuum of the engine. A full-capacity "L"-flow gas regulation valve 159 meters gaseous fuel into the engine. A position sensor 212 provides linear position data to an electronic management unit 101 (not shown), which also controls stepper motor 125 on valve 159. A single-point fuel injector 113 injects fuel into a cold engine, as a back-up in the event that gaseous fuel is unavailable. When the engine reaches operating temperature, electronic management unit 101 (not shown) selects fuel injector 113H or 113AH to vaporize the liquid fuel, and fuel injector 113 is deactivated. Vapor chamber 139, fuel injectors 113, 113H, and 113AH and gas valve 159 are mounted on intake manifold 118.

Figure 14:
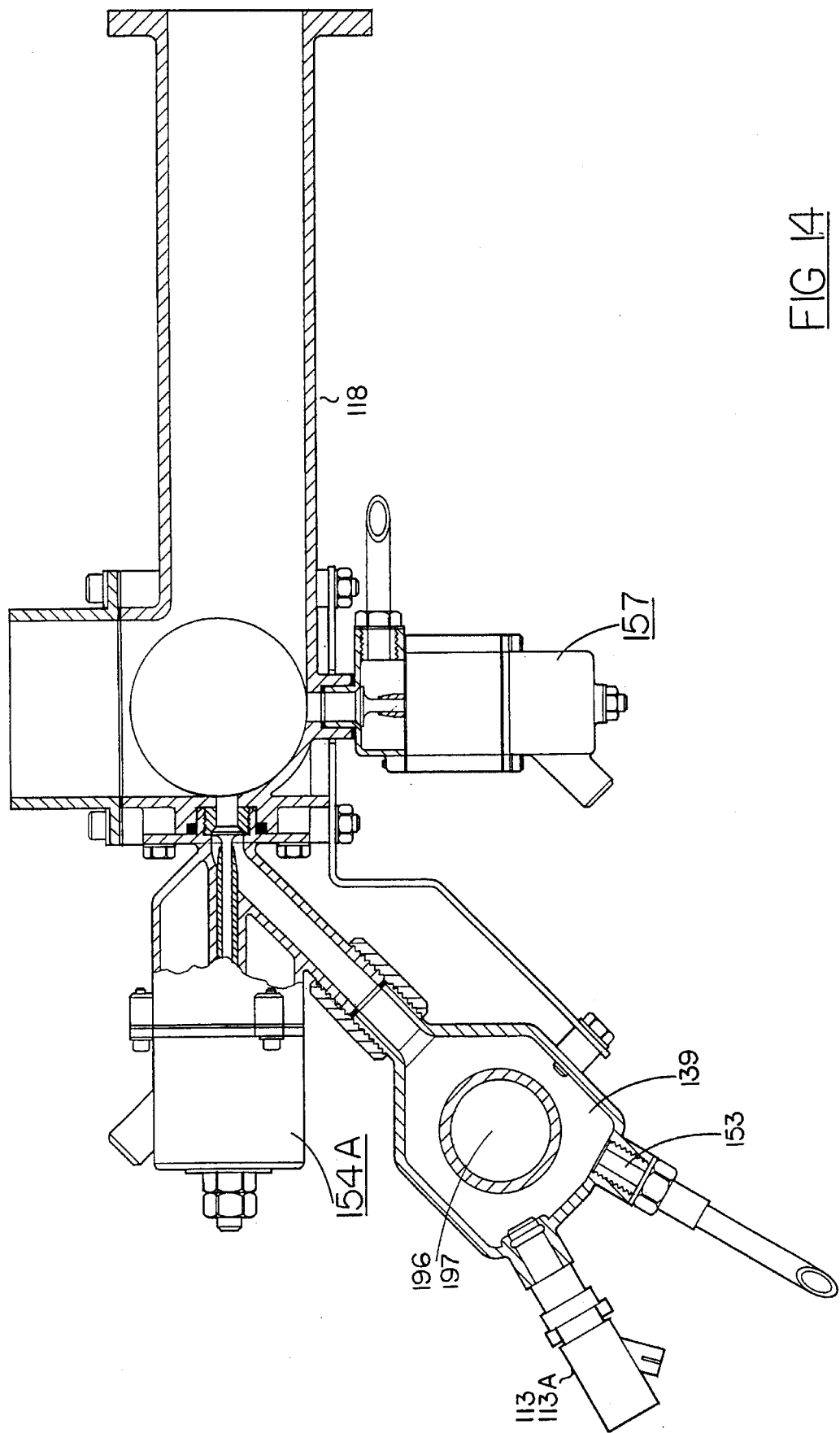
FIG. 14 is a sectioned view of an intake manifold system illustrating another embodiment of a multi-capacity, multi-point universal gas injector, with a supplemental full-capacity universal gas injector.

FIG. 14 is a sectioned view of an intake manifold system illustrating another embodiment of a multi-capacity universal gas injector 154A and another application of the first embodiment of a full-capacity universal gas injector 157. A coolant-heated 196, or exhaust-heated 197, vapor chamber 139 is pressurized with fuel vapor maintained by the output of a single-point fuel injector 113 and compressed air from a diffuser head 153. The vaporized output of fuel injector 113 is injected into an intake manifold 118 by a multi-point, multi-capacity universal gas injector 154A, with compressed air assistance supplied from a diffuser head 153. A second single or multi-point, full-capacity universal gas injector 157 injects a second (gaseous) fuel into intake manifold 118. Since this valve is designed to inject a single gas only (without compressed air assistance), it is of smaller dimensions and capacity. Where only one each of the two injectors 154A and 157 are used (in single-point injection applications), the injectors inject their respective gaseous fuels alternately, but in full measure (conversely, each valve injects a partial measure of each gaseous fuel simultaneously in multi-point applications). This is a programming "trick" used by the electronic management unit 101 (not shown) to keep valve wear to a minimum.

Figure 15:
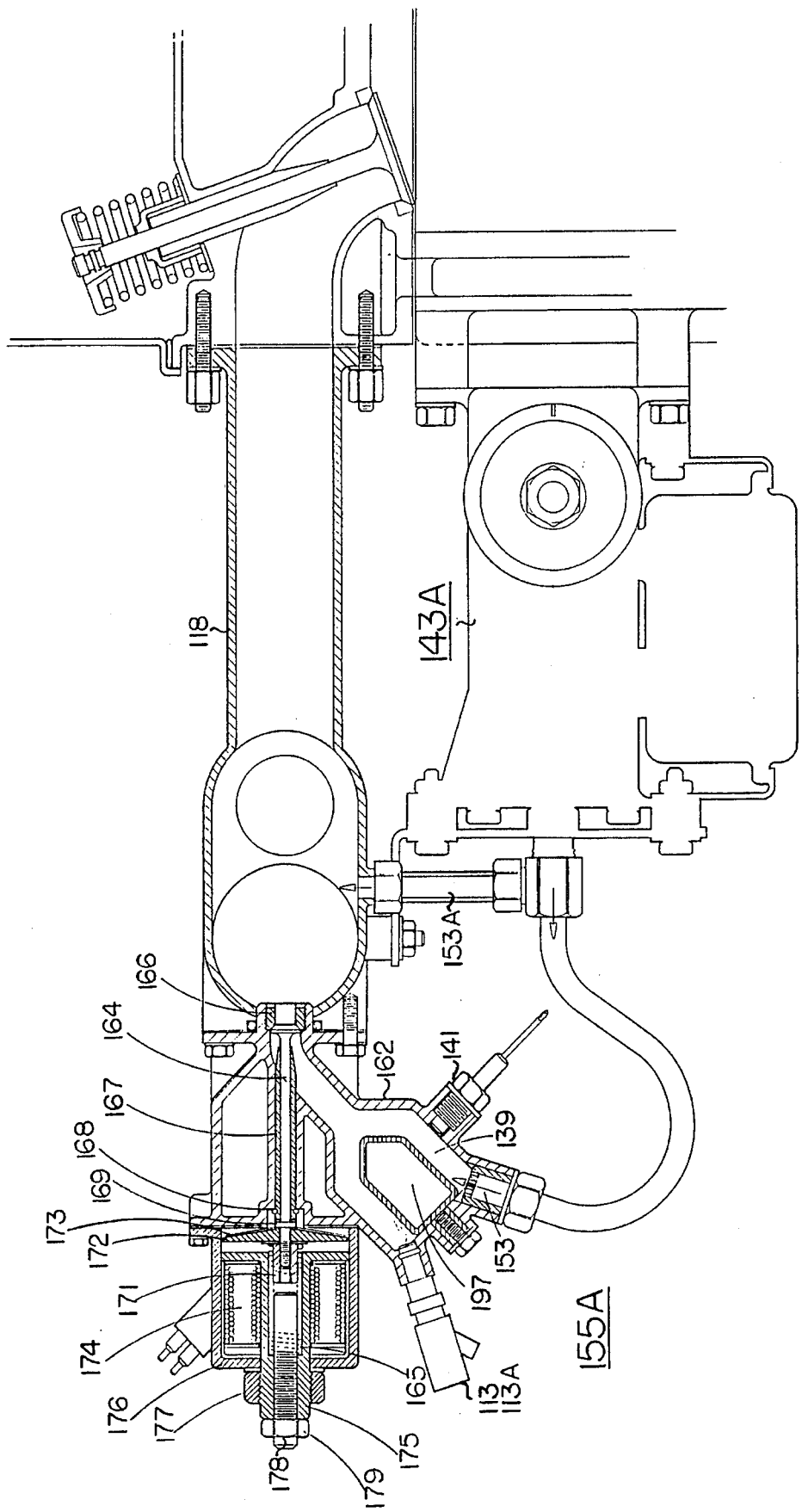
FIG. 15 is a sectioned view of an intake manifold system illustrating another embodiment of a multi-capacity dedicated gas injector and an air compressor which supplies both vapor ejection and a supercharger/compression ratio boost.

FIG. 15 is a sectioned view of an intake manifold system illustrating another embodiment of a single or multi-point, multi-capacity dedicated gas injector 155A, which has an exhaust-heated vapor chamber with compressed air assisted vapor ejection. An exhaust-heated 197, vapor chamber 139 is pressurized with fuel vapor maintained by the output of a single-point 113, or multi-point 113A, fuel injector and compressed air from a diffuser head 153. The vaporized output of fuel injector 113 or 113A are injected into an intake manifold 118 by a single or multi-point, multi-capacity dedicated gas injector 155A, with compressed air assistance supplied from a diffuser head 153. An air compressor 143A supplies air to the diffuser head 153, which is pressure regulated by input from a vapor chamber pressure sensor 141, to an electronic management unit 101 (not shown), which regulates the output of air compressor 143A through an electric clutch. Air compressor 143A also supplies compressed air to an intake manifold compressed air inlet 153A, which provides a supercharging effect to the engine. It should be noted that this system is not intelligent or adaptive to fuel types and engine loads, such as discussed in FIG. 8. The system is mounted to an intake manifold 118 and the engine block. Although a single or multi-cylinder piston-type air compressor is illustrated as a source of compressed air, this function could be filled by several alternate compressor types, such as a Wankel rotary, Roots-type, swashplate (multiple pistons), centrifugal, vane-type, etc. This notation applies to all compressor installations illustrated. The parts which comprise gas injector 155 are a dedicated gas injector housing 162, containing a poppet valve 164, which is biased to the closed position by a coil spring 165, against a screwed-in seat 166. The stem of poppet valve 164 rides in a valve guide 167, which is retained in housing 162, by a press-fit and a valve guide C-ring 168. An armature-retaining C-clip 169 and a threaded retainer 171 retain an armature 172 and a stabilizer spring 173 onto the stem of poppet valve 164. A solenoid 174, which is regulated for duration and timing by an electronic management unit 101 (not shown), attracts an armature 172, which opens poppet valve 164 against the bias of a coil spring 165. The air gap between armature 172 and solenoid 174 is adjusted by turning a flat 175 so that solenoid 174 moves fore and aft relative to an outer housing 176. A lock nut 177 retains the position of solenoid 174 relative to an outer housing 176. A stop screw 178, whose position is locked by a nut 179, prevents armature 172 from hitting solenoid 174 when poppet valve 164 is opened. Dedicated gas injector 155A is intended to be used with a universal gas injector 157 or 157A or 157B, which injects a second (gaseous) fuel (two-point application). There may also be two of each dedicated gas injector 155A and universal gas injector 157 or 157A or 157B, which provides multi-point gas injection (i.e., one gas injector for each cylinder, in a four-cylinder engine). The same numerical progression is true for six, eight, and twelve-cylinder engines.

Figure 16:
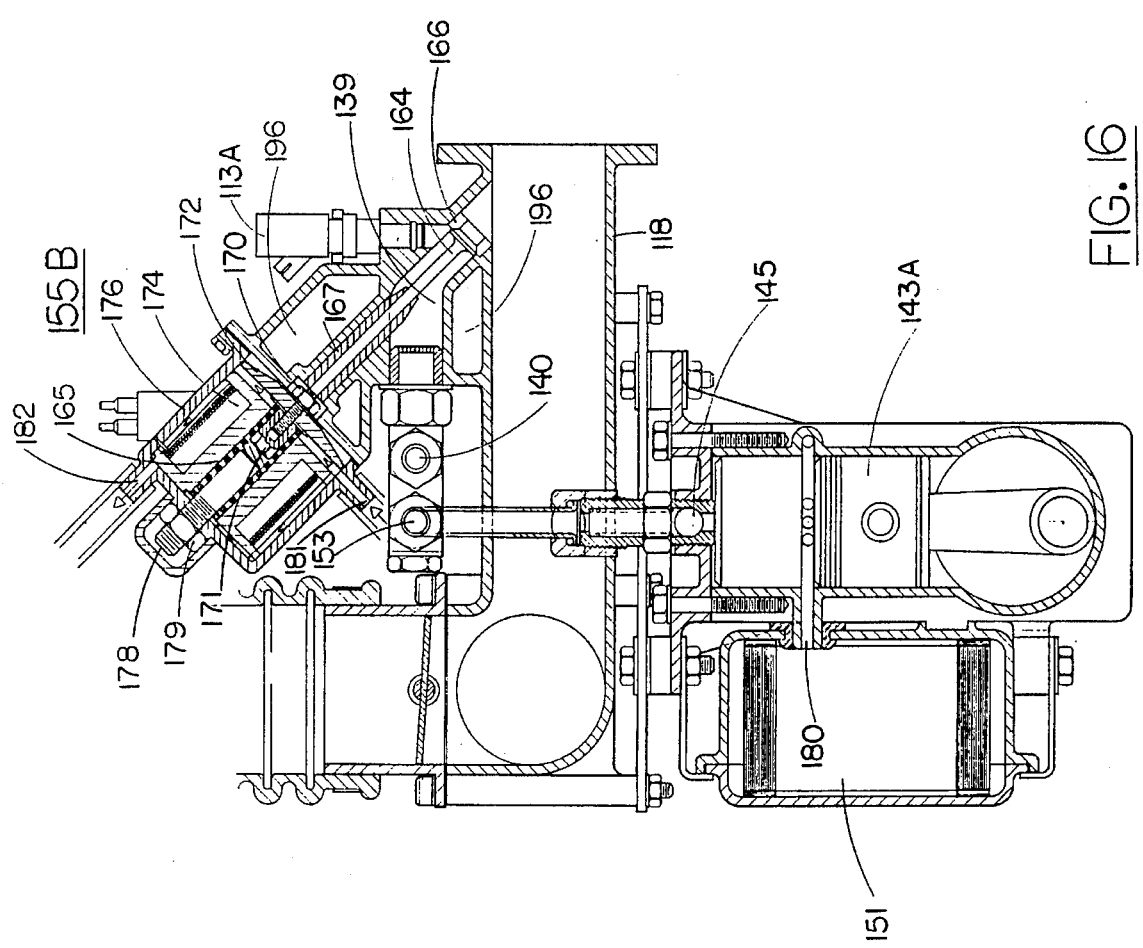
FIG. 16 is a sectioned view of an intake manifold system illustrating a further embodiment of a dedicated multi-capacity, multi-point gas injector, and a partial-capacity gas injector, which share compressed air-assisted ejection.

FIG. 16 is a sectioned view of an intake manifold system illustrating a further embodiment of a multi-point, multi-capacity dedicated gas injector 155B, which has a dedicated coolant-heated vapor chamber with compressed air assisted vapor ejection. A coolant-heated 196, vapor chamber 139 is pressurized with fuel vapor maintained by the output of a multi-point fuel injector 113A, a multi-point, partial-capacity gas injector 140, and compressed air from a diffuser head 153. The vaporized output from fuel injector 113A and gas injector 140 are injected into an intake manifold 118 by a multi-point, multi-capacity dedicated gas injector 155B, with compressed air assistance supplied from a diffuser head 153. An air compressor 143A supplies compressed air to the diffuser head 153, which is pressure regulated by input from a compressor revolution counter to an electronic management unit 101 (not shown), and output to an electric clutch, as is illustrated and discussed in FIG. 8. Air compressor 143A is mounted onto intake manifold 118 and the engine block and receives clean air through an air cleaner 151 and a compressor air inlet gallery 180. A compressor output check valve 145 insures that compressed air travels in one direction only. The parts which comprise multi-point, multi-capacity dedicated gas injector 155B are a dedicated gas injector housing 162, containing a popper valve 164, which is biased to the closed position by a coil spring 165 against a screwed-in valve seat 166. The stem of poppet valve 164 rides in a valve guide 167, which is retained in housing 162, by heating the housing, and shrinking the valve guide 167, and press-fitting the parts together. An armature retaining nut 170 and a threaded retainer 171 retain an armature 172 onto the stem of poppet valve 164 and provide for adjustment of the air gap between the armature 172 and a solenoid 174. Solenoid 174, which is regulated for duration and timing by electronic management unit 101 (not shown), attracts armature 172, which opens popper valve 164 against the bias of coil spring 165. A stop screw 178, whose position is locked by a nut 179, prevents armature 172 from hitting solenoid 172 when poppet valve 164 is opened. A cooling air inlet 181 receives compressed air from air compressor 143A and circulates the air around the solenoid through a series of air passages marked by arrows (seen in typical form in the left half of the solenoid section). A cooling air outlet 182 returns the cooling air to the intake system.

The primary advantage of this embodiment is that the output of multi-point fuel injectors 113A can be in either an atomized state, when the engine is cold, or in a gaseous state, when the engine is warm. When the engine is cold, the logic of the electronic management unit 101 (not shown) will select the output of either multi-point fuel injectors 113A or multi-point, partial-capacity gas injector 140, depending on the availability of each fuel. If both fuels are available, the gaseous fuel from gas injector 140 will be selected to start and run the engine until operating temperatures are reached, at which point the mixed-fuel operation scenario is enabled by vaporizing the output of fuel injectors 113A. If no gaseous fuel is available from gas injectors 140, then the atomized output of fuel injectors 113A is mixed with compressed air provided from the diffuser head 153 and injected into the intake manifold 118 by the multi-point, multi-capacity dedicated gas injector 155B. The electronic management unit 101 (not shown) compensates for the cold engine condition and the less-efficient atomized (vs. vaporized) output of multi-point fuel injectors 113A by increasing their opening duration (output).

Figure 17:
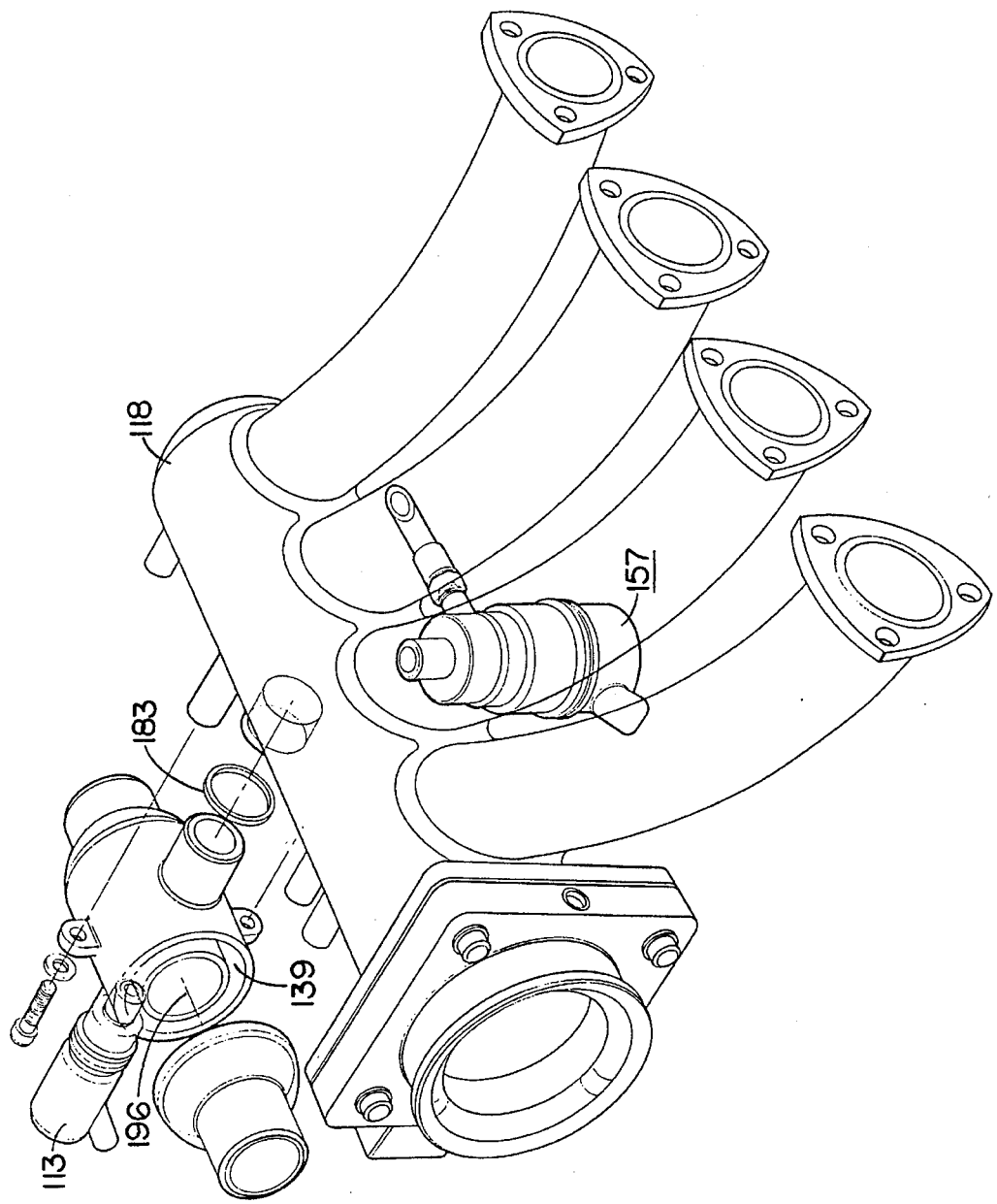
FIG. 17 is a perspective view of an intake manifold (drawn as a see-through part), illustrating the first embodiment a single-point, coolant-heated vapor chamber with a single-point fuel injector, and a single-point universal gaseous fuel injector.

FIG. 17 is a perspective view of an intake manifold system illustrating another embodiment of a single-point, coolant-heated vapor chamber, with a single-point fuel injector, and vacuum-assisted vapor extraction. A single-point, full capacity universal gas injector supplies a second gaseous fuel. A coolant-heated 196, vapor chamber 139 is supplied with fuel vapor maintained by the output of a single-point fuel injector 113. Vapor chamber 139 and an intake manifold 118, which is illustrated as a see-through part, are sealed for vacuum leaks by a vapor chamber O-ring 183. Fuel vapors are extracted from vapor chamber 139, through a single-point runner by engine vacuum. A single-point, full capacity universal gas injector 157 injects a second (gaseous) fuel, which is selected by electronic management unit 101 (not shown), for either cold starts, singular, or mixed-fuel scenarios.

Figure 18:
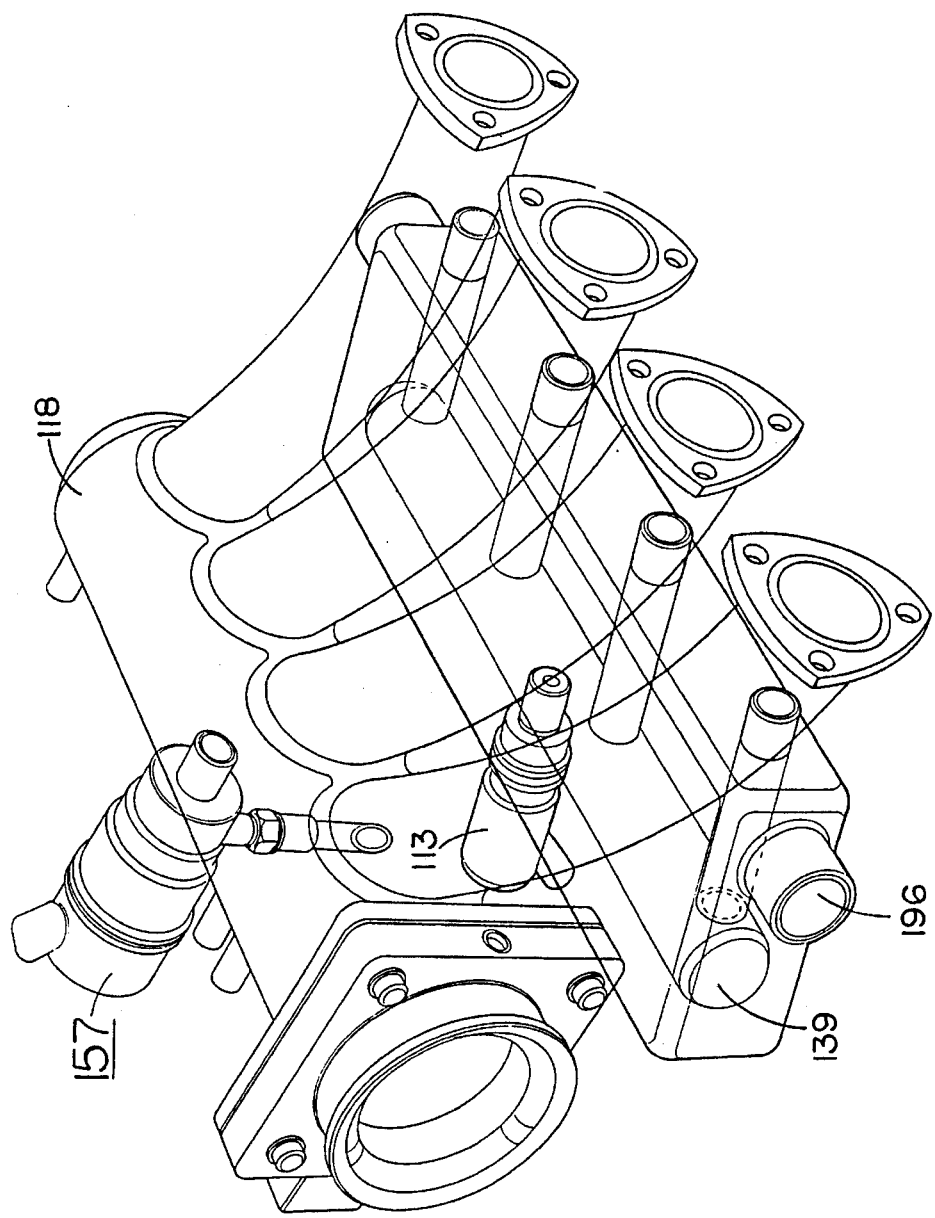
FIG. 18 is a perspective view of an intake manifold (drawn as a see-through part), illustrating the first embodiment of a multi-point, coolant-heated vapor chamber, with a single-point fuel injector, and a single-point universal gas injector.

FIG. 18 is a perspective view of an intake manifold system illustrating the first embodiment of a multi-point, coolant-heated vapor chamber, with a single-point fuel injector, and vacuum-assisted vapor extraction. A single-point, full capacity universal gas injector supplies a second (gaseous) fuel. A coolant-heated 196, vapor chamber 139 is supplied with fuel vapor maintained by the output of a single-point fuel injector 113. Vapor chamber 139 and an intake manifold 118, which is illustrated as a see-through part, are sealed for vacuum leaks by a gasket (not shown). Fuel vapors are extracted from the vapor chamber 139, through multi-point runners, by engine vacuum. A single-point, full-capacity universal gas injector 157 injects a second (gaseous) fuel, which is selected by the electronic management unit 101 (not shown), for either cold starts, singular, or mixed-fuel scenarios.

Figure 19:
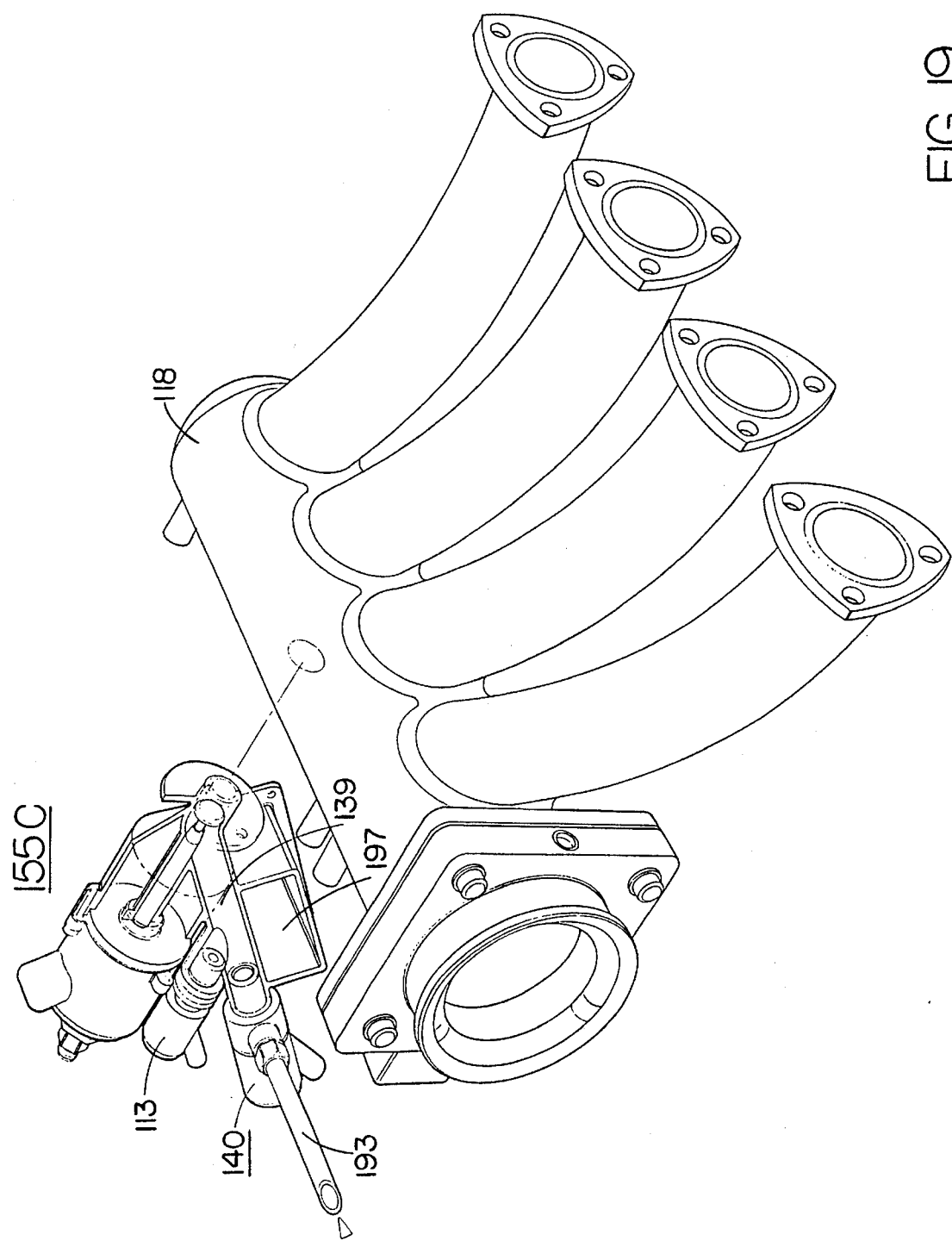
FIG. 19 is a perspective view of an intake manifold illustrating still another embodiment of a dedicated gas injector having an exhaust-heated vapor chamber, with a fuel injector, and vapor ejection by a partial-capacity gas injector.

FIG. 19 is a perspective view of an intake manifold system illustrating still another embodiment of a single point, multi-capacity dedicated gas injector 155C, which has an exhaust-heated vapor chamber with gas assisted vapor ejection. An exhaust-heated 197, vapor chamber 139 is pressurized with fuel vapor maintained by the output of a single-point fuel injector 113 and a single-point partial-capacity gas injector 140. The vaporized output from single-point fuel injector 113 is ejected from vapor chamber 139 by the pressure from gas injector 140 into an intake manifold 118, by a single-point, multi-capacity dedicated gas injector 155C. Partial-capacity gas injector 140 injects a second (gaseous) fuel, which is selected by the electronic management unit 101 (not shown) for either cold starts, singular, or mixed-fuel scenarios.

Figure 20:
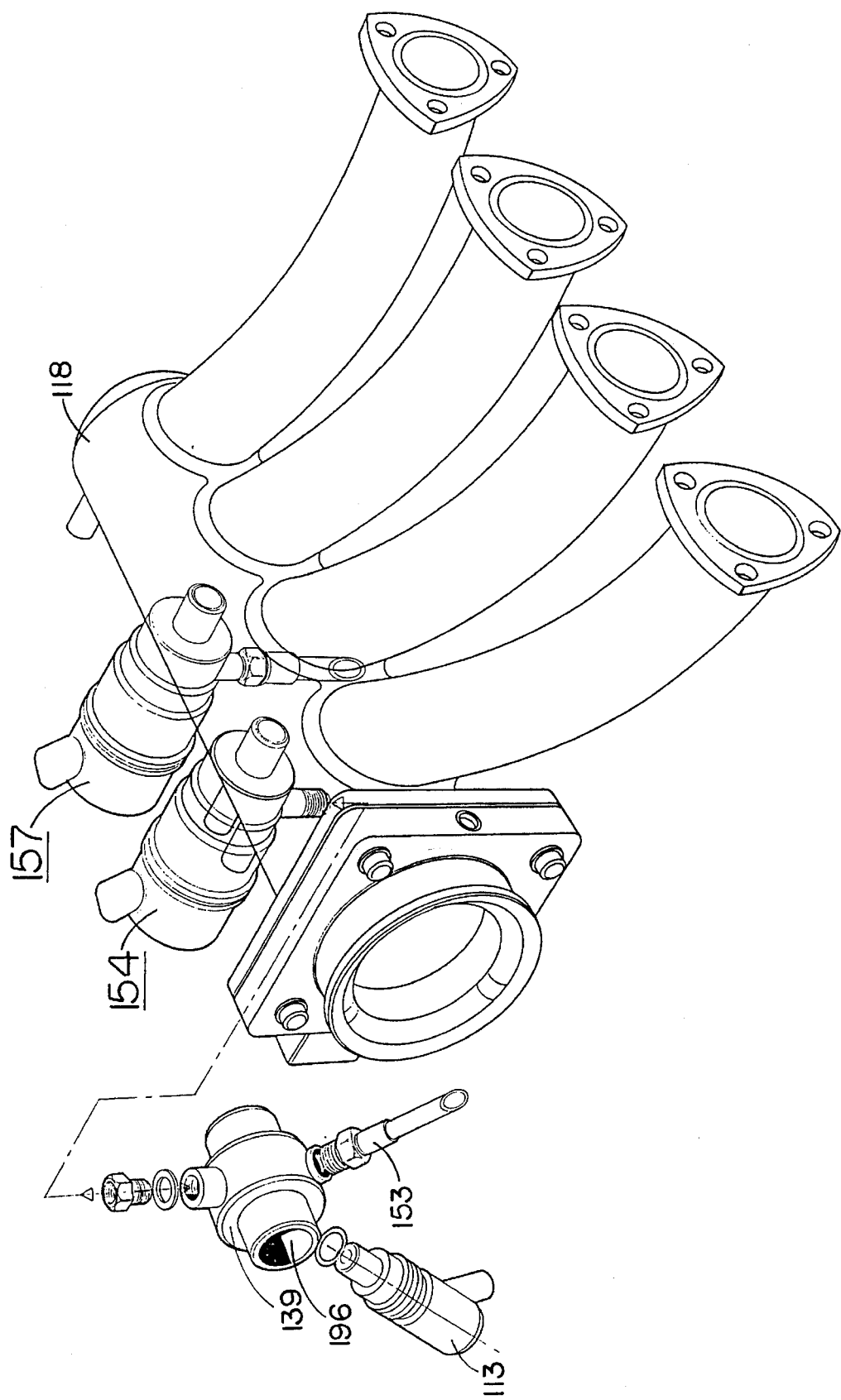
FIG. 20 is a perspective view of an intake manifold (drawn as a see-through part), illustrating the first embodiment of two universal gas injectors, one multi-capacity universal gas injector for vaporized fuel, the other full-capacity gas injector for gaseous fuel.

FIG. 20 is a perspective view of an intake manifold system illustrating two universal gas injectors, one being full-capacity, the other being multi-capacity. The multi-capacity injector is supplied by a coolant-heated vapor chamber with a single-point fuel injector and compressed air vapor ejection (detailed at left), and the full-capacity injector is supplied by a second (gaseous) fuel from a pressure-regulated line. A coolant-heated 196, vapor chamber 139 is pressurized with fuel vapor maintained by the output of a single-point fuel injector 113 and compressed air from a diffuser head 153. The vaporized output from single-point fuel injector 113 is ejected from vapor cheer 139, by compressed air from diffuser head 153, into an intake manifold 118, which is illustrated as a see-through part, by a single-point, multi-capacity universal gas ejector 154. A single-point, full capacity universal gas injector 157 injects a second (gaseous) fuel, which is selected by the electronic management unit 101 (not shown), for either cold starts, singular, or mixed fuel scenarios.

Figure 21:
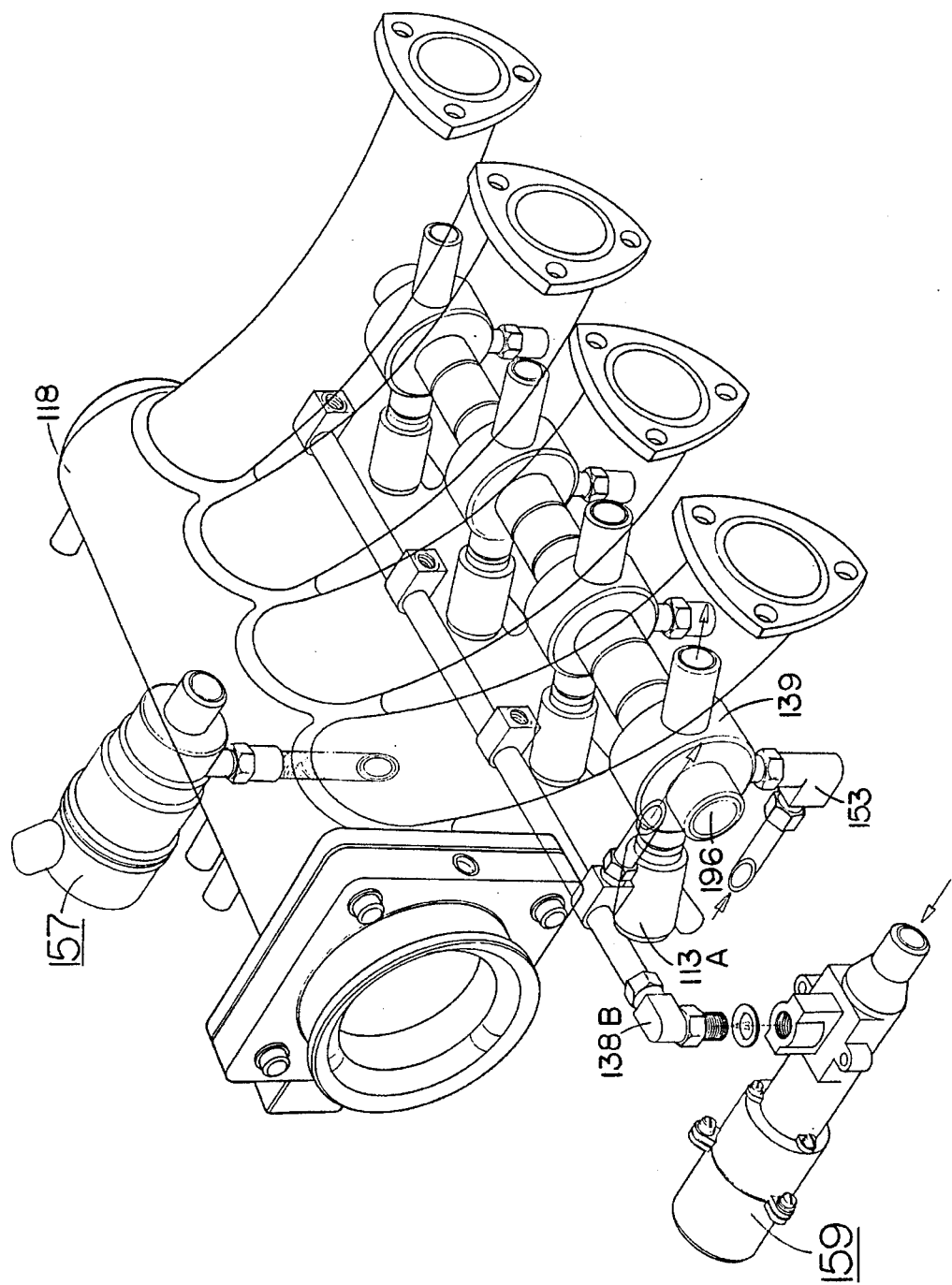
FIG. 21 is a perspective view of an intake manifold (drawn as a see-through part), illustrating the first embodiment of a three-fuel system, with multi-point vapor chambers, fuel injectors, and gaseous fuel vapor ejection, and a full-capacity universal gas injector.

FIG. 21 is a perspective view of an intake manifold system illustrating the first embodiment of a three-fuel, multi-point, coolant-heated vapor chamber, with multi-point fuel injectors, multi-point gaseous fuel supply, and vacuum-assisted vapor extraction. A single-point full capacity universal gas injector supplies a second gaseous fuel.

This is also the first fuel system to demonstrate "reference" fuel metering. In this example, the first gaseous fuel is the primary or "reference" fuel to be metered (by valve 159). Liquid fuel metered from fuel injectors 113A supplements the reference fuel during periods of peak engine loads. The third gaseous fuel injector 157 replaces the output of either the reference gaseous fuel (metered by valve 159) or the output of fuel injectors 113A should either fuel supply be unavailable. Fuel metered by valve 157 is ideal for utilizing on-board generation and utilization of hydrogen fuel, as it supplements many fuels (such as natural gas), which can tolerate high compression ratios, a condition that hydrogen by itself cannot.

A multi-point, coolant-heated vapor chamber 139 is supplied with fuel vapor maintained by the output of a multi-point fuel injector 113A, with vapor ejection provided by multi-point gaseous fuel diffuser heads 153, which receive gaseous fuel, regulated for pressure and volume, from a "L"-flow valve 159 and a gas distribution manifold 138B and connecting lines. The mixture of vaporized liquid fuel and the first gaseous fuel are both pushed, by pressure from the gaseous fuel, and pulled, by engine vacuum, into an intake manifold 118, which is illustrated as a see-through part. A single-point, full-capacity universal gas injector 157 injects a second gaseous fuel, which is selected by an electronic management unit 101 (not shown), for either cold starts, singular, or mixed-fuel scenarios.

Figure 22:
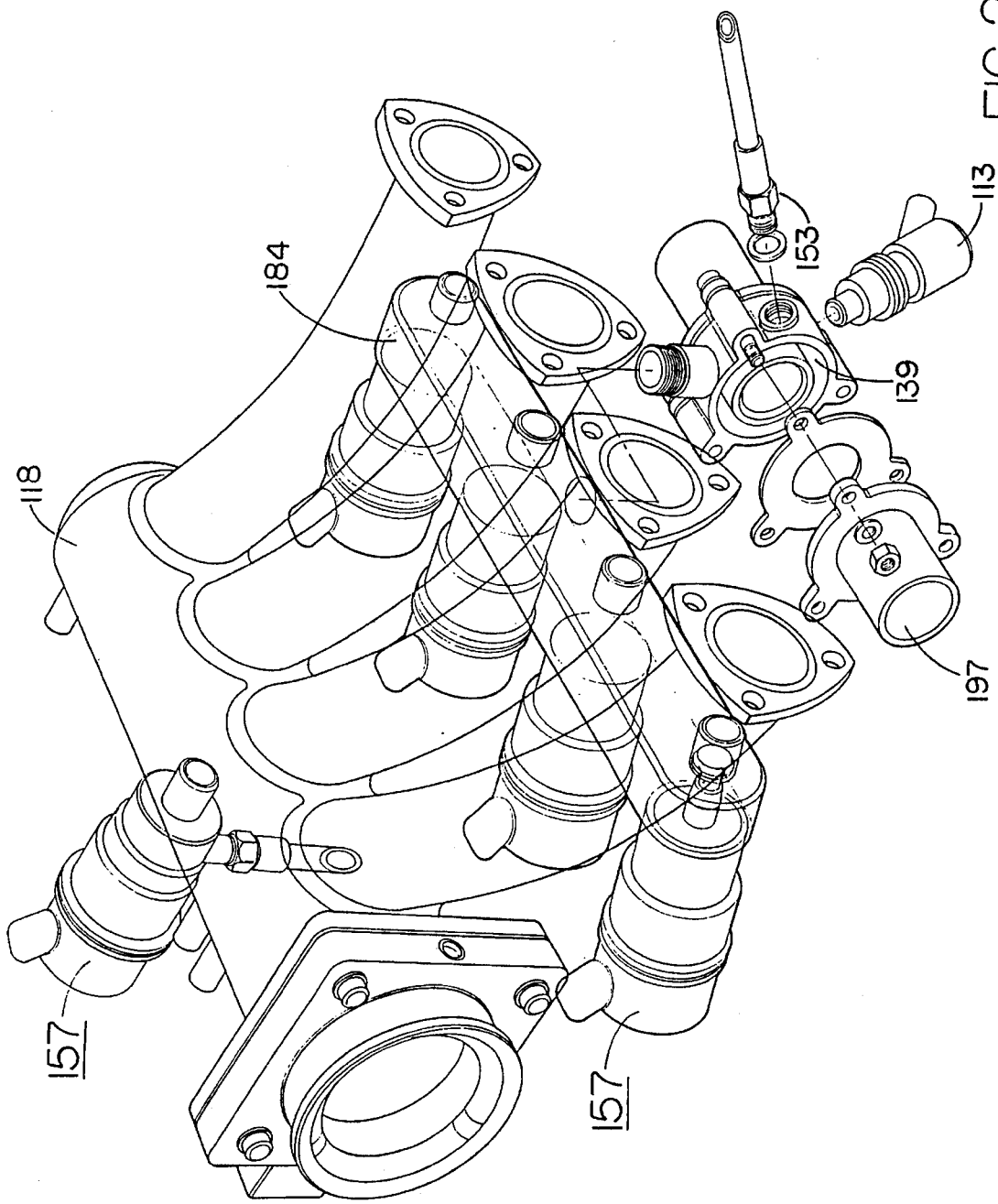
FIG. 22 is a perspective view of an intake manifold (drawn as a see-through part), illustrating the first embodiment of a vapor manifold supplied by a single-point vapor chamber and fuel injector, with air-assisted vapor ejection, and multiple full-capacity universal gas injectors.

FIG. 22 is a perspective view of an intake manifold system illustrating the first embodiment of a vapor distribution manifold, supplied from a single-point exhaust-heated vapor chamber, with single-point fuel injection and compressed air vapor ejection. A vapor manifold supplies four multi-point, full-capacity universal gas injectors and a single-point full capacity universal gas injector, which supplies a second (gaseous fuel). A single-point, exhaust-heated 197, vapor chamber 139 is supplied with fuel vapor maintained by the output of a single-point fuel injector 113, with vapor ejection provided by a single-point compressed air diffuser head 153. This vaporized fuel and compressed air mixture is supplied to a vapor distribution manifold 184, where multi-point, full-capacity universal gas injectors 157 inject the mixture into intake manifold 118, which is illustrated as a see-through part. A single-point, full capacity universal gas injector 157 injects a second (gaseous) fuel which is selected by an electronic management unit 101 (not shown), for either cold starts, singular, or mixed-fuel scenarios.

Figure 23:
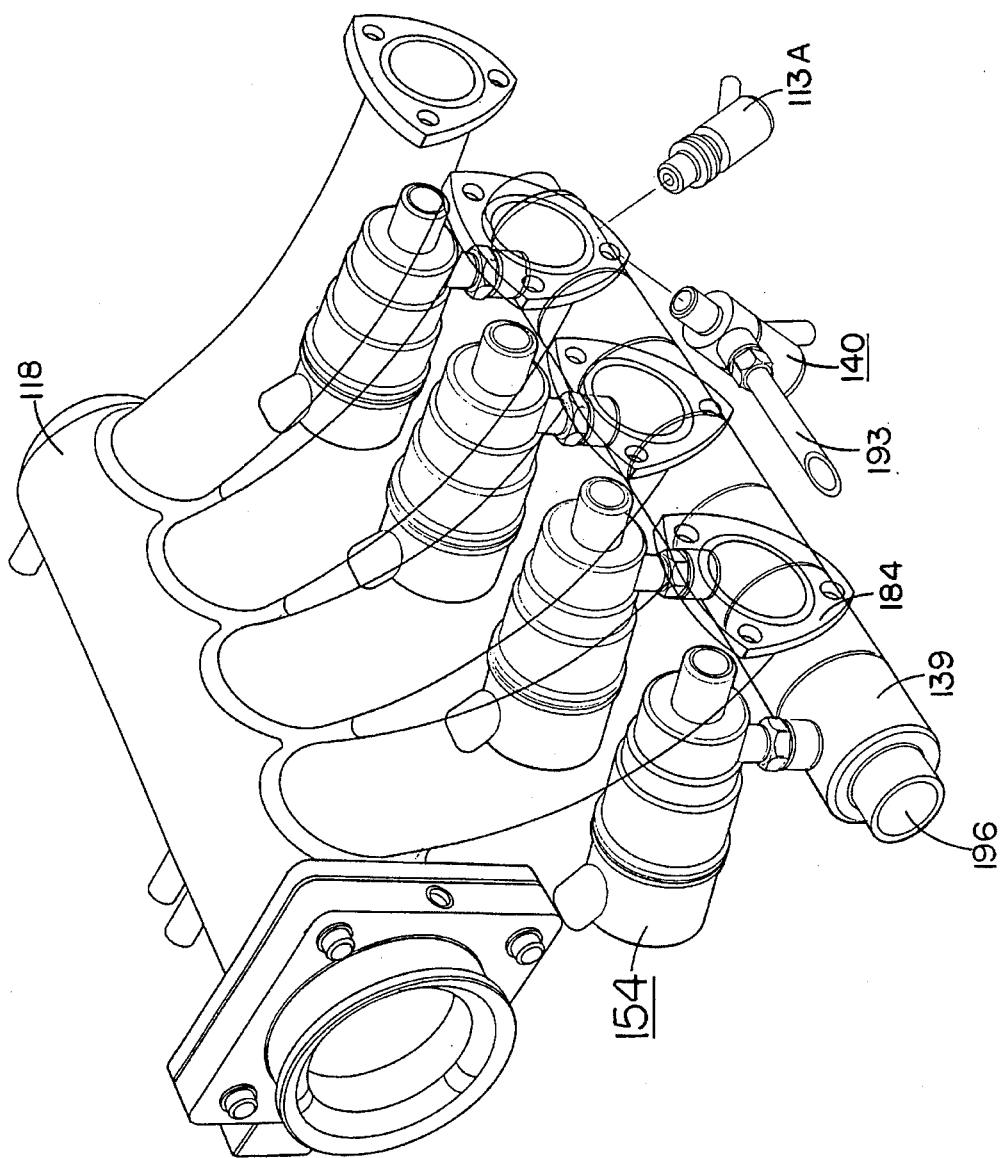
FIG. 23 is a perspective view of an intake manifold (drawn as a see-through part), illustrating the first embodiment of a multiple vapor chamber design, with multi-point fuel injection, multi-capacity universal gas injectors, and vapor ejection by multiple partial-capacity universal gas injectors.

FIG. 23 is a perspective view of an intake manifold system illustrating another embodiment of a vapor distribution manifold supplied from multi-point, coolant-heated vapor chambers with multi-point fuel injection and vapor ejection by multi-point, partial-capacity gas injectors. A vapor manifold supplies multi-point, multi-capacity universal gas injectors. A multi-point, coolant-heated 196, vapor chamber/vapor manifold 139/184 (the vapor chambers are interconnected, thus the term chamber/manifold) is supplied with fuel vapor maintained by the output of multi-point fuel injectors 113A, with vapor ejection provided by multi-point, partial capacity gas injectors 140, supplied from line 193 (only one of each part 140 and 113A is illustrated). Single-point, multi-capacity universal gas injectors 154 inject the mixture of fuel vapor and gaseous fuel into an intake manifold 118, which is illustrated as a see-through part.

Figure 24:
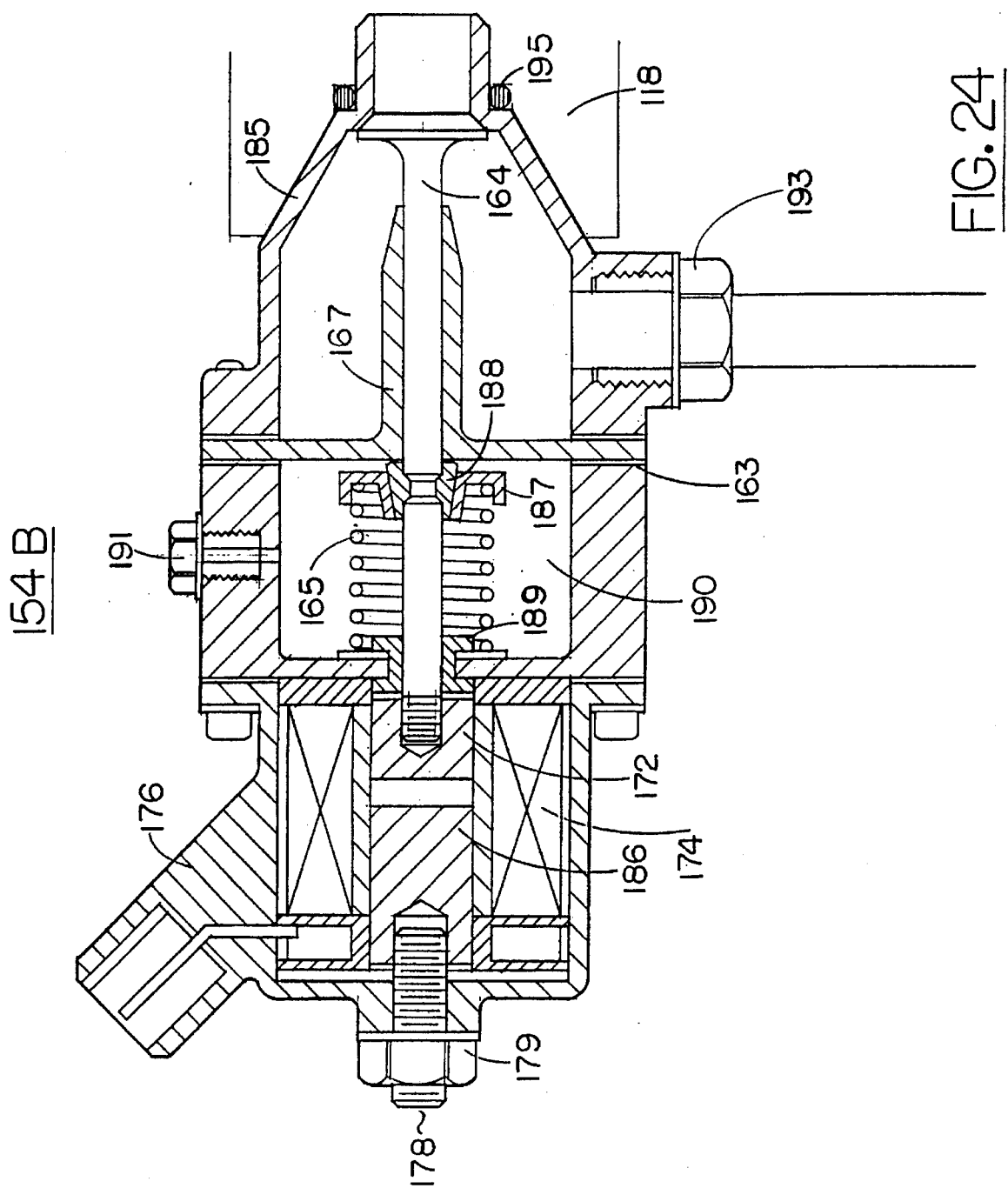
FIG. 24 is a sectioned view illustrating a further embodiment of a multi-capacity universal gas injector, with a refillable oil reservoir and a tapered housing which promotes seating in the manifold and gas flow.

FIG. 24 is a sectioned view of a further embodiment of a multi-capacity universal gas injector. The parts which comprise gas injector 154B are a universal gas injector housing 163, containing a poppet valve 164, which is biased to the closed position by a coil spring 165 against a seat in a gas plenum housing 185. The stem of poppet valve 164 rides in a valve guide 167, which is retained by threaded fasteners. An armature 172, which has self-locking threads, is screwed onto the end of poppet valve 164. A solenoid 174, which is regulated for duration and timing by an electronic management unit 101 (not shown), attracts armature 172, which opens poppet valve 164, against the bias of coil spring 165. A stop screw 178 and lock nut 179, threaded into outer housing 176, adjust the air gap between armature 172 and a stop 186. A spring retainer 187 and a split valve keeper 188 transfer forces to and from poppet valve 164 and spring 165. A valve stem seal 189 prevents excessive oil loss from an oil reservoir 190, which is filled through a threaded hole and plug 191. Gas plenum housing 185 is supplied through a gas supply line 193 and is tapered to aid seating into an intake manifold 118 and sealed for vacuum leaks by an O-Ring 195.

Figure 25:
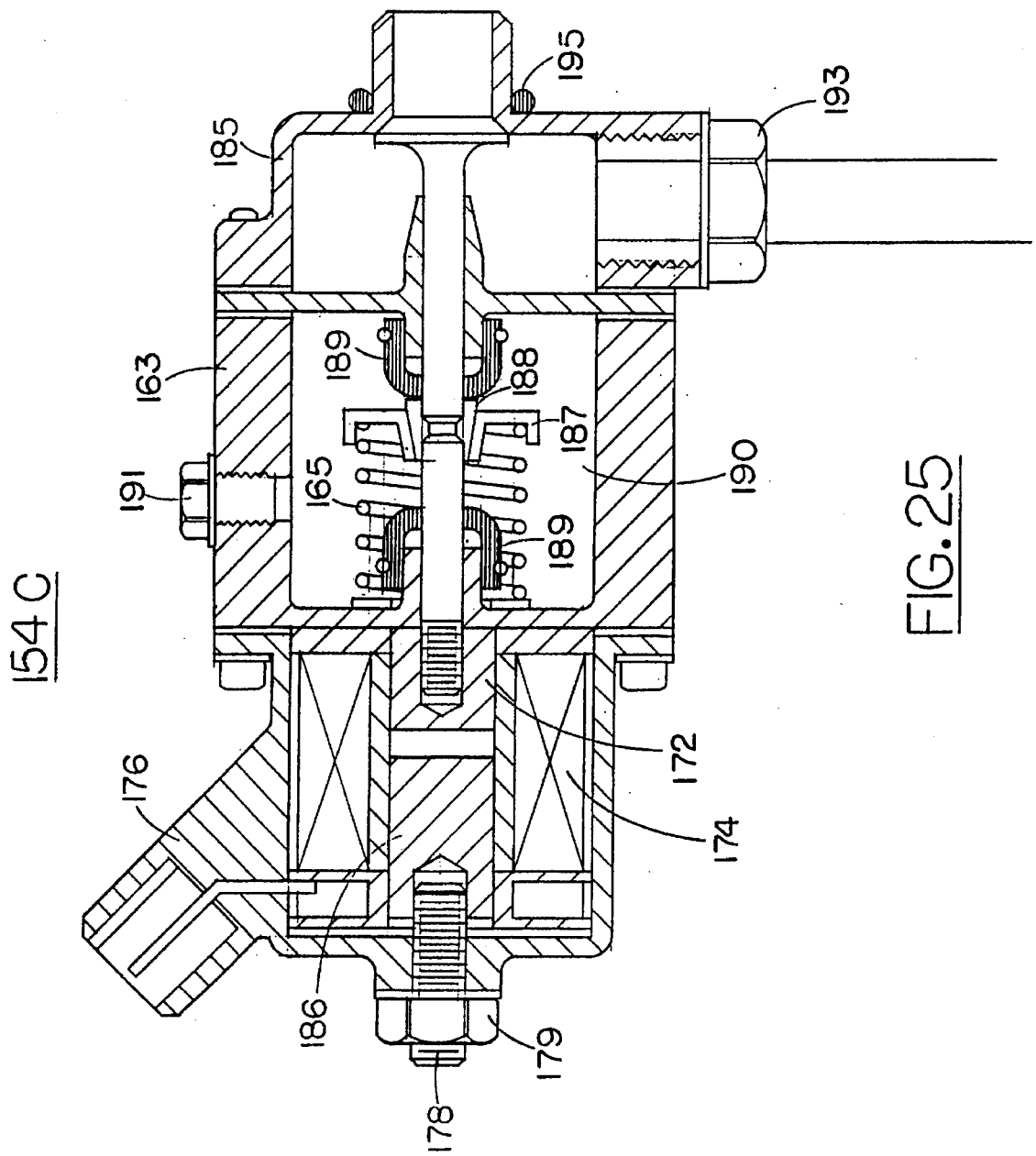
FIG. 25 is a sectioned view of still another embodiment of a multi-capacity universal gas injector, with a refillable oil reservoir.

FIG. 25 is a sectioned view of still another embodiment of a multi-capacity universal gas ejector. The parts which comprise gas injector 154C are a universal gas injector housing 163, containing a popper valve 164, which is biased to the closed position by a coil spring 165, against a seat in a gas plenum housing 185. The stem of popper valve 164 rides in a valve guide 167, which is retained by threaded fasteners. An armature 172, which has self-locking threads, is screwed onto the end of poppet valve 164. A solenoid 174, which is regulated for duration and timing by an electronic management unit 101 (not shown), attracts armature 172, which opens poppet valve 164, against the bias of coil spring 165. A stop screw 178 and lock nut 179, threaded into outer housing 176, adjust the air gap between armature 172 and a stop 186. A spring retainer 187 and a split valve keeper 188 transfer forces to and from poppet valve 164 and spring 165. A valve stem seal 189 prevents excessive oil loss from an oil reservoir 190, which is filled through a threaded hole and plug 191. Gas plenum housing 185 is supplied through a gas supply line 193 and seats flat against an intake manifold surface sealed for vacuum leaks by an O-Ring 195.

FIG. 26 is a sectioned view of yet another embodiment of a multi-capacity universal gas injector. The parts which comprise gas injector 154D are a universal gas injector housing 163, containing a poppet valve 164, which is biased to the closed position by a coil spring 165, against a screwed-in seat 166 in a gas plenum housing 185. The stem of popper valve 164 rides in a valve guide which is part of gas plenum housing 185. An armature 172, which has self-locking threads, is screwed onto the end of poppet valve 164. A solenoid 174, which is regulated for duration and timing by an electronic management unit 101 (not shown), attracts armature 172, which opens popper valve 164 against the bias of coil spring 165. A stop screw 178 and lock nut 179, threaded into outer housing 176, adjust the air gap between armature 172 and a stop 186. A valve stem seal 189 prevents excessive oil loss from an oil reservoir 190, which is supplied with engine oil from an oil supply line 192. Gas plenum housing 185 is supplied through a gas supply line 193 and seats flat against an intake manifold surface sealed for vacuum leaks by an O-Ring 195.

FIG. 27B is a sectioned side view of yet another embodiment of a multi-capacity dedicated gas injector which has an exhaust-heated vapor chamber with compressed air vapor ejection. The parts which comprise gas injector 155D are a dedicated gas injector housing 162, containing a popper valve 164, which is biased to the closed position by a coil spring 165 (not shown), against a screwed-in valve seat 166. The stem of popper valve 164 rides in a valve guide 167, which is retained in housing 162 by a valve guide C-Ring 168 and a press-fit. All other parts contained in outer housing 176 have been described and discussed elsewhere. An exhaust-heated 197, vapor chamber 139 is pressurized with fuel vapor maintained by the output of a single-point fuel injector 113, a single-point partial capacity gas injector 140, and compressed air from an air diffuser head 153. Gas injector 155D, which is controlled for duration and timing by an electronic management unit 101 (not shown), injects the mixture of fuel vapor, gaseous fuel, and compressed air. This injector is intended to serve at least two cylinders, or be used in conjunction with another type of gas injector, or be a true "multi-point valve"—i.e., one valve serving one cylinder only (see comments at end of FIG. 29).

FIG. 27A is an end view of valve 155D, showing the shape and size of the components discussed in FIG. 27B.

Figure 28:
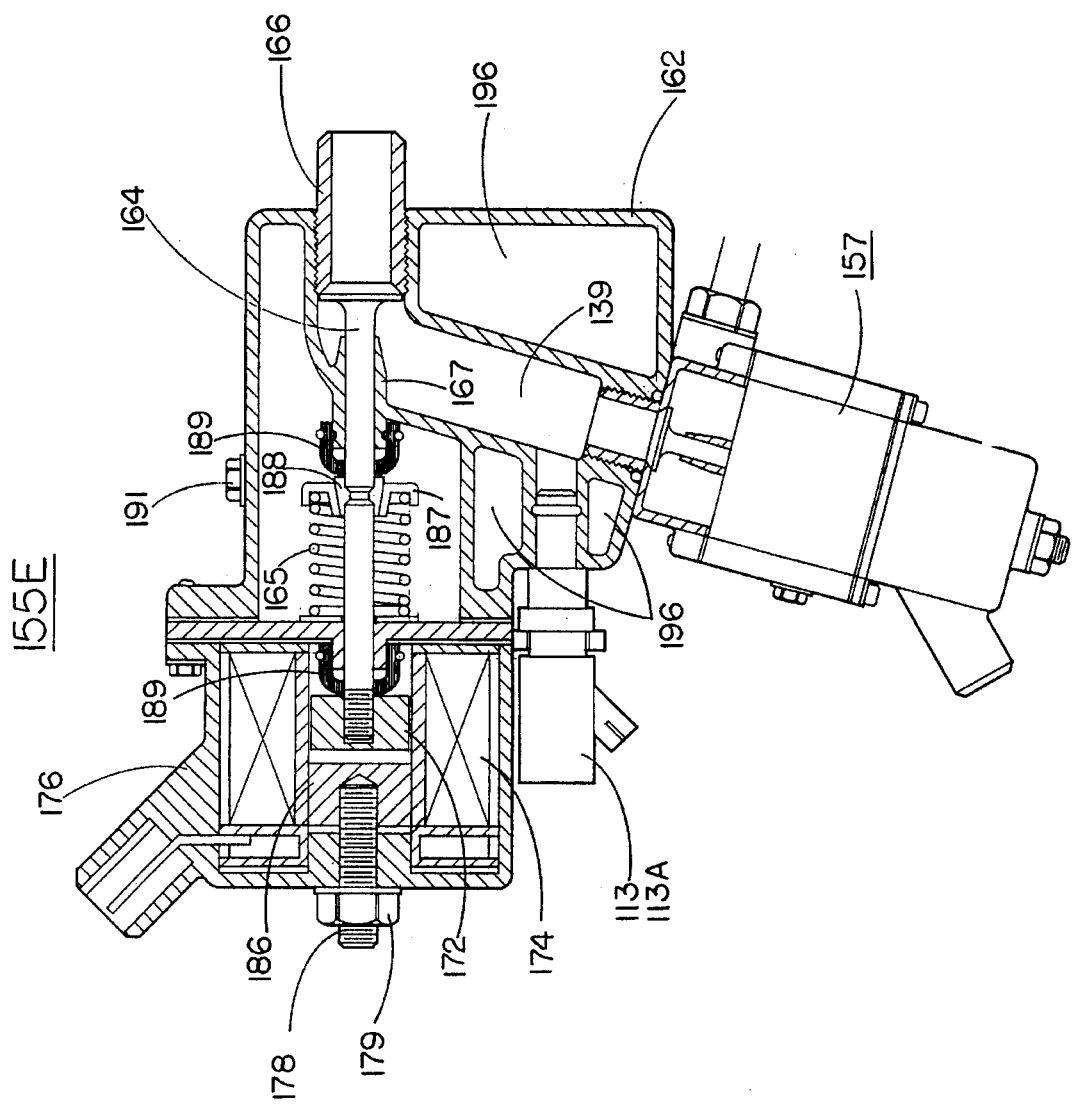
FIG. 28 is a sectioned view of a still further embodiment of a multi-capacity dedicated gas injector with a coolant-heated vapor chamber and vapor ejection by a full-capacity universal gas injector.

FIG. 28 is a sectioned view of a still further embodiment of a multi-capacity dedicated gas injector which has a coolant-heated vapor chamber with vapor ejection by a second gaseous fuel. The parts which comprise gas injector 155E are a dedicated gas injector housing 162, containing a poppet valve 164, which is biased to the closed position by a coil spring 165, against a screwed-in valve seat 166. The stem of poppet valve 164 rides in a valve guide 167, which is part of housing 162. An armature 172, which has self-locking threads, is screwed onto the end of poppet valve 164. A solenoid 174, which is controlled for duration and timing by an electronic management unit 101 (not shown), attracts armature 172, which opens popper valve 164, against the bias of coil spring 165. A stop screw 178 and a lock nut 179, threaded into outer housing 176, adjust the air gap between armature 172 and a stop 186. A spring retainer 187 and a split valve keeper 188 transfer forces to and from poppet valve 164 and spring 165. A valve stem seal 189 prevents excessive oil loss from an oil reservoir 190, which is filled through a threaded hole and plug 191. A coolant jacket 196 heats vapor chamber 139, which is pressurized by the output of a single-point fuel injector 113 and a single-point, full-capacity universal gas injector 157.

FIG. 29A is a partially sectioned view of the first embodiment a full-capacity dedicated gas injector which has an electrically-heated coil and compressed air vapor ejection. The parts which comprise gas injector 158 are a gas plenum housing 185, containing a poppet valve 164, which is biased to the closed position by a coil spring 165 (not shown) against a screwed-in valve seat 166. The stem of poppet valve 164 rides in a valve guide 167, which is retained by threaded fasteners. An electric heating coil 198 vaporizes the output of a single-point fuel injector 113. A vapor chamber 139 is pressurized with fuel vapor and compressed air from a diffuser head 153. Gas injector 158, which is controlled for duration and timing by an electronic management unit 101 (not shown), injects the mixture of fuel vapor and compressed air.

FIG. 29B is a sectioned front view of valve 158, showing the size and shape of components discussed in FIG. 29A.

FIG. 30A is a perspective view of another embodiment of a full-capacity dedicated gas injector which has either an electrically-heated metal strip or an infra-red bulb fuel vaporizer and vacuum-assisted vapor ejection. The parts which comprise gas injector 158A and are most relevant to FIG. 30 are a flat infra-red bulb 200 and associated mount and electrical connector 199B. A gasket 201 seals I.R. bulb and housing 200 or heating element 199 and housing 199A. Heating elements 199 or 200 vaporize the output of a single-point fuel injector 113. A vapor chamber 139 is pressurized with fuel vapor from the output of fuel injector 113. A poppet valve (not shown), which is controlled for duration and timing by an electronic management unit 101 (not shown), opens to enable the engine vacuum to extract the vaporized fuel (this concept dispenses with compressed-air assistance). Other parts illustrated for reference are a (universal) gas injector housing 163, an outer housing 176, and an oil filler hole and plug 191.

FIG. 30B is a perspective view of an electrically-heated metal strip fuel vaporizer element 199, riveted to an insulated housing 199A, shown as an alternative to the infra-red bulb vaporizer element 200 shown in FIG. 30A.

FIG. 31 is a sectioned view of another embodiment of a full-capacity universal gas injector. The parts which comprise gas injector 157A are a gas plenum housing 185, containing a popper valve 164, which is biased to the closed position by a coil spring 165, against a seat in a gas plenum housing 185. The stem of popper valve 164 rides in a pressed-in valve guide 167. An armature 172 is attached to the stem of poppet valve 164 by two armature-retaining C-Clips 169 (the rear C-clip resides in a recess on the rear side of armature 172). Solenoid 174, which is regulated for duration and timing by an electronic management unit 101 (not shown), attracts armature 172, which opens poppet valve 164, against the bias of coil spring 165. A stop screw 178 and lock nut 179, threaded into outer housing 176, adjust the air gap between itself and armature 172. A valve stem seal 189 prevents pressurized gas from gas plenum housing 185, escaping to other parts of the valve or otherwise being lost. Gas plenum housing 185 is supplied through a gas supply line 193 and gas filter 202.

Figures 32A, 32B:
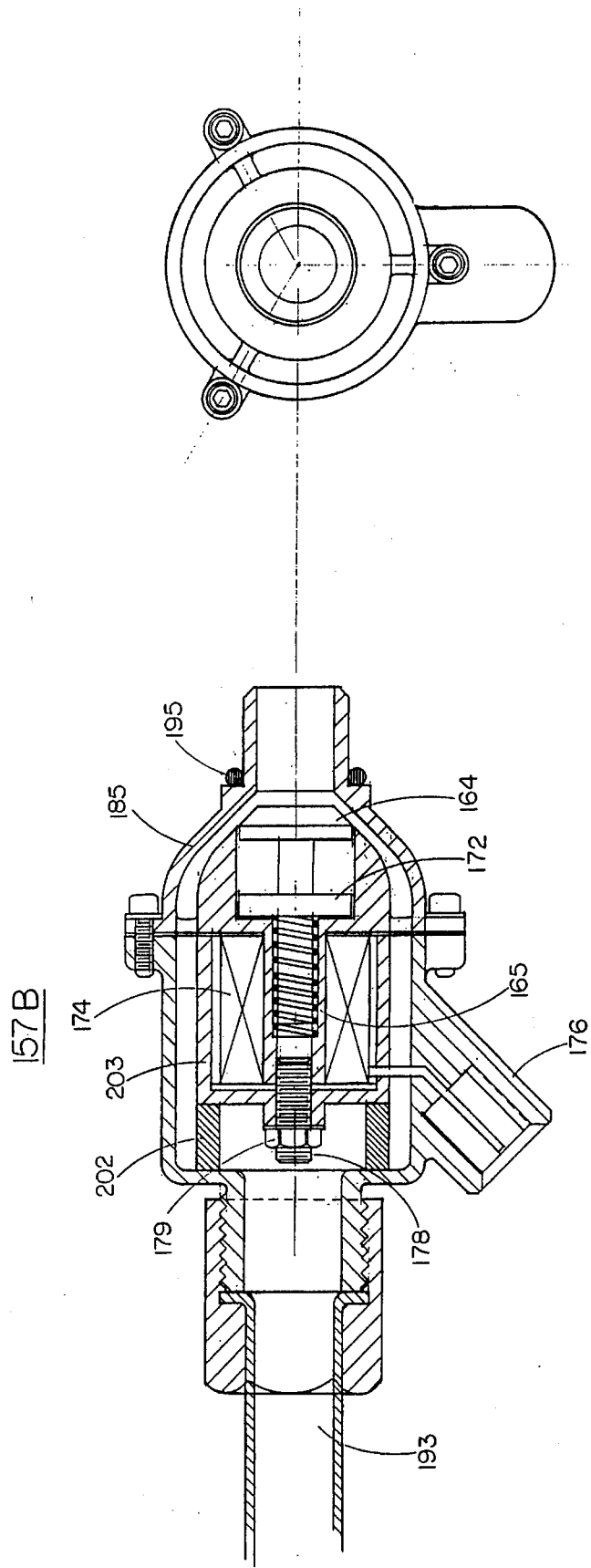
FIG. 32A is a sectioned view of a further embodiment of a full-capacity universal gas injector with an incorporated gas filter and radial gas flow design.
FIG. 32B is a front end view of gas injector 157B showing the size and shape of the parts discussed in FIG. 32A.

FIG. 32A is a sectioned side view of a yet further embodiment of a full-capacity universal gas injector. The parts which comprise gas injector 157B are a gas plenum housing 185, containing a combined poppet valve 164, and armature 172, which are biased to the closed position by a coil spring 165, against a seat in a gas plenum housing 185. The stem of poppet valve 164 is integrated with the armature 172 and does not employ a valve guide as seen previously. A solenoid 174, which is regulated for duration and timing by an electronic management unit 101 (not shown), attracts armature 172, which opens poppet valve 164, against the bias of coil spring 165. A stop screw 178 and a lock nut 179, threaded into a solenoid case 203, adjust the air gap between itself and the armature 172. Gas plenum housing 185 is supplied through a gas supply line 193. A gas filter 202 is changed by removing gas plenum housing 185 and solenoid 174 and solenoid case 203, which trap filter 202 against outer housing 176.

FIG. 32B is a front view of valve 57B showing the size and shape of parts described in FIG. 32A, especially the radial-flow of gas around the valve and solenoid assembly.

Figure 33B:
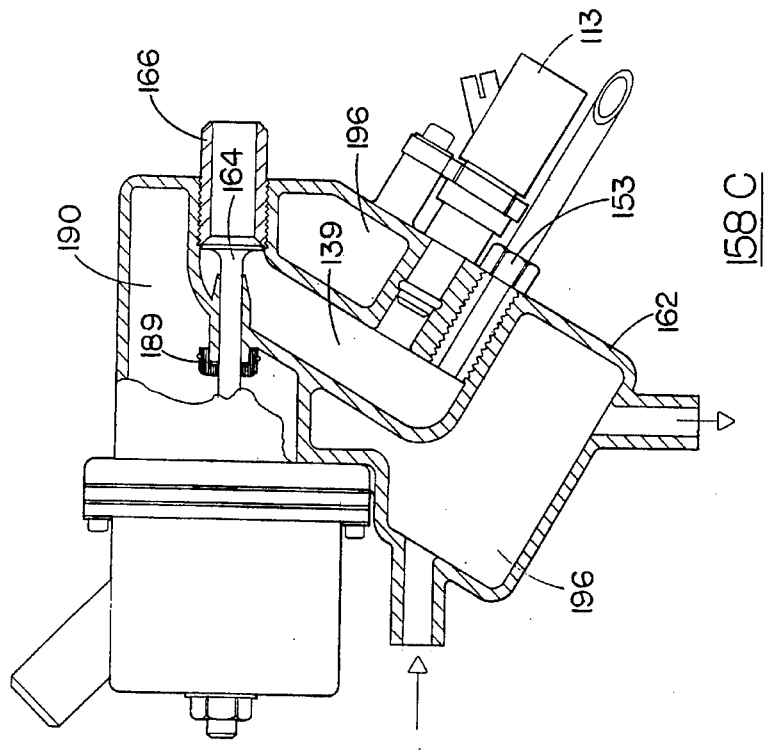
FIG. 33B is a sectioned view of still another embodiment of a full-capacity dedicated gas injector.
Figure 33A:
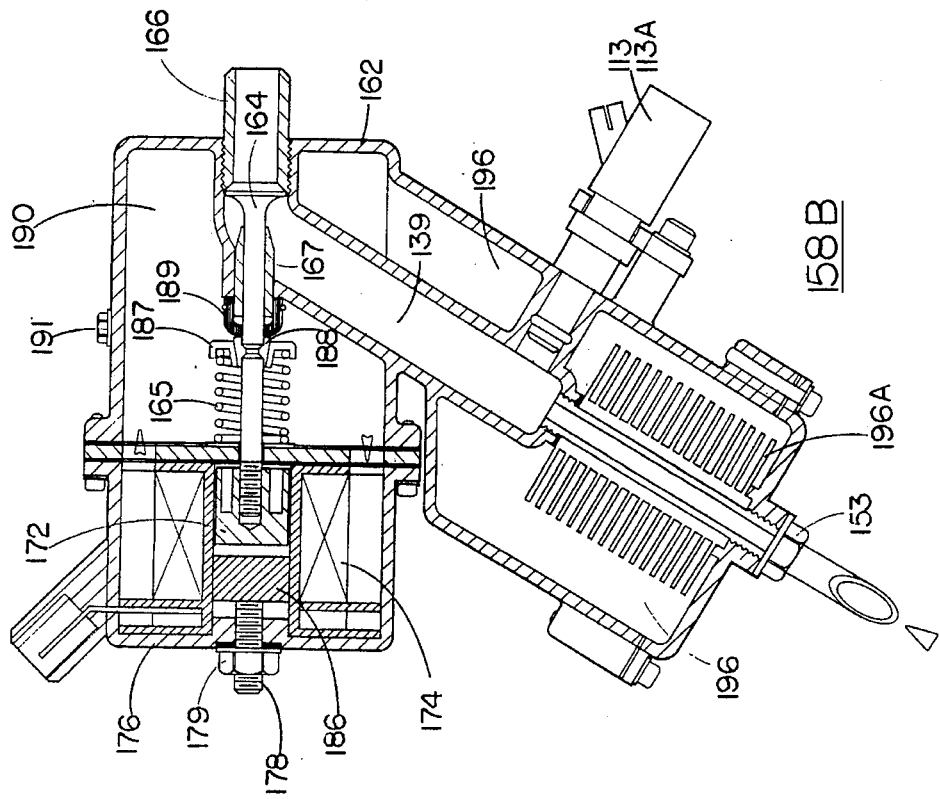
FIG. 33A is a sectioned view of a further embodiment of a full-capacity dedicated gas injectors.

FIG. 33A is a sectioned side view of gas injector 158B, a further embodiment of a full-capacity dedicated gas injector which has a coolant-heated vapor chamber with hot air vapor ejection provided by a coolant-heated heat exchanger. The parts which comprise full-capacity dedicated gas injector 158B are a dedicated gas injector housing 162, containing a poppet valve 164, which is biased to the closed position by a coil spring 165, against a screwed-in valve seat 166. The stem of poppet valve 164 rides in a valve guide 167, which is pressed into housing 162. An armature 172, which has self-locking threads, is screwed onto the end of poppet valve 164. A solenoid 174, which is controlled for duration and timing by an electronic management unit 101 (not shown), attracts armature 172, which opens poppet valve 164, against the bias of coil spring 165. A stop screw 178 and a lock nut 179, threaded into the outer housing 176, adjust the air gap between armature 172 and a stop 186. A spring retainer 187 and a split valve keeper 188 transfer forces to and from poppet valve 164 and spring 165. A valve stem seal 189 prevents excessive oil loss from an oil reservoir 190, which is filled through a threaded filler hole and plug 191. A coolant jacket 196 heats vapor chamber 139, which is pressurized by the output of a single-point fuel injector 113, and hot compressed air from an air diffuser head 153. Compressed air from diffuser head 153 is heated by a coolant heating element 196A and helps to vaporize the output from fuel injector 113.

FIG. 33B is a sectioned side view of still another embodiment of a full-capacity dedicated gas injector 158C which has a coolant-heated vapor chamber with vapor ejection by compressed air. The parts which comprise gas injector 158C are a dedicated gas injector housing 162 containing a poppet valve 164, a screwed-in valve seat 166, a valve stem seal 189, a oil reservoir 190, and a coolant-heated 196, vapor chamber 139, which is pressurized by the output of fuel injector 113 and compressed air from an air diffuser head 153. All other parts, such as outer housing 176, have been identified and discussed elsewhere.

FIG. 34A is an exploded view of another embodiment of a full-capacity "L"-flow gas regulation valve. The parts which comprise valve assembly 159A are a valve housing 204, which admits gaseous fuel through an end entry port and expels it through an elongated side exit port. A sliding piston 129 is equipped with three sealing rings 130, which prevent gas from escaping past piston 129. A piston O-Ring 130A provides additional gas sealing between piston 129 and housing 128, when the piston is in the closed (forward) position. A shim 204 adjusts the distance from the lobe on camshaft 205 to piston 129, insuring the desired piston stroke (gas volume flow) for each valve is both correct and consistent from valve to valve. A coil spring 207 provides a bias for piston 129 and shim 204, against the lobe of camshaft 205, removing mechanical play from the assembly. A stepper motor 125, reduction gearbox 126, and worm drive screw 127 rotate camshaft 205 through 180 degrees of travel, driving piston 129 back and fourth in housing 128. A position sensor 206 provides rotary position data to an electronic management unit 101 (not shown), which also controls stepper motor 125.

FIG. 34B is a sectioned side view of valve 34B with parts shown for reference in their assembled state.

FIG. 35A is a detail exploded view of two piston designs. Piston 208, instead of being made entirely of aluminum or steel, is molded of a compliant material (such as silicone rubber) over a steel or aluminum core. In this manner, sealing surfaces can be molded-in without the necessity of separate sealing rings, such as piston sealing O-ring 130A. Piston drive shaft 129A, which is illustrated with a non-specific drive (i.e., no rack teeth or screw threads), screws into the steel core of piston 208. A rear seal 131 seals piston 208 against rearward gas leaks.

Piston 209 is a detail exploded view of another piston assembly. Piston 209 is constructed as a sandwich of several appropriate materials. Part A is the front of piston 209 and a connecting shaft which joins all the parts of the assembly. Part B is the first two sealing ridges molded in a compliant material. Part C is the middle part of piston 209, and part D is the second set of four sealing ridges molded in compliant material. Part E is the rear part of the piston, and part 129A is the piston drive shaft with a non-specific drive, which is internally threaded to accept part A.

FIG. 35B is a sectioned side view of a further embodiment of a full-capacity "L"-flow gas regulation valve 159B. The parts which comprise valve 159B are a valve housing 211, which admits gaseous fuel through an end entry port and expels it through a side exit port. A sliding piston 212 progressively covers or uncovers the side exit port and thereby regulates the flow of gaseous fuel through valve housing 211. Piston 212 is constructed like pistons 208 or 209, but has a tapered, rather than a flat front, to enhance sealing in the forward (closed) position. Piston O-ring seals 130A and 210 and piston sealing gasket 210A provide additional gas sealing between piston 212 and valve housing 211 in the closed (forward) position. Rear O-Ring seals 210B, retained by a rear housing 132, seal the piston shaft against further gas leaks. A gasket 133 seals rear housing 132 and valve housing 211. A piston drive shaft with rack teeth 129A is engaged by a pinion gear 127 on stepper motor 125 (not shown), which drives piston 212 back and forth in housing 211. A valve position sensor 206 (not shown) provides linear position data to an electronic management unit 101 (not shown), which also controls stepper motor 125 (not shown). The design criteria selected for the pistons and valve illustrated in FIG.S. 35A and 35B is the requirement to seal hydrogen gas, especially when valve 159B is in the closed (piston forward) position.

FIG. 36A is an exploded view of still another embodiment of a full-capacity reverse "L"-flow gas regulation valve, which employs a tapered sealing surface. The parts which comprise valve 159C are a valve housing 211, which admits gaseous fuel through a top entry port and expels it through an end exit port. A sliding tapered piston 212 progressively covers or uncovers the side entry port and thereby regulates the flow of gaseous fuel through valve housing 211. Piston 212 is made from a soft sealing material, such as silicone rubber, and its tapered front acts as an effective sealing surface against housing 211, which has a corresponding tapered surface. A rear piston O-Ring 210A provides additional gas sealing for piston 212 in the closed (forward) position. A front piston O-Ring 210B provides additional gas sealing for piston 205 in the rearward (open) position. A shim 204 adjusts the distance from the lobe on a cam 205 to piston 212, insuring the desired piston stroke (gas volume flow) for the valve is correct. A coil spring 207 provides a bias for piston 212, piston drive shaft 129A, and shim 204, against the lobe of cam 205, removing mechanical play from the assembly. A stepper motor 125 and worm drive screw 127 rotate cam 205 through 180 degrees of travel, driving piston 212 back and forth in housing 211. A cam position sensor 206 (not shown) provides rotary position data to an electronic management unit 101 (not shown), which controls stepper motor 125.

FIG. 36B is a sectioned side view of valve 159C, showing the size and shape of parts discussed in FIG. 36A, as they are assembled.

FIG. 37A is an exploded view of the first embodiment of a full-capacity, cross-flow gas regulation valve (the only such valve being both piston-regulated and of cross-flow design). The parts which comprise valve assembly 160 are a valve housing 128, which admits gaseous fuel through a left piston seal 215L and expels it through a right piston seal 215R. A sliding piston 129 progressively covers or uncovers the elongated entry and exit ports molded into seals 215L and 215R, which are sealed to piston 129 by the bias of coil springs 214L and 214R. Spring 211L and seal 211L are retained by a guide assembly which is part of housing 128. Spring 214R and seal 215R are retained by a separate guide housing 216, which is sealed to housing 128 by a gasket 217. Piston 129 is equipped with a single piston ring 130, which prevents gas from escaping rearward. A rear seal 131, retained by a rear housing 132, seals piston 129 against further gas leaks. A gasket 133 seals rear housing 132 to valve housing 128. A piston drive shaft 129A, a pinion gear 127, a stepper motor 125, and a reduction gearbox 126 drive piston 129 back and forth in housing 128 (drive shaft 129A is shown as a separate part in the event that piston 129 is aluminum or a molded engineering polymer, in which case stronger and better-wearing steel rack teeth are necessary). A bushing 213 supports piston drive shaft 129A. A position sensor 206 (not shown) provides linear position data to an electronic management unit 101 (not shown), which also controls stepper motor 125.

FIG. 37B is a sectioned side view of valve 160, showing the size and shape of parts discussed in FIG. 37A, as they are assembled.

FIG. 38 is an exploded view of the first embodiment of a full-capacity, cross-flow rotary gas metering valve. The parts which comprise rotary valve assembly 161 are a valve housing 218, which admits pressurized gaseous fuel through a left entry port and expels it through a right exit port. Rotary valve 219 has an elongated metering slot which may be progressively aligned with the entry and exit ports, increasing the volume flow through the valve. Rotary valve 219 has a tapered shape which conforms to a corresponding taper in housing 218. A sealing spring 220 provides a bias for rotary valve 219 (which is made from a compliant material such as silicone rubber) against housing 218, sealing the two parts against gas leaks. A stepper motor 125 and reduction gearbox 126 rotate valve 219 and act as a cover for valve housing 218. A valve position sensor 206 provides rotary position data to an electronic management unit 101 (not shown), which also controls stepper motor 125.

Figure 39B:
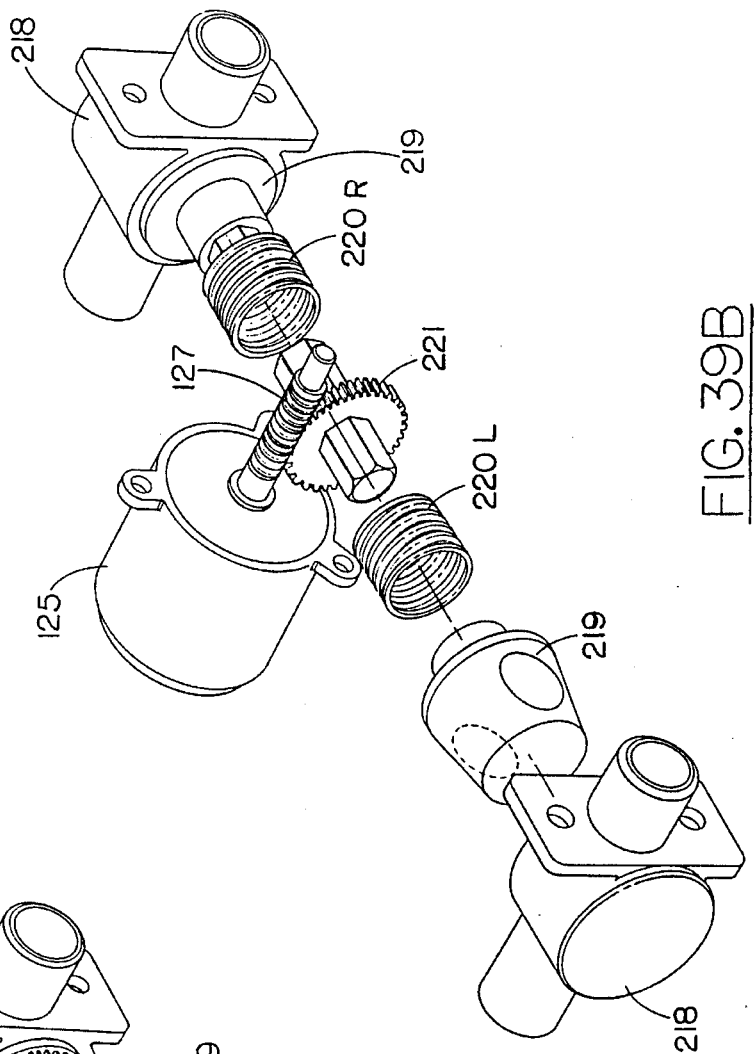
FIG. 39B is an exploded view of another embodiment of a full-capacity, dual cross-flow, rotary gas metering valve.

FIG. 39B is an exploded view of another embodiment of full-capacity, dual cross-flow, rotary gas metering valves (between the two variations are the drive system and housing). The parts which comprise valve assembly 161A are a valve housing 218, which admits gaseous fuel through a left entry port and expels it through a right exit port. A rotary valve 219 has a metering hole which may be progressively aligned with the entry and exit ports, increasing the volume flow through the valve. Rotary valve 219 has a tapered shape and is molded of compliant material which conforms to a corresponding taper in housing 218. A sealing spring or 220R provides a bias for rotary valve 219, against housing 218, sealing the two parts against gas leaks. A stepper motor 125 rotates valves 219 through a worm gear drive 127 and a spur gear distribution drive 222 (which could also be of ring-and-pinion design). A valve position sensor 206 (not shown) provides rotary position data to an electronic management unit 101 (not shown), which also controls stepper motor 125.

Figure 39A:
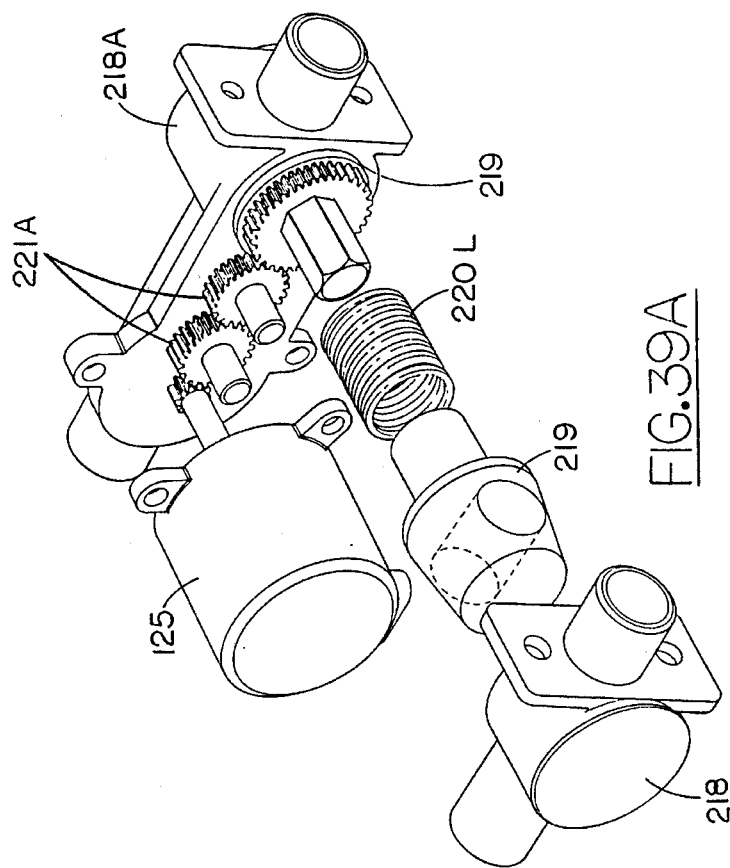
FIG. 39A is an exploded view of a further embodiment of a full-capacity, cross-flow, rotary gas metering valve.

FIG. 39A is an exploded view of a further embodiment of rotary valve 161A, which differs from the design discussed in FIG. 39B only in its drive system 221A and housing 218A.

Figure 40:
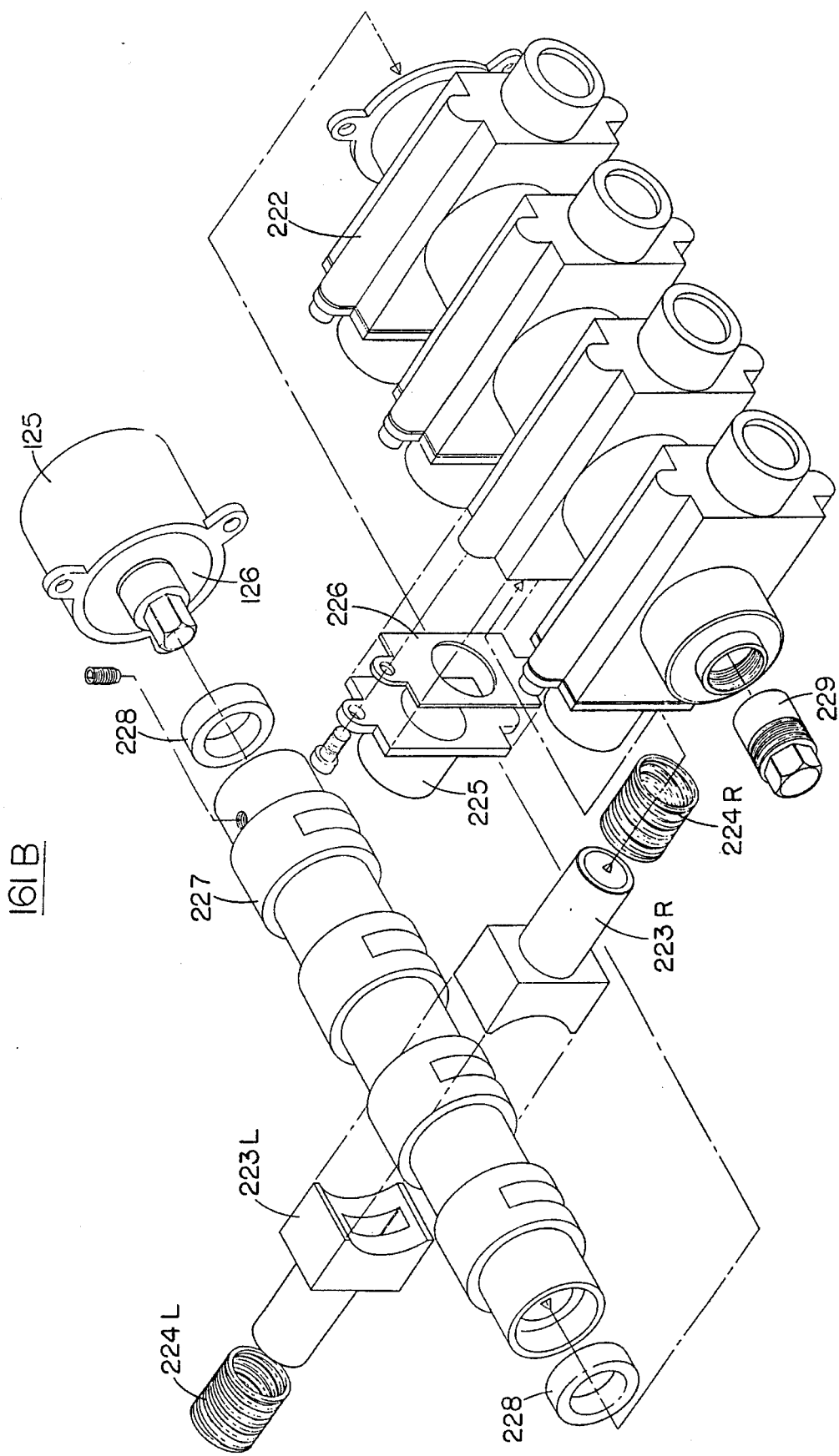
FIG. 40 is an exploded view of still another embodiment of a full-capacity, cross-flow, rotary gas metering valve.

FIG. 40 is an exploded view of still another embodiment of a full-capacity, cross-flow, rotary gas metering valve. The parts which comprise rotary valve assembly 161B are a rotary valve housing 222, which admits gaseous fuel through a left rotary valve seal 223L and expels it through a right rotary valve seal 223R. A rotary valve shaft 227 has elongated slots which may be progressively aligned with the entry and exit ports on seals 223L and 223R, increasing the volume flow through the valve. Seal springs 224L and 224R provide a bias for seals 223L and 223R, which are made from a compliant material, against rotary valve shaft 227. Seal spring 224L and seal 223L are retained by a separate guide housing 225, which is sealed to housing 222 by a gasket 226. Sealing spring 224R and seal 223R are retained by a guide assembly which is part of housing 222. Rotary valve shaft 227 is supported in housing 222 by two bearings 228 and aligned fore and aft by a stop 229. A stepper motor 125 and reduction gearbox 126 rotate rotary valve shaft 227 in housing 222 and also act as an end cover for housing 222. A shaft position sensor 206 (not shown) provides rotary position data to an electronic management unit 101 (not shown), which also controls stepper motor 125.

FIG. 41 illustrates five designs for dedicated gas injectors which further demonstrate in-valve vaporization chambers which have vapor ejection by either pressurized gaseous-fuel or compressed air. Any of the designs could also function effectively without compressed air or gaseous fuel vapor ejection (the primary advantage of in-valve vapor chambers is the short distance/low drag from the vapor chamber to the poppet valve outlet, a feature which enables liquid fuel vapors to be easily evacuated by engine vacuum alone). Although partial-capacity gas injectors 140 are shown as the metering device for gaseous fuel pressurization of the vapor chambers, these may be replaced by a simple fitting, as illustrated by FIG.S. C and D, which supply the vapor chamber with gaseous fuel which is regulated for volume and pressure by a single regulator/flow valve. This fitting may also be interpreted as a source of compressed air for vapor ejection assistance. These designs are novel only in their configurations, not in the components which comprise them, which have been identified and explained elsewhere.

Figure 42A:
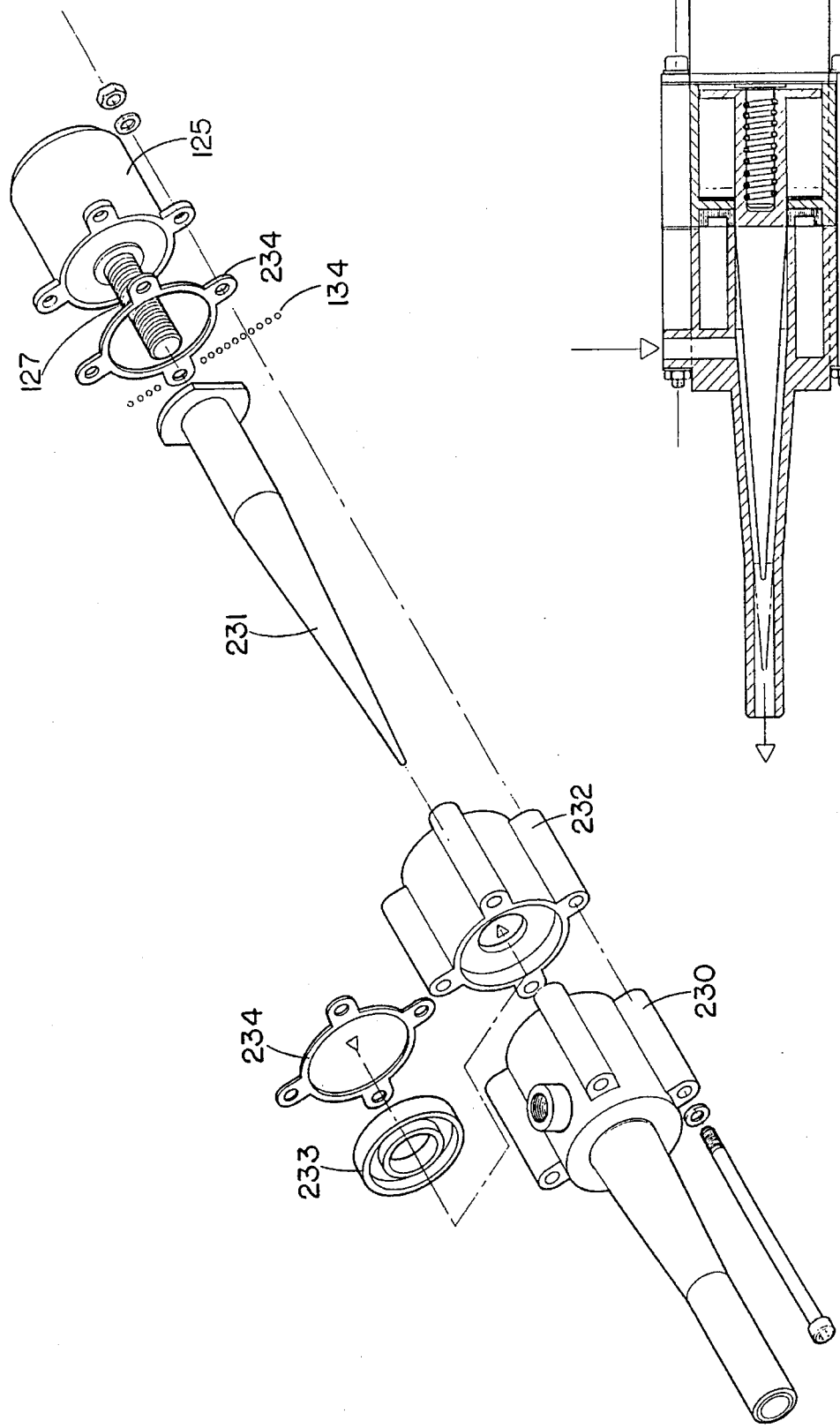
FIG. 42A is an exploded view of the first embodiment of a full-capacity, electronically regulated needle valve assembly.

FIG. 42A is an exploded view of a full capacity electronically regulated needle valve assembly. The parts which comprise the needle valve assembly are a valve housing 230, which admits gaseous fuel through a top entry port and expels it through an end exit port. A sliding needle valve 231 progressively meters (by constriction) the flow of gaseous fuel between the needle valve 231 and the valve housing 230. The needle may be either close tolerance machined plastic or metal or coated for at least part of its length with a compliant material over a rigid core to aid sealing. A rear seal 233, retained by a needle valve guide housing 232, seals the needle valve shaft guide (straight, non-tapered area) against rearward gas leaks. A gasket 234 seals the valve housing 230 to the needle valve guide housing 232. A needle valve drive screw 127 drives needle valve 231 through corresponding tracks on the inside of the needle valve, which is equipped with a collar to prevent needle valve 231 from rotating.

Recirculating ball bearings 134 transmit the drive loads between motor output shaft gear 127 and needle valve 231 in a low-friction action. A stepper motor 125 drives needle valve 231 back and forth in housing 232. A gasket 234 seals needle guide housing 232 to stepper motor 125. No position sensor is shown on this valve assembly, as the system relies on pulsing and recording the number of "pole addresses" in the stepper motor register and the direction of the motor (each polar address corresponds to a linear position of valve 231 from full close to full open). This system is practical where the movement of the metering needle valve produces fine increments in gas flow as compared to the number of motor rotations/polar pulses of the stepper motor.

Figure 42B:
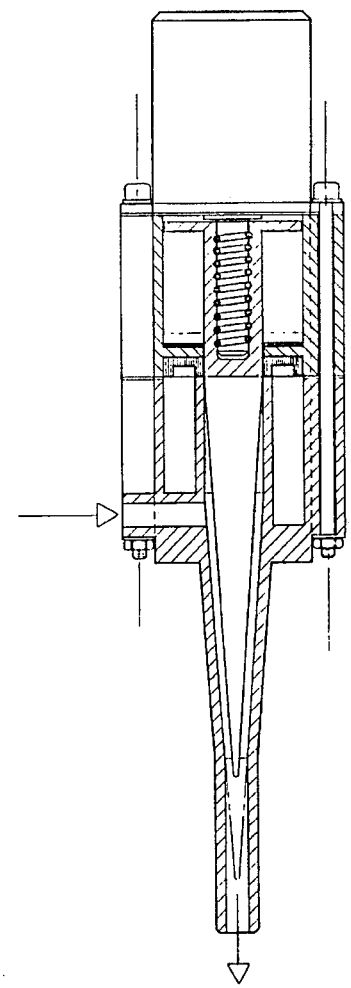
FIG. 42B is a sectioned view of the needle valve showing the size and shape of parts discussed in FIG. 42A as they are assembled.

FIG. 42B is a sectioned side view of the parts discussed in FIG. 42A, showing their size and shape as they are assembled.

FIG. 43A is an exploded view of a tapered piston in-line flow gas regulation valve. The parts which comprise the valve assembly are a taper valve housing 235, which admits gaseous fuel through an end entry port in the taper valve housing inlet cover 237 and expels it through a top exit port on valve housing 235. A sliding tapered piston 236 is machined to a fine tolerance so that it forms a seal against housing 235 when closed. An alternative piston construction specifies compliant piston surfaces molded over a metal core to enable the required gas sealing. The advantage of this design and construction technique is that when closed, the pressure from the gas supply side of piston 236 helps to push and therefore seal piston 235 into a corresponding tapered surface in valve housing 235. A rear seal 239, retained by a taper valve guide housing 241, seals a taper valve drive shaft 236 against gas leaks. A front gasket 240 seals guide housing 241 to valve housing 235. A taper valve drive shaft 236A drives valve 236 through corresponding tracks on the inside of taper valve drive shaft 236A, which is equipped with a collar to prevent taper valve 236 from rotating. Recirculating ball bearings 134 transmit the drive loads between the motor output shaft gear 127 and valve shaft 236 in a low-friction action. A stepper motor 125 drives valve 236 back and forth in housing 235 and acts as an assembly cover for housing 241, both parts being sealed by a rear gasket 240A. A valve position sensor 206 provides linear position data to an electronic management unit 101 (not shown), which controls stepper motor 125.

FIG. 43B is a sectioned side view of the taper valve parts discussed in FIG. 43A, showing their size and shape as they are assembled.

Figure 44B:
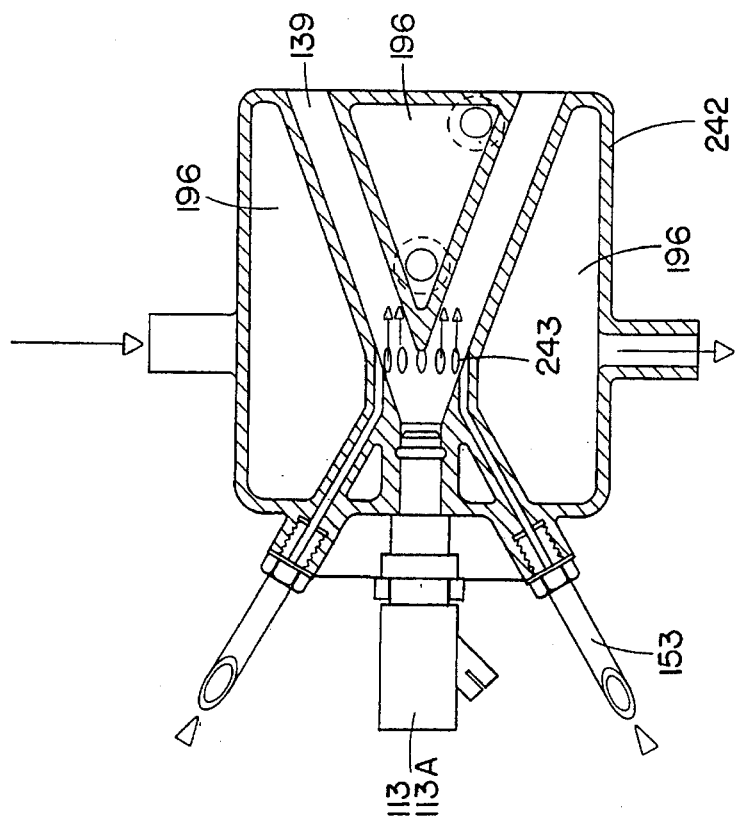
FIG. 44B is a sectioned view of another embodiment of an open-nozzle vapor chamber.
Figure 44A:
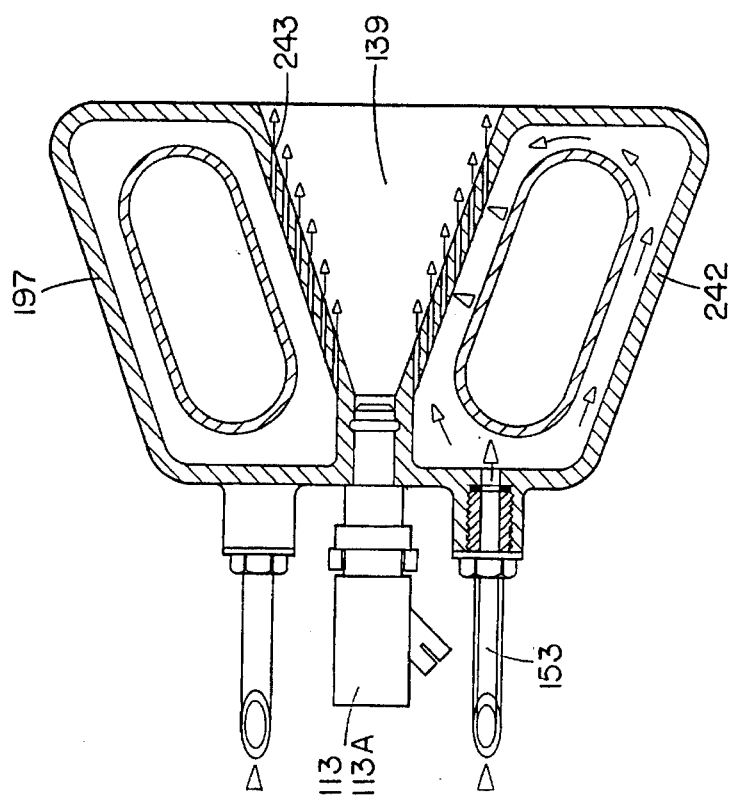
FIG. 44A is a sectioned view of the first embodiment of an open-nozzle vaporization chamber.

FIG. 44A is a sectioned side view of the first embodiment of an open-ended, valveless, vapor chamber. Compressed air from air diffuser heads 153 is admitted to a pre-heater chamber on the top and bottom of vapor chamber housing 242. Exhaust heating elements 197 heat the compressed air and eject it through hot air jets 243 in the wall of a vapor chamber 139, where it is mixed with the output of a single (113) or multi-point (113A) fuel injector. In multi-point applications, vapor chambers are arranged in assemblies according to the number and configuration of cylinders served (one assembly of four—a straight four-cylinder, two assemblies of four—a V-eight, two assemblies of three—a V-six, etc.). Vapor chamber 139 is conical-shaped when viewed from the open end and is part of vapor chamber housing 242.

FIG. 44B is a sectioned side view of another embodiment of an open-ended, valveless, vapor chamber. Compressed air from air diffuser heads 153 is admitted to a vapor chamber 139 through hot air jets 243. Vapor chamber 139 is heated by a coolant heating element 196, which vaporizes the output of a single- (113) or multi- (113A) point fuel injector, fuel vaporization being aided by hot compressed air from hot air jets 243, which also eject the fuel vapors. In multi-point applications, the vapor chambers are arranged as in FIG. 44A, but vapor chambers 139 appear as a double-conical shape or a cone-within-a-cone in vapor chamber housing 242. This design provides two heated surfaces to vaporize the output of fuel injectors 113 or 113A.

FIG. 45A is a sectioned side view of a further embodiment of an open-ended, valveless, vapor chamber 139, which has conical-shaped surfaces which taper toward an outlet nozzle. This taper intersects the output of fuel injectors 113 or 113A and is heated by an exhaust heating element 197. Exhaust gases then enter vapor chamber 139 through exhaust jets 243A, which aid fuel vaporization and help lower combustion temperatures by providing exhaust gas recirculation. Compressed air from diffuser head 153 enters vapor chamber 139 through hot air jets 243, which help to vaporize and eject the output of a single- (113) or multi- (113A) point fuel injector and eject the mixture of fuel vapors and exhaust gases out of the vapor chamber nozzle.

FIG. 45B is a sectioned side view of still another embodiment of an open-ended, valveless, vapor chamber. Vapor chamber 139 has walls heated by a coolant heating element 196. The conical spray pattern from fuel injector 113 or 113A intersects these walls and is thus vaporized.

Figure 46:
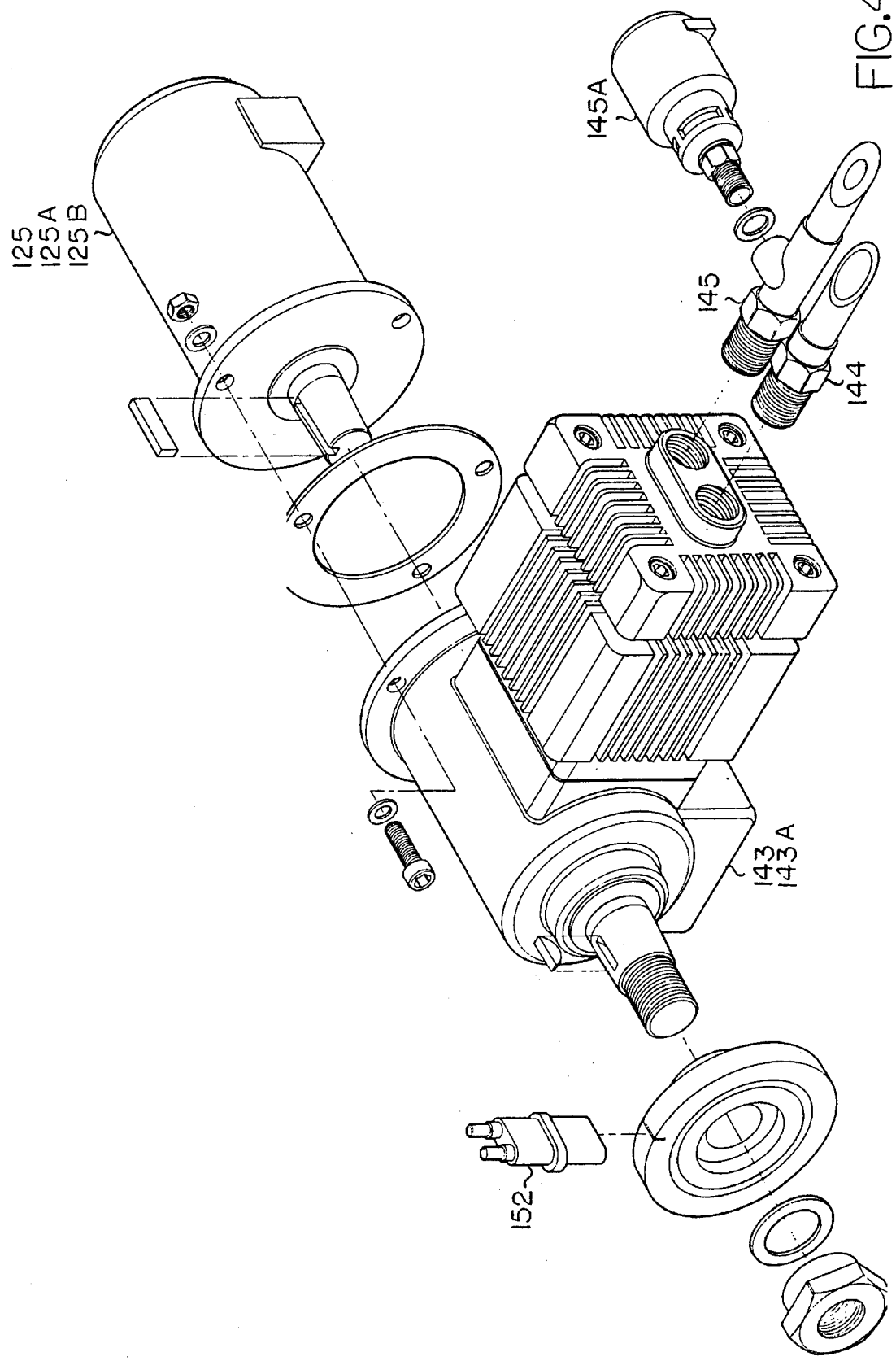
FIG. 46 is an exploded view of an air or vapor compressor and various drive and regulation devices.

FIG. 46 is an exploded view of a vapor compressor or air compressor, operated by either a stepper motor, a D.C. motor or an A.C. motor, and the attendant input and output sensing and regulation devices for each drive system. A compressor of a single basic design may compress either fuel vapor or air 143A. Fuel vapor compressor 143, or air compressor 143A, may be driven by a stepper motor 125 which is started, stopped, and positioned (regulating the compressor's number of revolutions and therefore its volumetric output) by an electronic management unit 101. The compressor may be driven at any given speed (output), in order to meet engine load, fuel octane, fuel mixture, and fuel state requirements. Compressor 143 or 143A may also be driven by a standard D.C. motor 125A or an A.C. motor 125B. The volumetric output of compressor 143, or 143A, when driven by D.C. motor 125A, or an A.C. motor 125B, is regulated by counting the number of revolutions of the compressor with a sensor 152 and opening the motor relay (not shown) and/or a pressure relief valve 145A, when the required volumetric output of compressed air or fuel vapor has been reached. Further functions of stepper motor 125 (driving the compressor at speeds faster or slower than engine rotation in fine increments) may be retained with a digital to analog circuit (not shown), which governs the speed of D.C. motor 125A or A.C. motor 125B. The functions of R.P.M. sensing, motor and relief valve operation, and the motor speed control circuit are under the control of electronic management unit 101 (not shown). When compressing vaporized fuel, pressure relief valve 145A must vent to a vaporization chamber 139, rather than to atmosphere, as is the case with compressed air. Compressor inlet check valve 144 and a compressor output check valve 145 insure that air or fuel vapor flows in one direction only.

It should be noted that there are four basic categories of delivery paths for compressed air into the engine cylinders; the higher the numerical designation, the greater the efficiency and volume of compressed air which is delivered. In addition, each category has variations in the type, number, and design characteristics of individual valves, vapor chambers, passages, and manifolds, which effect efficiency. CATEGORY 0—No application of compressed air is in the system. FIG.S. 1, 19 are typical. CATEGORY 1—Compressed air delivery is for the ejection of fuel vapors only. Fuel vapor to compressed air ratio is precisely controlled (and of low volume). FIG. 8 is typical. CATEGORY 2—Compressed air delivery is for the ejection of fuel vapors and to boost the effective compression ratio and charge density. All compressed air must pass through vapor chambers which are restricted by poppet valves which are timed, or piston, tapered piston, needle, and rotary valves, or the ports of valveless vapor chambers, which are untimed. FIG.S. 10, 11, 12, 16 are typical. CATEGORY 3—Compressed air delivery is split between the ejection of fuel vapors through vapor chambers which are restricted by popper valves which are timed, or piston, tapered piston, needle, and rotary valves, or the ports of valveless vapor chambers, which are untimed. The remainder of the compressed air is delivered directly into the intake system. FIG. 15 is typical. CATEGORY 4—Compressed air delivery is directly entered into the intake system, no compressed air being used for vapor chamber ejection, which is accomplished by engine vacuum extraction only. FIG.S. 17, 18, 23 are typical.

LIST OF REFERENCE NUMERALS

101 ELECTRONIC MANAGEMENT UNIT
102 KNOCK SENSOR
103 THROTTLE POSITION SENSOR
103A AIR FLOW SENSOR
104 R.P.M. SENSOR
104A VEHICLE SPEED SENSOR
105 SYNC PULSE SENSOR
106 M.A.P. SENSOR
107 OXYGEN SENSOR
108 AIR TEMPERATURE SENSOR
109 COOLANT TEMPERATURE SENSOR
110 FUEL TANK
110A FUEL LEVEL SENDING UNIT
111 FUEL PUMP
112 FUEL FILTER
113 SINGLE-POINT FUEL INJECTOR
113A MULTI-POINT FUEL INJECTOR
113H SINGLE-POINT FUEL INJECTOR-HOT ENGINE CONDITION
113AH MULTI-POINT FUEL INJECTOR-HOT ENGINE CONDITION
114 FUEL PRESSURE REGULATOR

115 GAS CYLINDER
115A GAS CYLINDER PRESSURE SENSOR
115B GAS CYLINDER CHARGING VALVE
115C L.N.G. TANK
115D L.N.G. TANK CHARGING VALVE
116 GAS PRESSURE AND FLOW REGULATOR
116A GAS PRESSURE AND FLOW REGULATOR (E.M.U. CONTROLLED)
117 GAS CYLINDER/L.N.G. TANK LEVEL DISPLAY
118 INTAKE MANIFOLD: STRAIGHT 4 CYLINDER ENGINE
118A INTAKE MANIFOLD: V-6 ENGINE
119 ELECTRONIC SPARK ADVANCE UNIT
120 IGNITION COIL
121 ROM MAP-SINGLE FUEL-LIQUID OR GASEOUS STATE
122 ROM MAP-SINGLE FUEL-LIQUID OR GASEOUS STATE+SECOND GASEOUS FUEL
123 ROM MAP-SINGLE FUEL-LIQUID OR GASEOUS STATE+SECOND+THIRD GASEOUS FUEL
124 FUEL INJECTOR SIGNAL CABLES
125 STEPPER MOTOR
125A D.C. MOTOR
125B A.C. MOTOR
126 STEPPER MOTOR REDUCTION GEARBOX
127 MOTOR OUTPUT SHAFT GEAR
128 VALVE HOUSING
129 PISTON
129A PISTON DRIVE SHAFT
130 PISTON SEALING RINGS
130A PISTON SEALING O-RING (closed position)
131 REAR SEAL
132 REAR HOUSING
133 REAR HOUSING GASKET
134 RECIRCULATING BALL BEARINGS
135 PISTON DRIVE SHAFT GUIDE HOUSING
136 GAS REGULATION VALVE GASKET
137 PLENUM HOUSING O-RING
138 GAS DISTRIBUTION MANIFOLD (MULTI-POINT)
138A GAS DISTRIBUTION MANIFOLD (MULTI-POINT TUBES)
138B GAS DISTRIBUTION MANIFOLD (MULTI-POINT LINES)
139 VAPOR CHAMBER
140 PARTIAL CAPACITY GAS INJECTOR
141 VAPOR CHAMBER PRESSURE SENSOR
142 ELECTRIC COMPRESSOR CLUTCH
143 FUEL VAPOR COMPRESSOR
143A AIR COMPRESSOR
144 COMPRESSOR INLET CHECK VALVE
145 COMPRESSOR OUTPUT CHECK VALVE
145A COMPRESSOR OUTPUT RELIEF VALVE
146 FUEL VAPOR STORAGE TANK PRESSURE SENSOR
147 FUEL VAPOR STORAGE TANK
148 WATER-ALCOHOL STORAGE TANK
149 WATER-ALCOHOL PUMP
150 WATER-ALCOHOL INJECTOR
151 AIR CLEANER
152 COMPRESSOR R.P.M. SENSOR
153 AIR DIFFUSER HEAD
153A INTAKE MANIFOLD COMPRESSED AIR INLET
153B AIR DIFFUSER HEAD
154 MULTI-CAPACITY UNIVERSAL GAS INJECTOR
154A MULTI-CAPACITY UNIVERSAL GAS INJECTOR
154B MULTI-CAPACITY UNIVERSAL GAS INJECTOR
154C MULTI-CAPACITY UNIVERSAL GAS INJECTOR
154D MULTI-CAPACITY UNIVERSAL GAS INJECTOR
155 MULTI-CAPACITY DEDICATED GAS INJECTOR
155A MULTI-CAPACITY DEDICATED GAS INJECTOR
155B MULTI-CAPACITY DEDICATED GAS INJECTOR
155C MULTI-CAPACITY DEDICATED GAS INJECTOR
155D MULTI-CAPACITY DEDICATED GAS INJECTOR
155E MULTI-CAPACITY DEDICATED GAS INJECTOR
156 INTAKE PORT
157 FULL-CAPACITY UNIVERSAL GAS INJECTOR
157A FULL-CAPACITY UNIVERSAL GAS INJECTOR
157B FULL-CAPACITY UNIVERSAL GAS INJECTOR
158 FULL-CAPACITY DEDICATED GAS INJECTOR
158A FULL-CAPACITY DEDICATED GAS INJECTOR
158B FULL-CAPACITY DEDICATED GAS INJECTOR
158C FULL-CAPACITY DEDICATED GAS INJECTOR
159 FULL-CAPACITY "L"-FLOW GAS REGULATION VALVE
159A FULL-CAPACITY "L"-FLOW GAS REGULATION VALVE
159B FULL-CAPACITY "L"-FLOW GAS REGULATION VALVE
159C FULL-CAPACITY "L"-FLOW GAS REGULATION VALVE
160 FULL-CAPACITY CROSS-FLOW GAS REGULATION VALVE
161 FULL-CAPACITY CROSS-FLOW ROTARY GAS METERING VALVE
161A FULL-CAPACITY CROSS-FLOW ROTARY GAS METERING VALVE
161B FULL-CAPACITY CROSS-FLOW ROTARY GAS METERING VALVE
162 DEDICATED GAS INJECTOR HOUSING
163 UNIVERSAL GAS INJECTOR HOUSING
164 POPPET VALVE
165 COIL SPRING
166 VALVE SEAT
167 VALVE GUIDE
168 VALVE GUIDE C-RING
169 ARMATURE RETAINING C-CLIP
170 ARMATURE RETAINING NUT
171 THREADED RETAINER
172 ARMATURE
173 STABILIZER SPRING
174 SOLENOID
175 ADJUSTING FLAT
176 OUTER HOUSING
177 LOCK NUT
178 STOP SCREW
179 NUT
180 COMPRESSOR INLET GALLERY
181 COOLING AIR INLET
182 COOLING AIR OUTLET
183 VAPOR CHAMBER O-RING
184 VAPOR DISTRIBUTION MANIFOLD
185 GAS PLENUM HOUSING
186 ARMATURE STOP
187 SPRING RETAINER
188 VALVE KEEPER
189 VALVE STEM SEAL
190 OIL RESERVOIR
191 OIL FILLER HOLE AND PLUG
192 OIL SUPPLY LINE AND FITTING:
193 GAS SUPPLY LINE
195 O-RING
196 COOLANT HEATING ELEMENT
196A COOLANT HEATING ELEMENT-COMPRESSED AIR 197 EXHAUST HEATING ELEMENT
198 ELECTRIC HEATING ELEMENT-WIRE COIL
199 ELECTRIC HEATING ELEMENT-METAL STRIP
199A ELECTRIC HEATING ELEMENT HOUSING
199B ELECTRICAL CONNECTOR
200 ELECTRIC HEATING ELEMENT-INFRA-RED BULB
201 HEATING ELEMENT GASKET
202 GAS FILTER
203 SOLENOID CASE
204 SHIM
205 CAMSHAFT
206 POSITION SENSOR
207 PISTON RETURN COIL SPRING
208 PISTON-MOULDED SKIN OVER METAL CORE
209 PISTON-SANDWICHED CONSTRUCTION OF VARIED MATERIALS
210 PISTON SEALING O-RING- REAR (closed position)
210A PISTON SEALING GASKET (closed position)
210B PISTON SEALING O-RINGS (open position)
211 VALVE HOUSING—FOR PISTON WITH TAPERED SEALING SURFACE
212 PISTON—WITH TAPERED SEALING SURFACE
213 PISTON DRIVE SHAFT BUSHING
214 SEAL SPRING L&R
215 SEAL L&R
216 GUIDE HOUSING
217 GUIDE HOUSING GASKET
218 ROTARY VALVE HOUSING (tapered sealing surface)
218A ROTARY VALVE HOUSING
219 ROTARY VALVE (tapered soft sealing surface)
220 ROTARY VALVE SEALING SPRING
221 SPUR GEAR DISTRIBUTION DRIVE (dual rotary valves)
221A SPUR GEAR DISTRIBUTION DRIVE
222 ROTARY VALVE ASSEMBLY HOUSING (four or more valves)
223 ROTARY VALVE SEALS-LEFT AND RIGHT (radiused soft sealing surface)
224 ROTARY VALVE SEAL SPRINGS-LEFT AND RIGHT
225 SPRING AND SEAL RETAINER HOUSING
226 SPRING AND SEAL RETAINER HOUSING GASKET
227 ROTARY VALVE SHAFT
228 ROTARY VALVE SHAFT BEARINGS
229 ROTARY VALVE SHAFT STOP
230 NEEDLE VALVE HOUSING
231 NEEDLE VALVE (with integral drive shaft)
232 NEEDLE VALVE GUIDE HOUSING
233 REAR SEAL
234 GASKET
235 TAPER VALVE HOUSING
236 TAPER VALVE
236A TAPER VALVE DRIVE SHAFT
237 TAPER VALVE HOUSING INLET COVER
238 TAPER VALVE HOUSING INLET COVER GASKET
239 REAR SEAL
240 FRONT GASKET
240A REAR GASKET
241 TAPER VALVE GUIDE HOUSING
242 VAPOR CHAMBER HOUSING
243 HOT AIR JETS
243A EXHAUST JETS

I claim:

1. A plural fuel system for an internal combustion engine said system comprising:

a. a variable supply of a plurality of fluid fuels differing in octane rating and thermal content, the fuels being usable independently and in variable mixtures for delivery to the engine;

b. optimum engine operation parameters at different engine speeds and loads being stored in a ROM;

c. sensors arranged for sensing actual engine operation parameters, load conditions, and fuel availability;

d. a processor in communication with the sensors and the ROM for selecting available fuels and fuel delivery rates;

e. a fuel delivery system controlled by the processor for delivering the selected fuels at the chosen rates to approximate the optimum engine operation parameters at the actual engine speed and load in real time, the fuel delivery system including:

(i) a fuel injector;

(ii) a fuel source providing fuel in a gaseous state;

(iii) a distribution valve in fluid communication with the fuel source; and (iv) a distribution manifold in fluid communication with and conducting fuel from the distribution valve to an intake manifold of the engine; and f. an air compressor controlled by the processor and arranged for directing compressed air into the engine for adjusting the effective compression ratio and fuel charge density as the fuel delivery variations change octane rating, energy yield, and flame travel velocity.

2. A plural fuel system for an internal combustion engine, said system comprising:

a. a variable supply of a plurality of fluid fuels differing in octane rating and thermal content, the fuels being usable independently and in variable mixtures for delivery to the engine, at least one of said fuels being liquid;

b. optimum engine operation parameters at different engine speeds and loads being stored in a ROM;

c. sensors arranged for sensing actual engine operation parameters, load conditions, and fuel availability;

d. a processor in communication with the sensors and the ROM for selecting available fuels and fuel delivery rates; and e. a fuel delivery system controlled by the processor for delivering the selected fuels at the chosen rates to approximate the optimum engine operation parameters at the actual engine speed and load in real time, the fuel delivery system being arranged for delivering the liquid fuel in either a liquid or vapor state and including:

(i) a fuel injector;

(ii) a fuel source providing fuel in a gaseous state;

(iii) a distribution valve in fluid communication with the fuel source; and (iv) a distribution manifold in fluid communication with and conducting fuel from the distribution valve to an intake manifold of the engine.

3. The system of claim 2 including a fuel vaporization cheer in communication with an inlet valve to an engine cylinder, the vaporization chamber being warm enough for vaporizing liquid fuel in advance of an intake stroke of the engine.

4. The system of claim 3 wherein a fuel inlet valve to the vaporization chamber is timed for operating at least one engine stroke in advance of the intake valve opening to the engine cylinder so that liquid fuel delivered to the vaporization chamber is vaporized in time for passing through the intake valve into the engine cylinder.

5. The system of claim 4 including an air compressor controlled by the processor and arranged for directing compressed air into the engine for adjusting the effective compression ratio and fuel charge density as fuel delivery variations change octane rating, energy yield, and flame travel velocity.

6. The system of claim 5 wherein compressed air from the compressor is arranged for injecting fuel vapor into the engine on an intake stroke.

7. The system of claim 4 including a metering valve controlled by the processor for metering fuel vapor into the engine on an intake stroke.

8. A plural fuel system for an internal combustion engine, said system comprising:
   a. sources of at least two different fuels varying in octane rating, energy yield, and flame travel velocity;
   b. a processor controlled engine supply system arranged for sensing engine operating conditions and fuel availability and for variably delivering fuels to the engine for optimally meeting engine operating conditions;
   c. an electrically driven, fixed-displacement compressor controlled by the processor for variably delivering compressed air to the engine for adjusting the effective compression ratio and charge density to meet the combustion needs of the fuel being delivered and to meet the requirements of the engine; and
   d. a fuel vaporization system timed for operating at least one engine stroke ahead of an intake stroke of the cylinder and including a vaporization chamber that vaporizes fuel in time for intake of the vaporized fuel into the cylinder on an intake stroke.

9. The system of claim 8 including a metering valve controlled by the processor for metering fuel vapor into the engine on the intake stroke.

10. A plural fuel system for an internal combustion engine, said system comprising:
    a. sources of at least two different fuels varying in octane rating, energy yield, and flame travel velocity, at least one of said fuels being liquid;
    b. a processor controlled engine supply system arranged for sensing engine operating conditions and fuel availability and for variably delivering fuels to the engine for optimally meeting engine operating conditions, said supply system also being arranged for delivering the liquid fuel in either a liquid or a vapor state; and
    c. an electrically driven, fixed-displacement compressor controlled by the processor for variably delivering compressed air to the engine for adjusting the effective compression ratio and charge density to meet the combustion needs of the fuel being delivered and to meet the requirements of the engine, compressed air from the compressor being arranged for injecting fuel vapor into the engine on an intake stroke.

11. A plural fuel system for an internal combustion engine, said system comprising:
    a. variable supplies of at least two different fuels, at least one of which is liquid, the fuels differing in octane rating, thermal yield, and flame travel velocity and being usable independently and in variable mixture for delivery to the engine;
    b. a processor controlled engine supply system arranged for sensing engine operating conditions and fuel availability and for variably delivering available fuels to the engine for optimally meeting engine operating conditions at different engine speeds and loads;
    c. the engine supply system including a fuel vaporizing system for vaporizing the liquid fuel before intake into the engine; and
    d. a fuel inlet valve to the vaporization chamber timed for operating at least one engine stroke in advance of the intake valve opening to the engine cylinder so that liquid fuel delivered to the vaporization chamber is vaporized in time for passing through the intake valve into the engine cylinder.

12. The system of claim 11 wherein the vaporization system includes a vaporization chamber arranged for vaporizing the liquid fuel, the vaporization chamber being in communication with an intake valve of the engine.

13. The system of claim 12 including a metering valve controlled by the processor for metering fuel vapor into the engine on an intake stroke.

14. The system of claim 11 including an air compressor controlled by the processor and arranged for directing compressed air into the engine for adjusting the effective compression ratio and fuel charge density as fuel delivery variations change octane rating, energy yield, and flame travel velocity.

15. The system of claim 14 wherein compressed air from the compressor is arranged for injecting fuel vapor into the engine on an intake stroke.

16. The system of claim 14 wherein optimum engine operation parameters at different engine speeds and loads are stored in a ROM, sensors are arranged for sensing actual engine operation parameters, load conditions, and fuel availability, and the processor is in communication with the sensors and the ROM for controlling the fuel delivery system for selecting fuels and fuel delivery rates.

* * * * *